Figure 14:
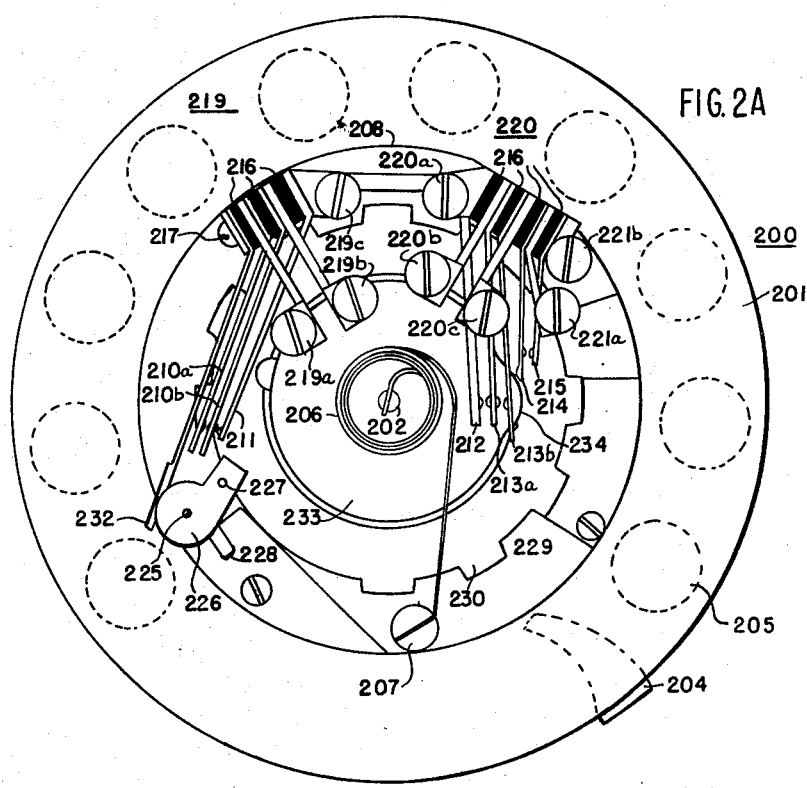

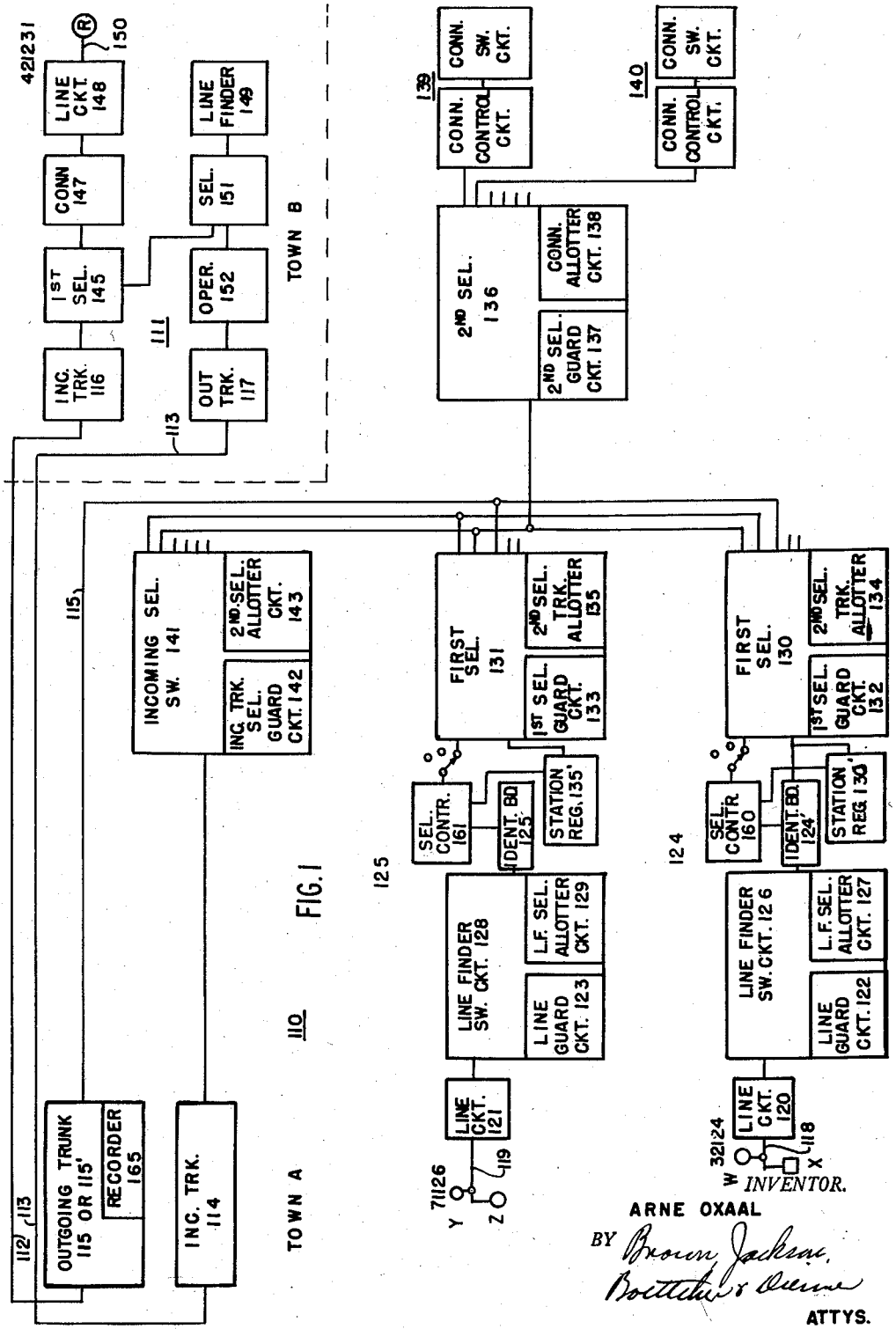

Feb. 3, 1959   A. OXAAL   2,872,519
AUTOMATIC TELEPHONE SYSTEM
Filed March 24, 1952   21 Sheets-Sheet 2

STATION IDENTIFICATION

WHEN DIGIT DESIGNATED TOLL IS DIALLED ("O" IN THIS EXAMPLE) STATION REG. RLYS. WILL BECOME OPERATED AS FOLLOWS.

| DIALLING PARTY | RLY. OPER. | DIALING PARTY | RLY. OPER. |
|---|---|---|---|
| 1 | 800 | 11 | 800 & 860 |
| 2 | 810 | 12 | 810 & 860 |
| 3 | 820 | 13 | 820 & 860 |
| 4 | 830 | 14 | 830 & 860 |
| 5 | 840 | 15 | 840 & 860 |
| 6 | 850 | 16 | 850 & 890 |
| 7 | 860 | 17 | 860 & 890 |
| 8 | 870 | 18 | 870 & 890 |
| 9 | 880 | 19 | 880 & 840 |
| 10 | 890 | 20 | 890 & 840 |

INVENTOR.
ARNE OXAAL
BY Brown, Jackson,
Boettcher & Dienner
ATTYS.

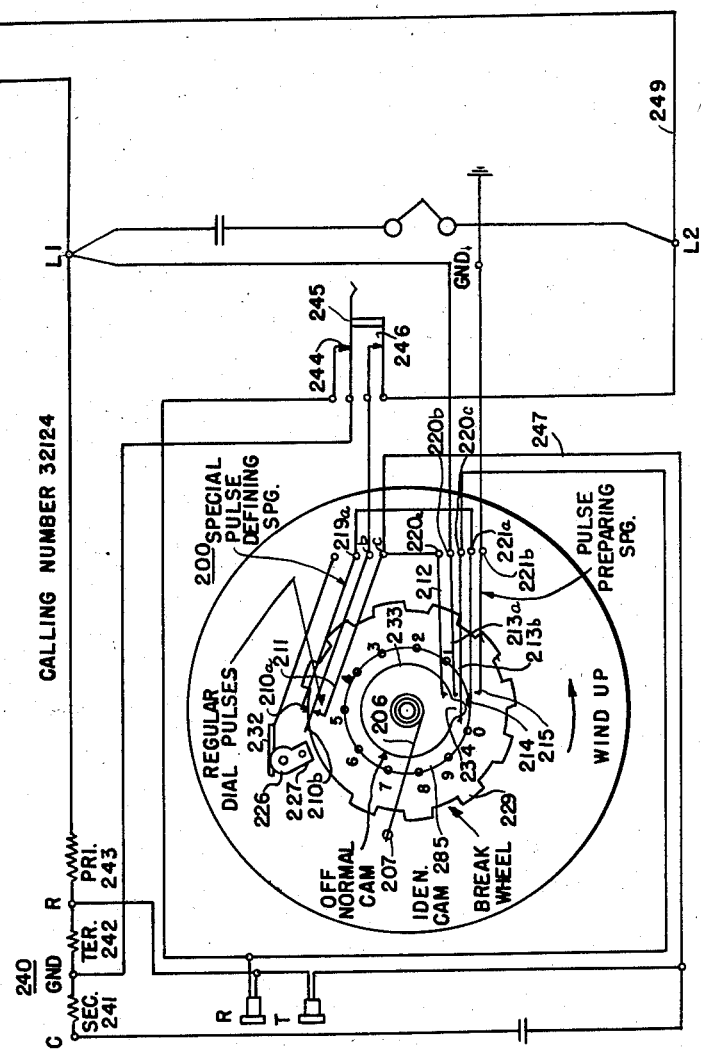

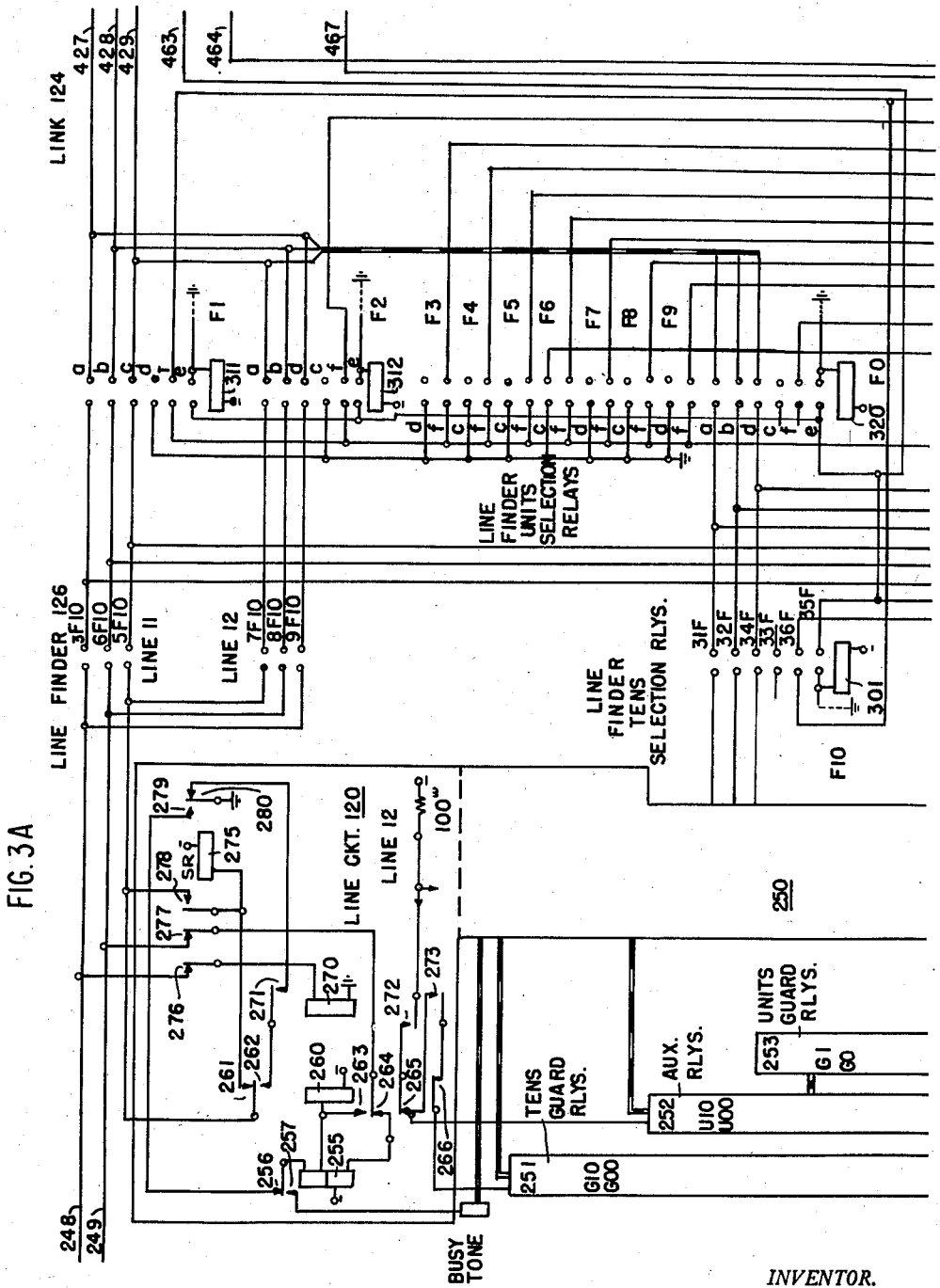

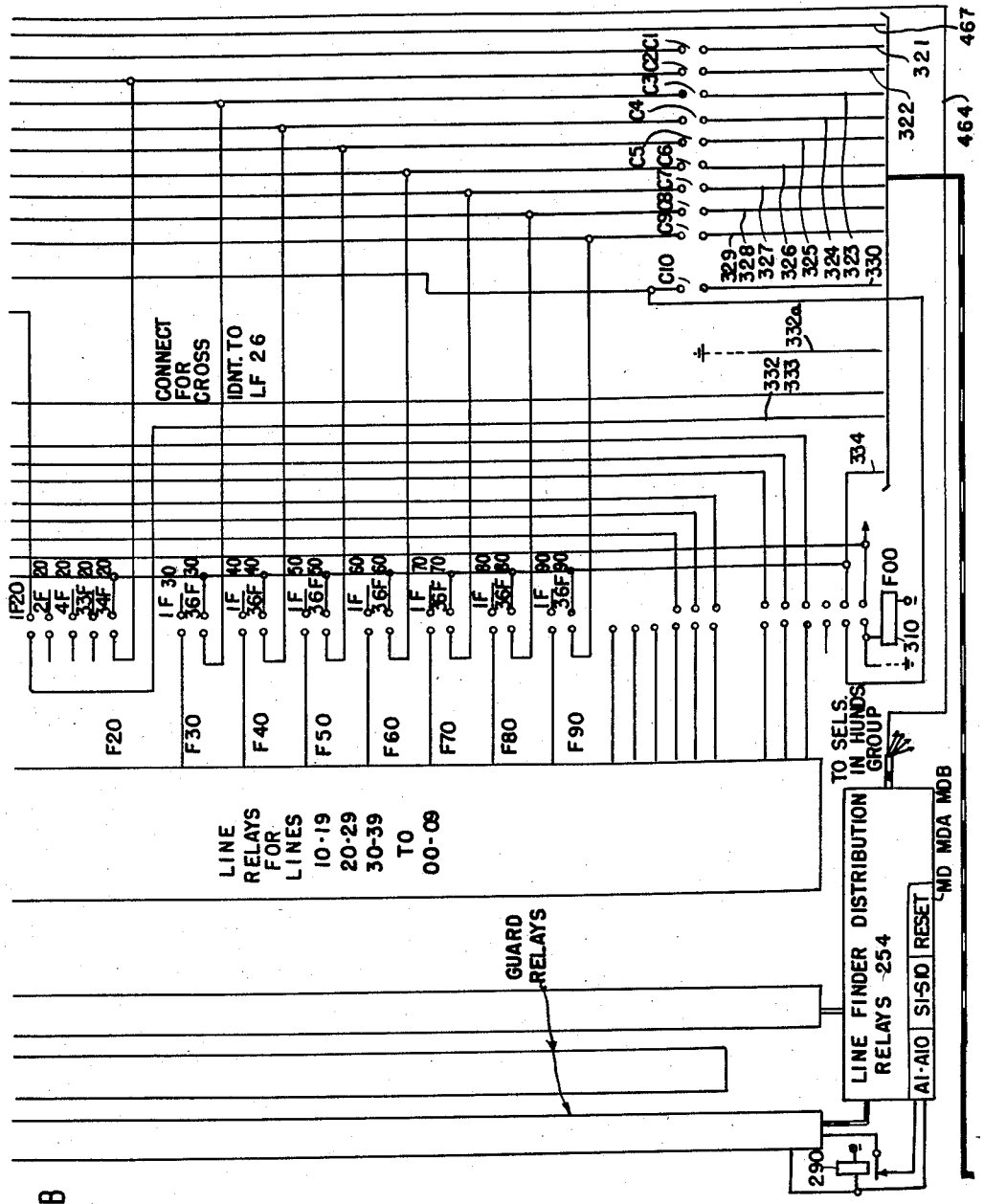

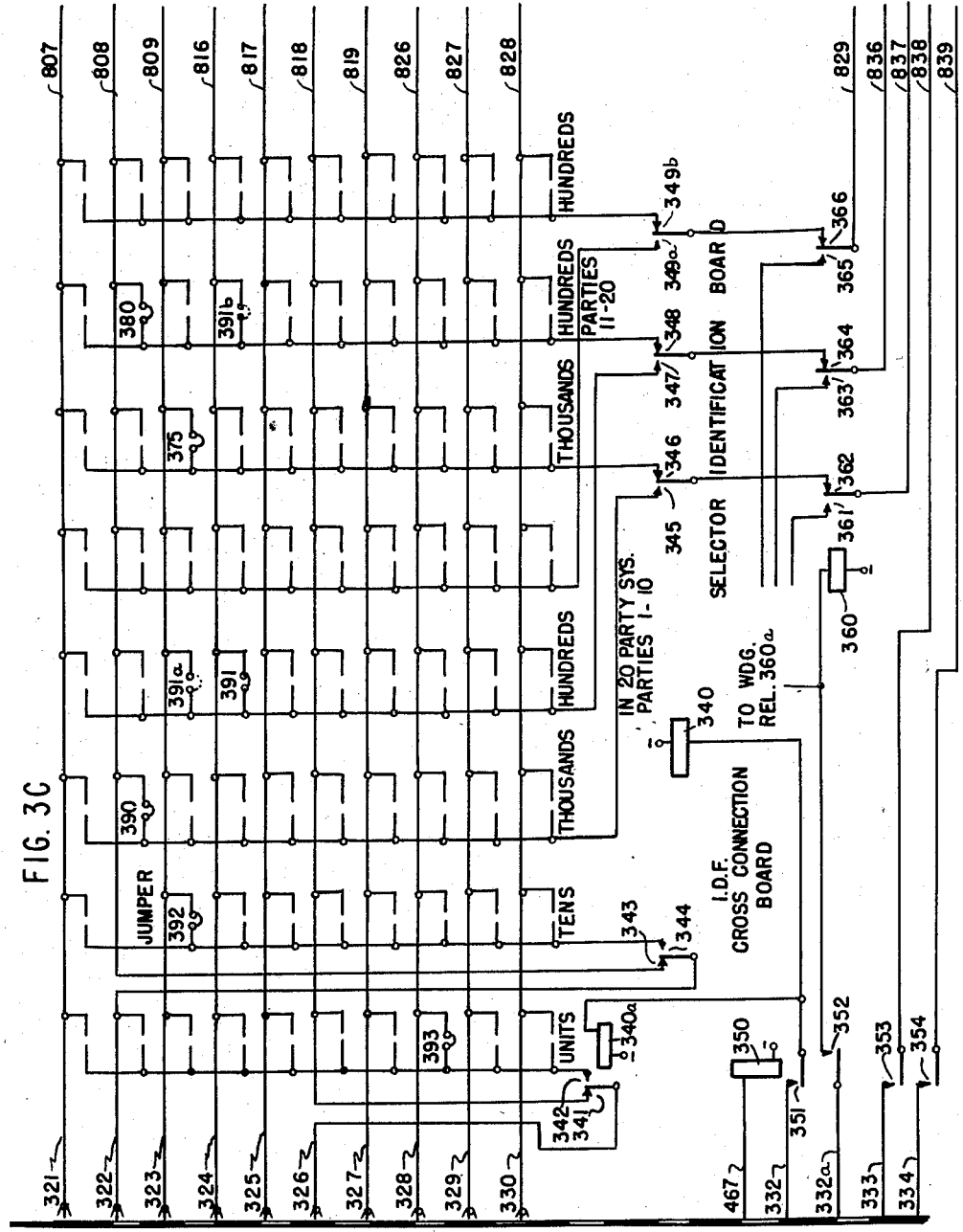

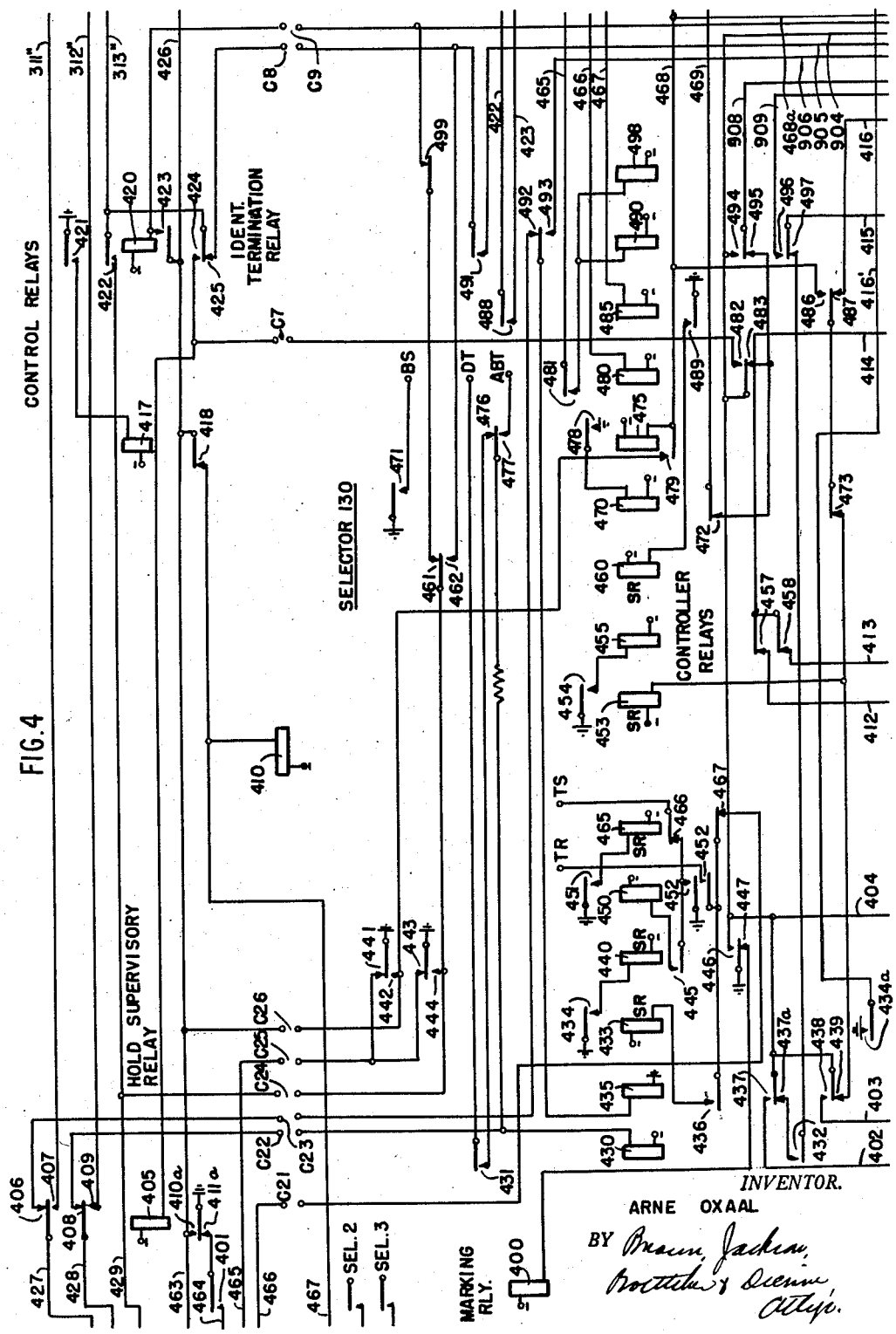

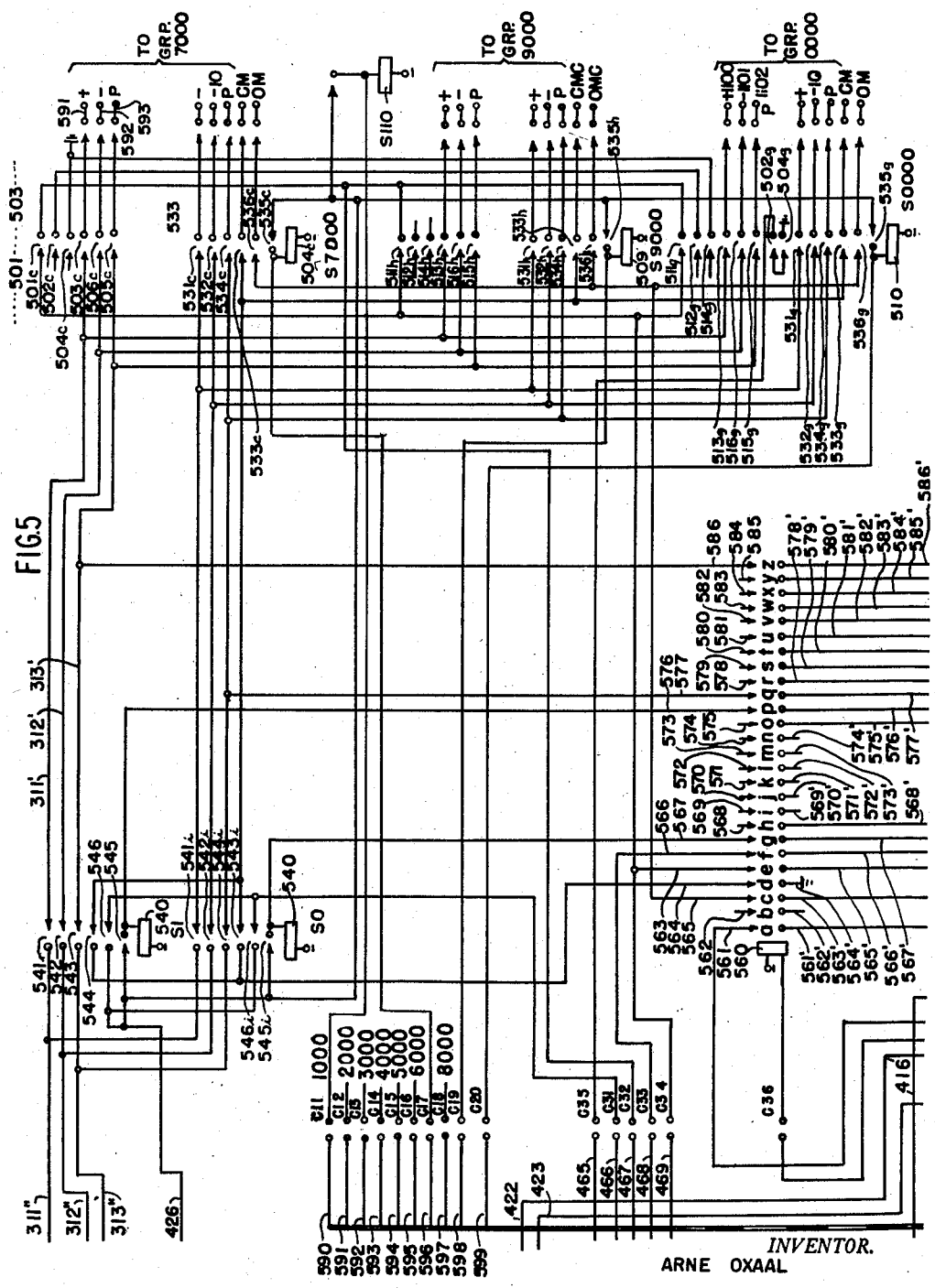

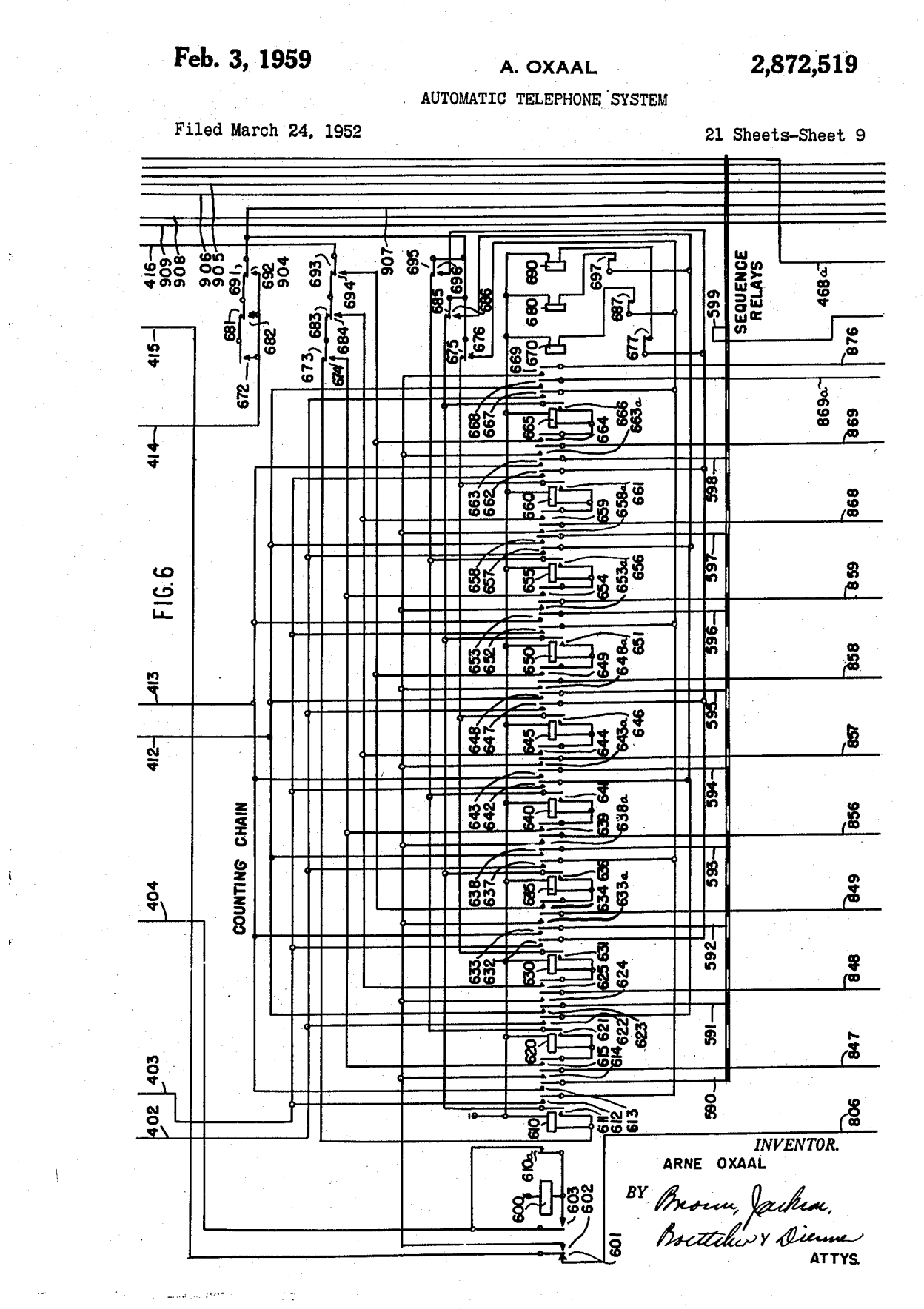

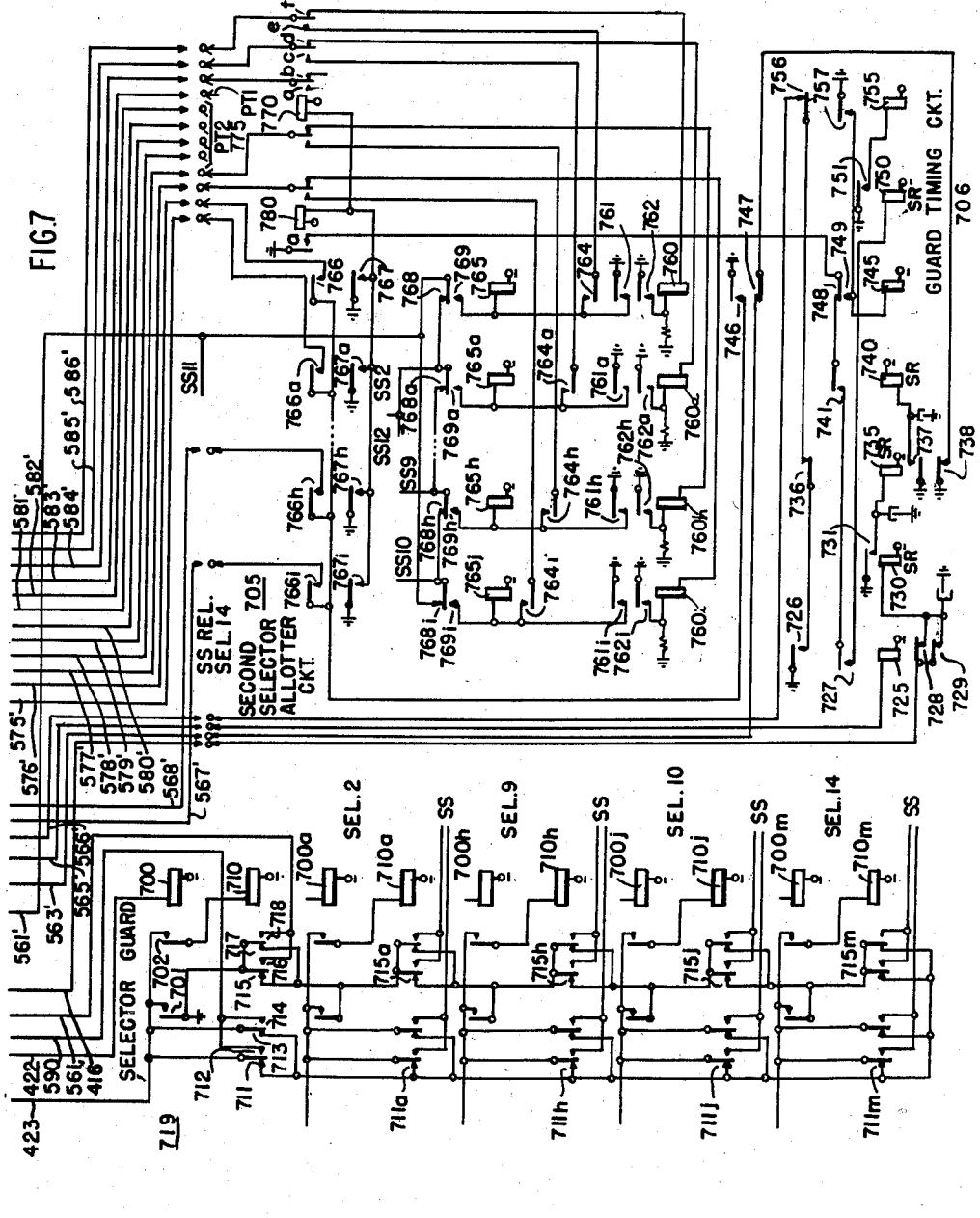

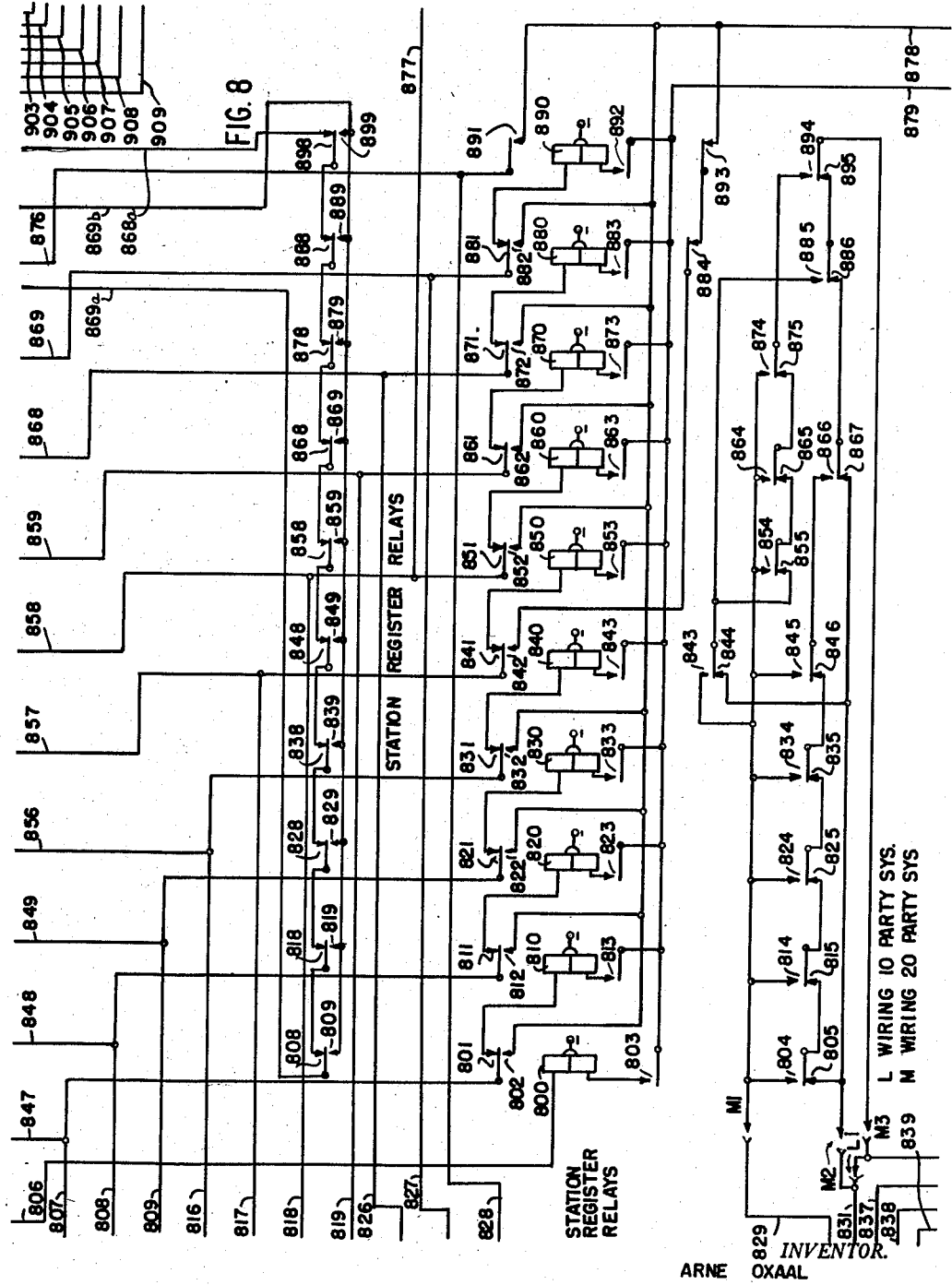

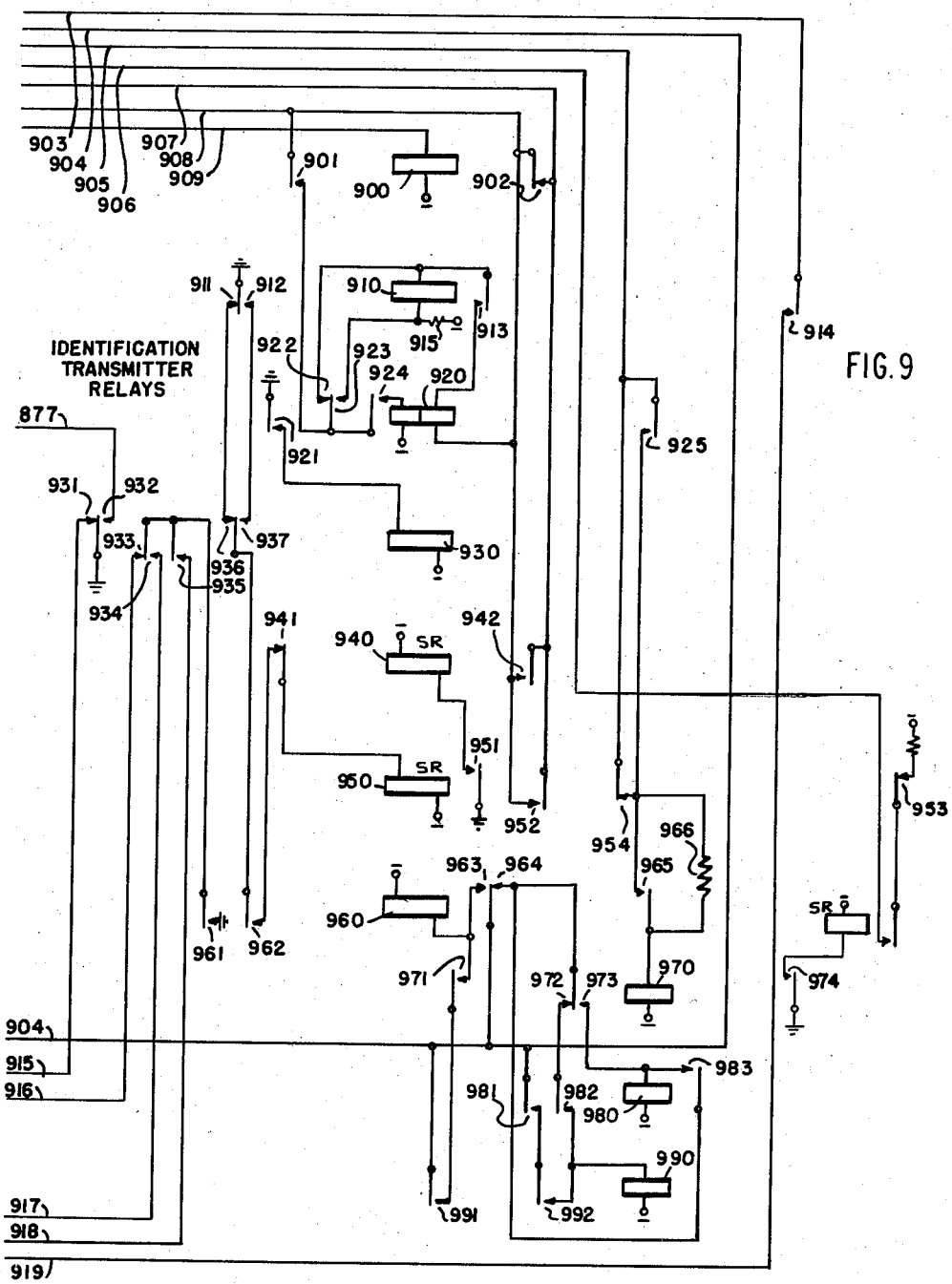

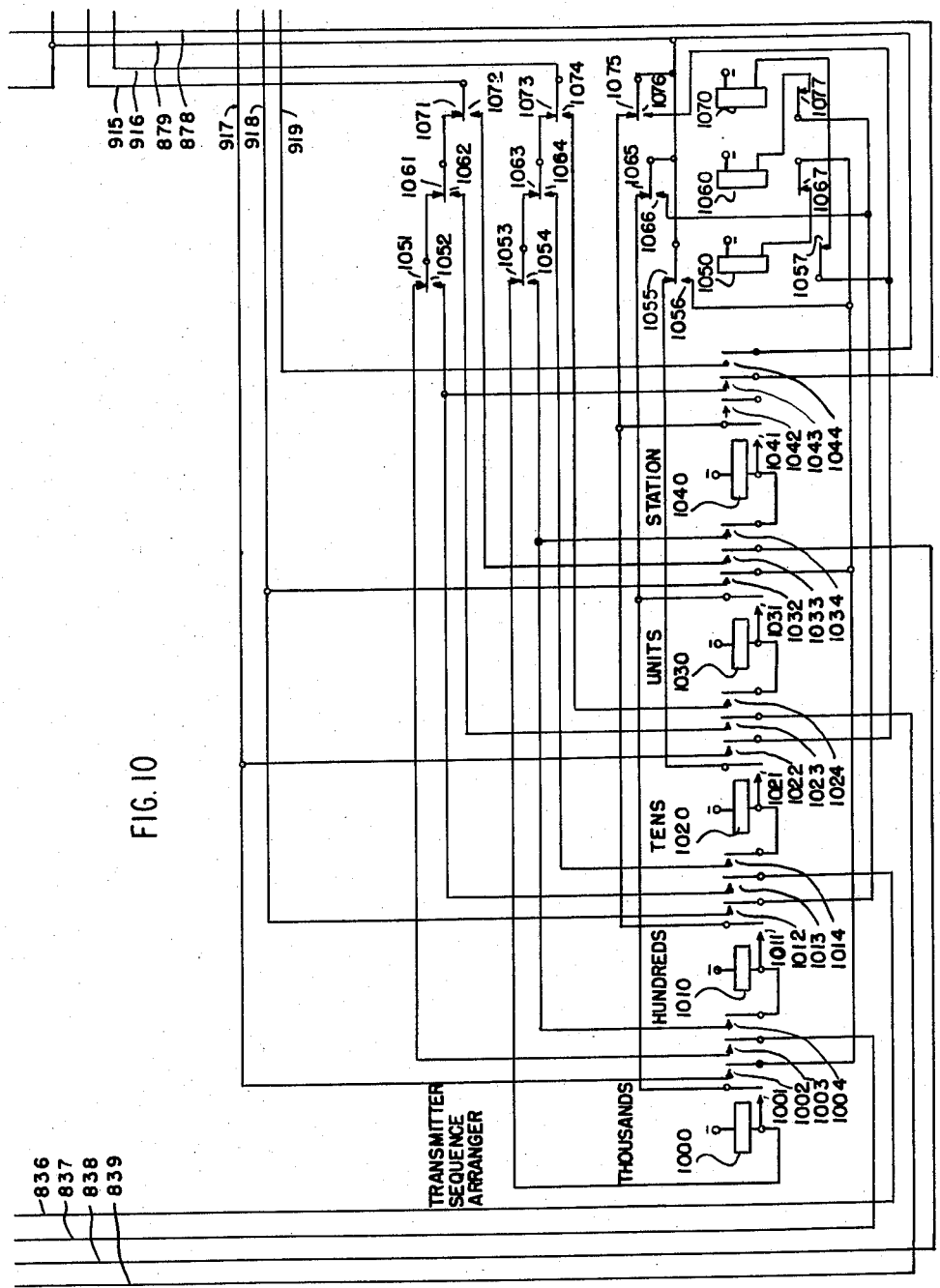

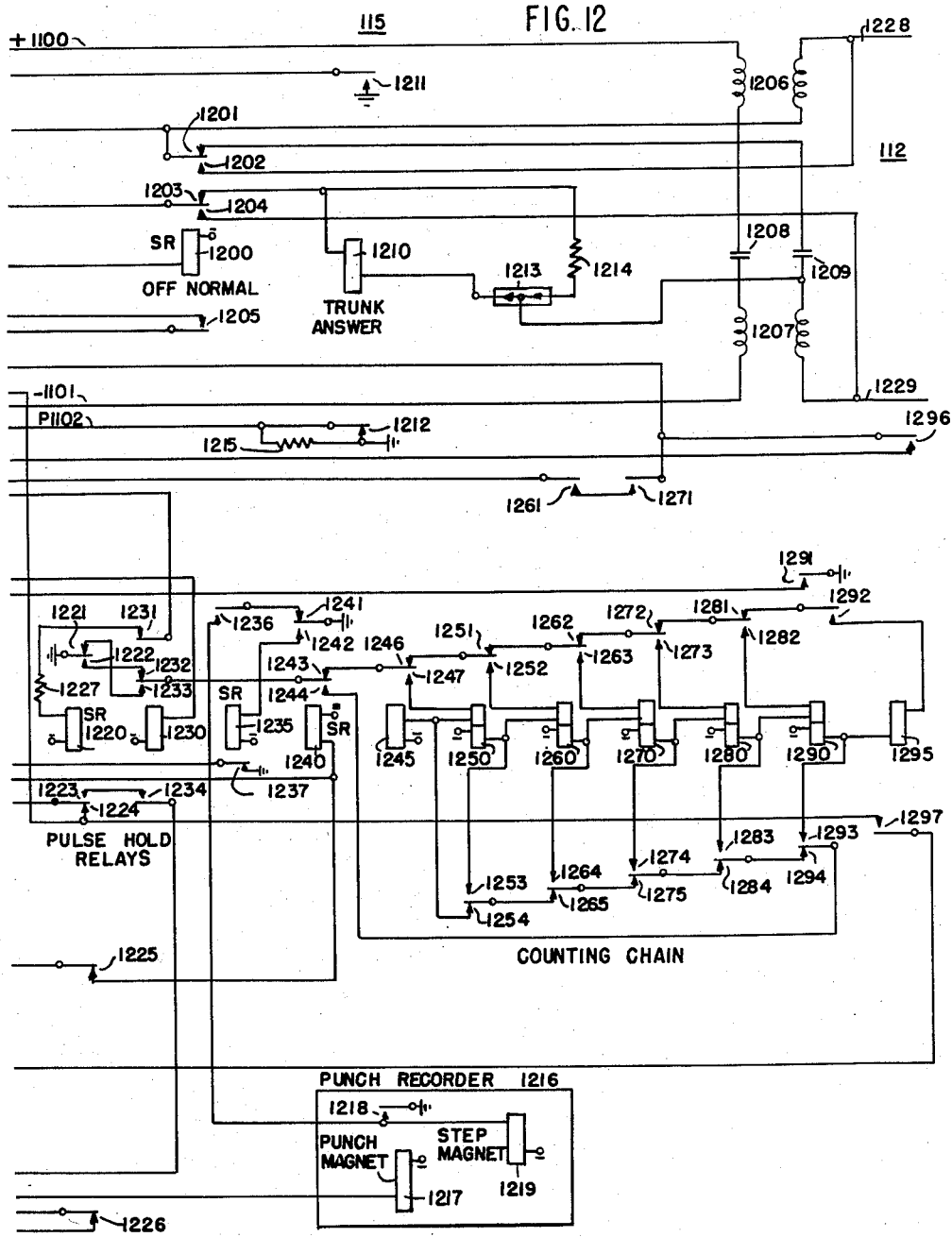

Feb. 3, 1959 A. OXAAL 2,872,519
AUTOMATIC TELEPHONE SYSTEM
Filed March 24, 1952 21 Sheets-Sheet 16
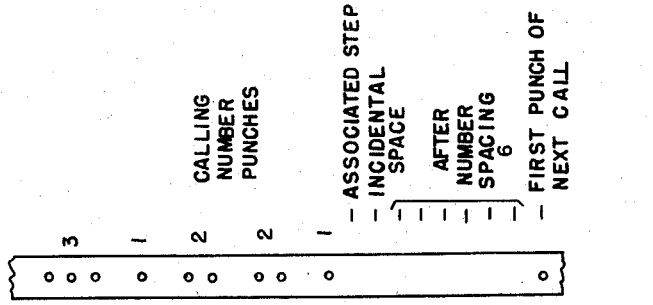
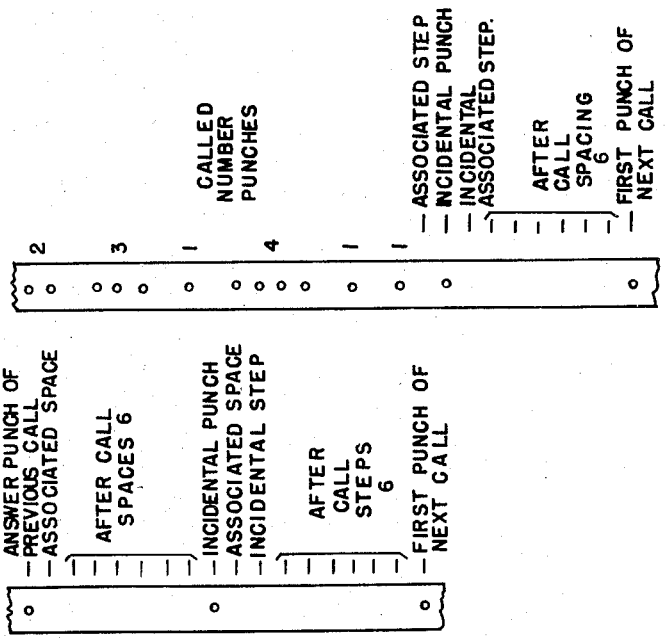
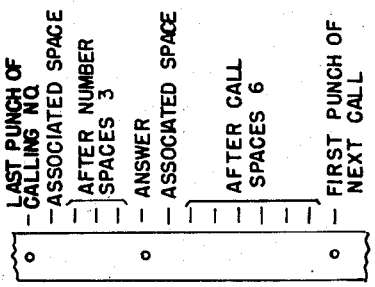
INVENTOR.
ARNE OXAAL
BY
ATTYS.

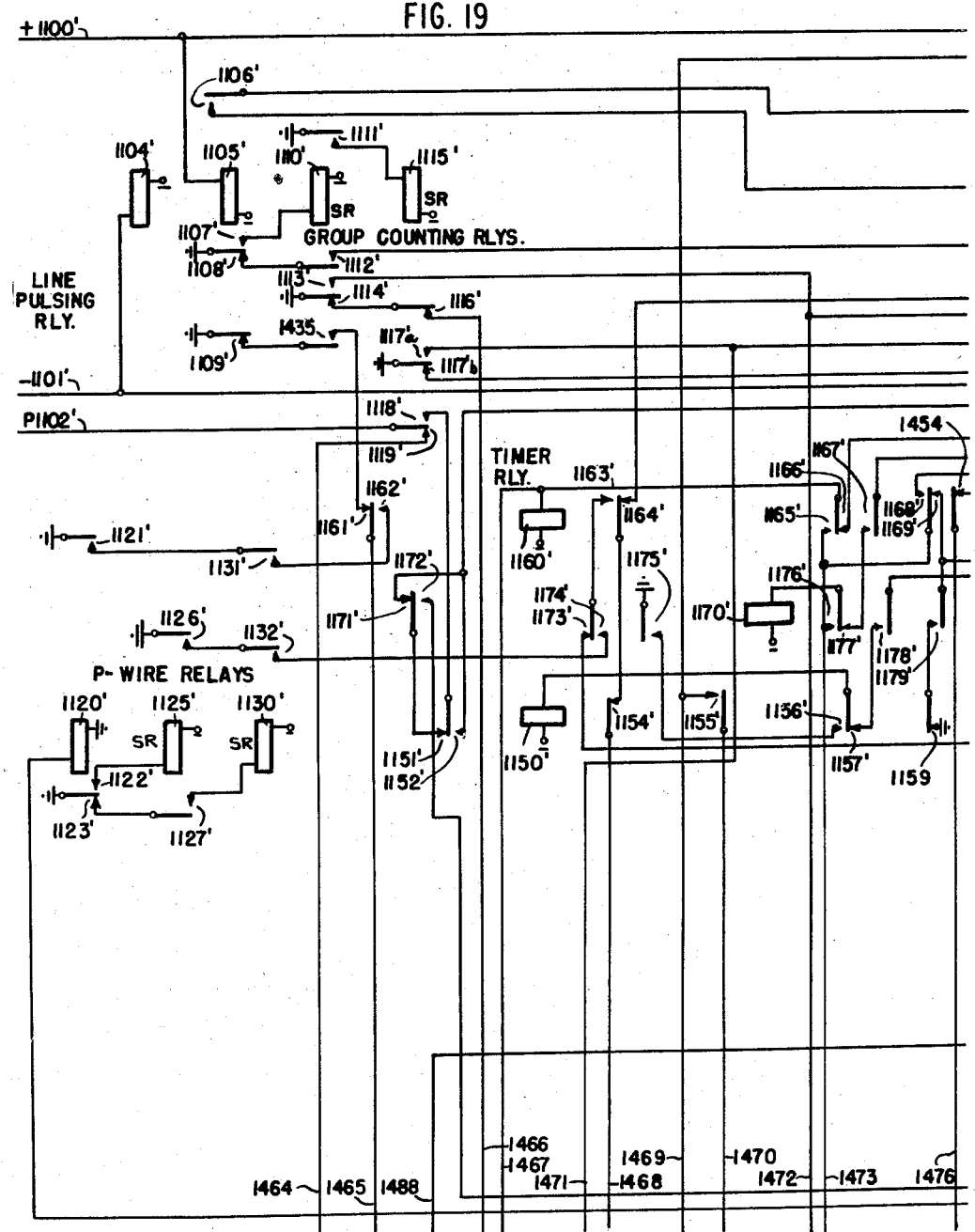

Feb. 3, 1959 — A. OXAAL — 2,872,519
AUTOMATIC TELEPHONE SYSTEM
Filed March 24, 1952 — 21 Sheets-Sheet 18

INVENTOR.
ARNE OXAAL

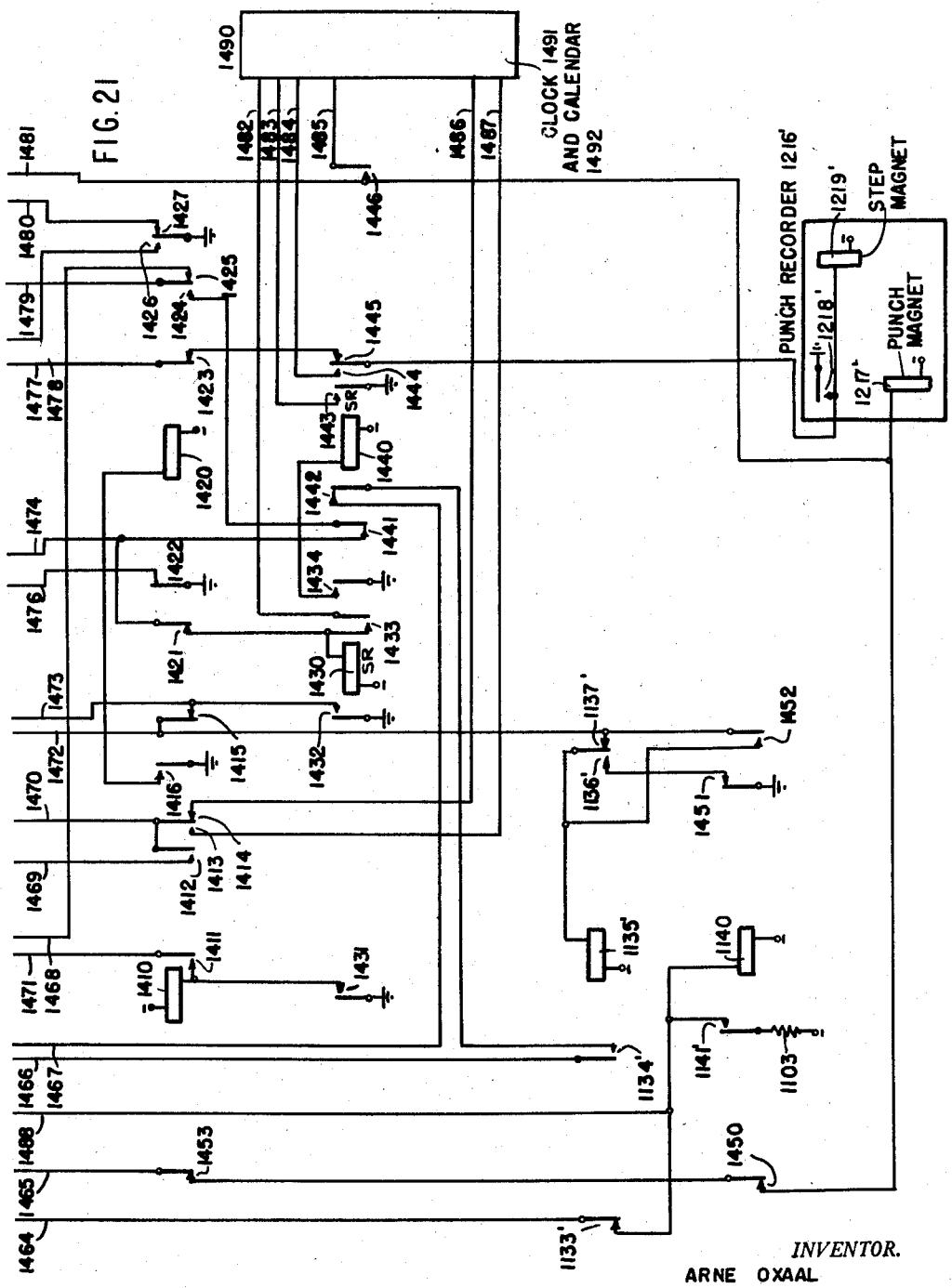

Feb. 3, 1959     A. OXAAL     2,872,519
AUTOMATIC TELEPHONE SYSTEM
Filed March 24, 1952     21 Sheets-Sheet 20

FIG.22

TAPE
→ PUNCH MAGNET, OPERATING STEP MAGNET, ADVANCES TAPE TO THIS POS.
→ SAME AS ABOVE
→ RELEASE OF 1240 & 1235 IN TRUNK ADVANCES TAPE TO THIS POS.
→ PUNCH MAGNET, OPERATING STEP MAGNET ADVANCES TAPE TO THIS POS.
→ SAME AS ABOVE
→ SAME AS ABOVE
→ RELEASE OF 1240 & 1235 IN TRUNK ADVANCES TAPE TO THIS POS.
→ PUNCH MAGNET, OPERATING STEP MAGNET ADVANCES TAPE TO THIS POS.
→ RELEASE OF 1240 & 1235 IN TRUNK ADVANCES TAPE TO THIS POS.
→ PUNCH MAGNET, OPERATING STEP MAGNET ADVANCES TAPE TO THIS POS.
→ SAME AS ABOVE
→ SAME AS ABOVE
→ SAME AS ABOVE
→ RELEASE OF 1240 & 1235 IN TRUNK ADVANCES TAPE TO THIS POS.
→ PUNCH MAGNET, OPERATING STEP MAGNET ADVANCES TAPE TO THIS POS.
→ RELEASE OF 1240 & 1235 IN TRUNK ADVANCES TAPE TO THIS POS.
→ PUNCH MAGNET, OPERATING STEP MAGNET ADVANCES TAPE TO THIS POS.
→ WITH 1160 OF TRUNK UP, 1240 & 1235 DRIVE EACH OTHER TO ADVANCE TAPE TO THIS POS.
→ SAME AS ABOVE
→ SAME AS ABOVE
→ 1120' OPERATING PUNCH MAGNET, OPERATES STEP MAGNET, ADVANCING TAPE TO THIS POS.
→ SAME AS ABOVE
→ SAME AS ABOVE
→ RELEASE OF 1130, 1240 & 1235 IN TRUNK ADVANCES TAPE TO THIS POS.
→ 1120' OPERATING PUNCH MAGNET, OPERATES STEP MAGNET, ADVANCING TAPE TO THIS POS.
→ RELEASE OF 1130, 1240 & 1235 IN TRUNK ADVANCES TAPE TO THIS POS.
→ 1120' OPERATING PUNCH MAGNET, OPERATES STEP MAGNET, ADVANCING TAPE TO THIS POS.
→ SAME AS ABOVE
→ RELEASE OF 1130, 1240 & 1235 IN TRUNK ADVANCES TAPE TO THIS POS.
→ 1120' OPERATING PUNCH MAGNET, OPERATES STEP MAGNET, ADVANCING TAPE TO THIS POS.
→ RELEASE OF 1130, 1240 & 1235 IN TRUNK ADVANCES TAPE TO THIS POS.
→ 1120' OPERATING PUNCH MAGNET, OPERATES STEP MAGNET, ADVANCING TAPE TO THIS POS.
→ RELEASE OF 1130, 1240 & 1235 IN TRUNK ADVANCES TAPE TO THIS POS.
→ CHAIN 8 SS BANK 4, POS.1, OF CALENDAR ADVANCES TAPE TO THIS POS.
→ PULSE OF CALENDAR ADVANCES TAPE TO THIS POS.
→ PULSE OF CALENDAR DRIVING PUNCH MAG. WHICH OPERATES STEP MAG. ADVANCES TAPE TO THIS POS.
→ SAME AS ABOVE
→ SAME AS ABOVE
→ SAME AS ABOVE
→ SAME AS ABOVE

CALLED NO.: 2, 3, 1, 4, 1
CALLING NO.: 3, 1, 2, 2, 1
MONTH, TENS & UNITS, DIGITS: 0

INVENTOR.
ARNE OXAAL
BY [signatures]
ATTYS.

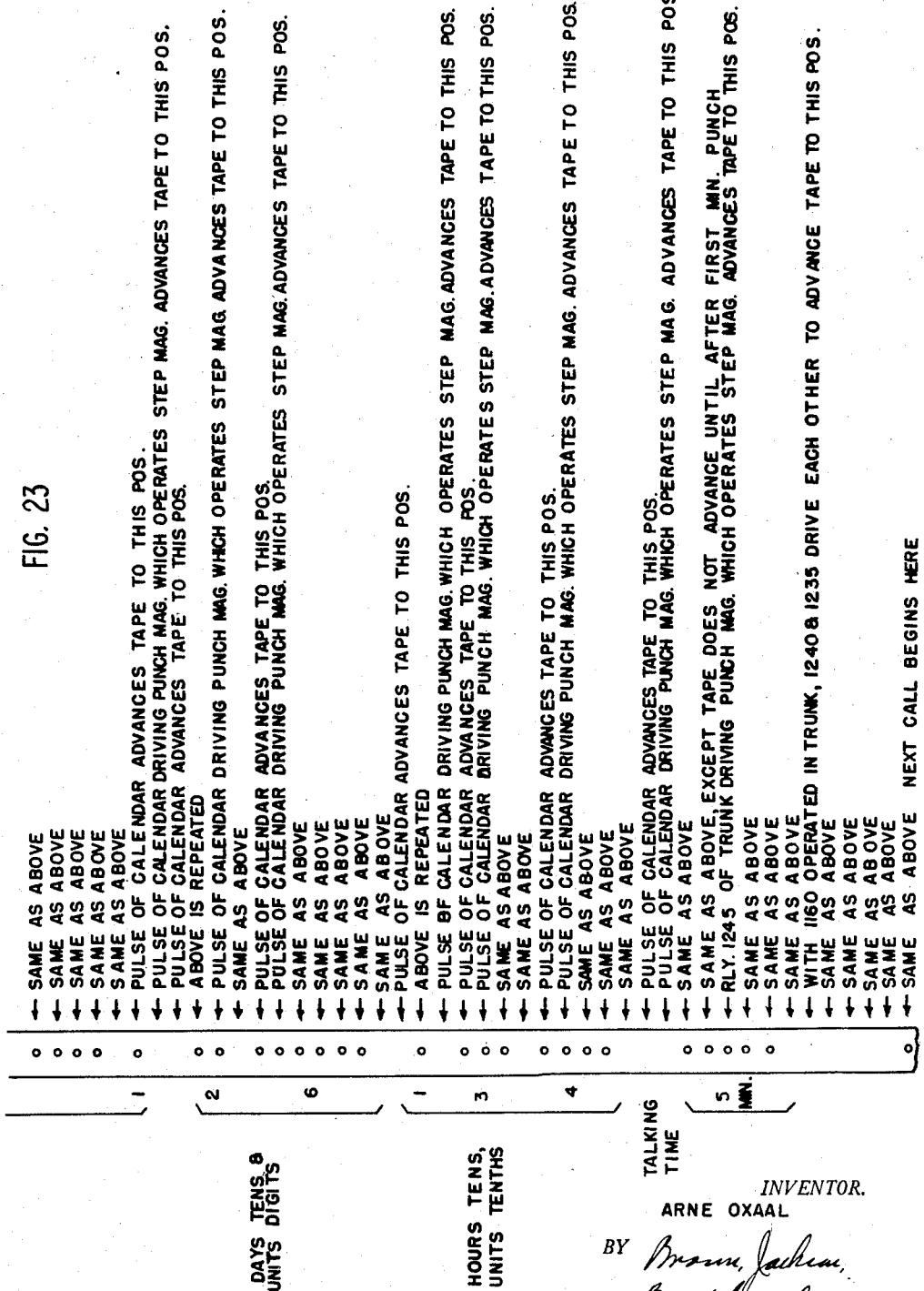

United States Patent Office 2,872,519
Patented Feb. 3, 1959

2,872,519

AUTOMATIC TELEPHONE SYSTEM

Arne Oxaal, Kenton, Ohio, assignor to North Electric Company, a corporation of Ohio Application March 24, 1952, Serial No. 278,242

42 Claims. (Cl. 179—8.5)

The present invention relates in general to automatic telephone systems, and in particular to an automatic telephone exchange having automatic toll ticketing service.

With the rapid development of the telephony art in recent years there has been a corresponding trend toward the use of dial and other automatic switching equipment in the field. Simplified maintenance and service problems, reduced operating expenses, and an improved type service (which is independent of the human error factor inherent in manual type exchanges) are but a few of the many features which have influenced such trend.

The provision of automatic equipment in an exchange enables telephone subscribers to establish calls to other subscribers in the exchange without the aid of an operator, and is one of the principal features of such type equipment. The provision of automatic equipment for use by the subscriber in automatically establishing connections to other nearby or distant exchanges is also desirable in an automatic exchange, but the provision of such type equipment in the field has heretofore proven somewhat difficult by reason of the many problems which are incident thereto.

For instance, in view of the added costs involved in the construction of line circuits to the nearby exchanges, and the continued maintenance expenses which arise therefrom, practical operation requires the limitation of the number of circuits which are constructed between the exchanges and the equipment must be placed on a restricted basis. Also, it is necessary, from a practical and equitable standpoint, to provide automatic means which are capable of recording each of these calls whereby subscribers can be taxed amounts proportional to the use which they make of the service.

While such arrangement is both practical and equitable, it is obvious that the setup requires supervision of all such connections established by the subscribers which, in most modern exchanges, means the provision of a considerable amount of special toll and trunk plant equipment, and manual switchboard installations and networks which require a twenty-four hour staff of operators along with the usual operator accommodations.

With the constantly increasing cost of providing these "short haul" services, the revenue of the operating companies has been gradually reduced and the companies have been forced to consider other plans and arrangements. One alternative has been to place the short-haul toll services on a free service dial basis. However, in such arrangement inconsiderate ones of the subscribers tend to usurp the available facilities for undue periods of time and unfavorable customer service results. Further, the cost of maintaining the toll service in such plan is inequitably distributed among parties who do not necessarily avail themselves of the facilities, and unfavorable customer reaction frequently develops.

Another attempted solution to the problem consisted of providing a type of arrangement known in the art as "dial back," wherein a call is established from one automatic exchange to an exchange having an operator office, and the operator then dials back over the trunk on which the call was received to complete the connection to the second automatic exchange. This procedure is expensive in toll line mileage as it holds a circuit to the operator office in addition to the one between dial exchanges. A modification which has been used to eliminate such disadvantage permits the operator to release the trunk to her office thereby leaving the connection established only between the two dial exchanges. With the operator released, however, it is not possible to time the call, and inconsiderate subscribers tend to carry on unnecessarily long conversations from which no corresponding revenue is derived. Time disconnect is frequently provided, but this again meets with adverse customer reaction.

The most satisfactory solution to the problem appears to be the provision of automatic equipment which is capable of providing the same form of supervision which is achieved by a manual operator, and it is the principal object of the present invention to provide such type of equipment. It is an ancillary object of the invention to provide equipment of this type which is comparatively simple in structure from the standpoint of installation and maintenance, economical in manufacture and field application, and of no added burden to the subscriber in the use thereof.

A feature of the invention is the manner in which the line finder-selector links in the exchange are adapted to automatically register the identification of the calling line and the party on the calling line with the initiation of certain types of calls, and to thereafter effect recording thereof for subsequent billing purposes.

A further feature of the invention is the manner in which each link is operative to effect transmission of the calling line number registered on the associated register means to the seized one of the trunk circuits over the interconnecting test or "P" wire, this being independent of the communication channel which is also established therebetween.

Another feature of the invention is the manner in which completely automatic line identification equipment and common selector controller equipment are rendered operative in a given exchange.

A further feature of the invention is the manner in which subscriber lines may be moved into a line hundred group which is different from the line hundred group to which they were assigned, while still retaining the assigned connector terminals and the directory number of the line. Ancillary to this feature is the manner in which registration of the actual calling party number is accomplished with the establishment of each toll call even though such cross connection exists.

Still another feature of the invention is the manner in which the registration of the calling number on the recording equipment may be accomplished at the same time the communication channel is being used by the called and calling parties.

Another feature of the invention is the manner in which the identification of subscribers on multi-party lines is accomplished through the means of individual apparatus associated with the dial phone which are rendered automatically operative with the initiation of a toll call without knowledge by the subscriber and which effect transmission of identification impulses concurrently and simultaneously with the transmission of the operating pulses to the seized one of the links. Ancillary to this feature is the manner in which the concurrently transmitted operating and identification impulses are absorbed and registered by the link equipment.

A feature of the identification registering equipment in each link of the exchange is the manner in which ten station register relays are adapted to register individual identification for as many as twenty different parties on a single subscriber line. Further applications and other uses of this novel registration equipment in the link may be had by reference to my copending application which was filed May 12, 1950, received Serial No. 161,677, and was assigned to the assignee of this invention.

Figure 11:
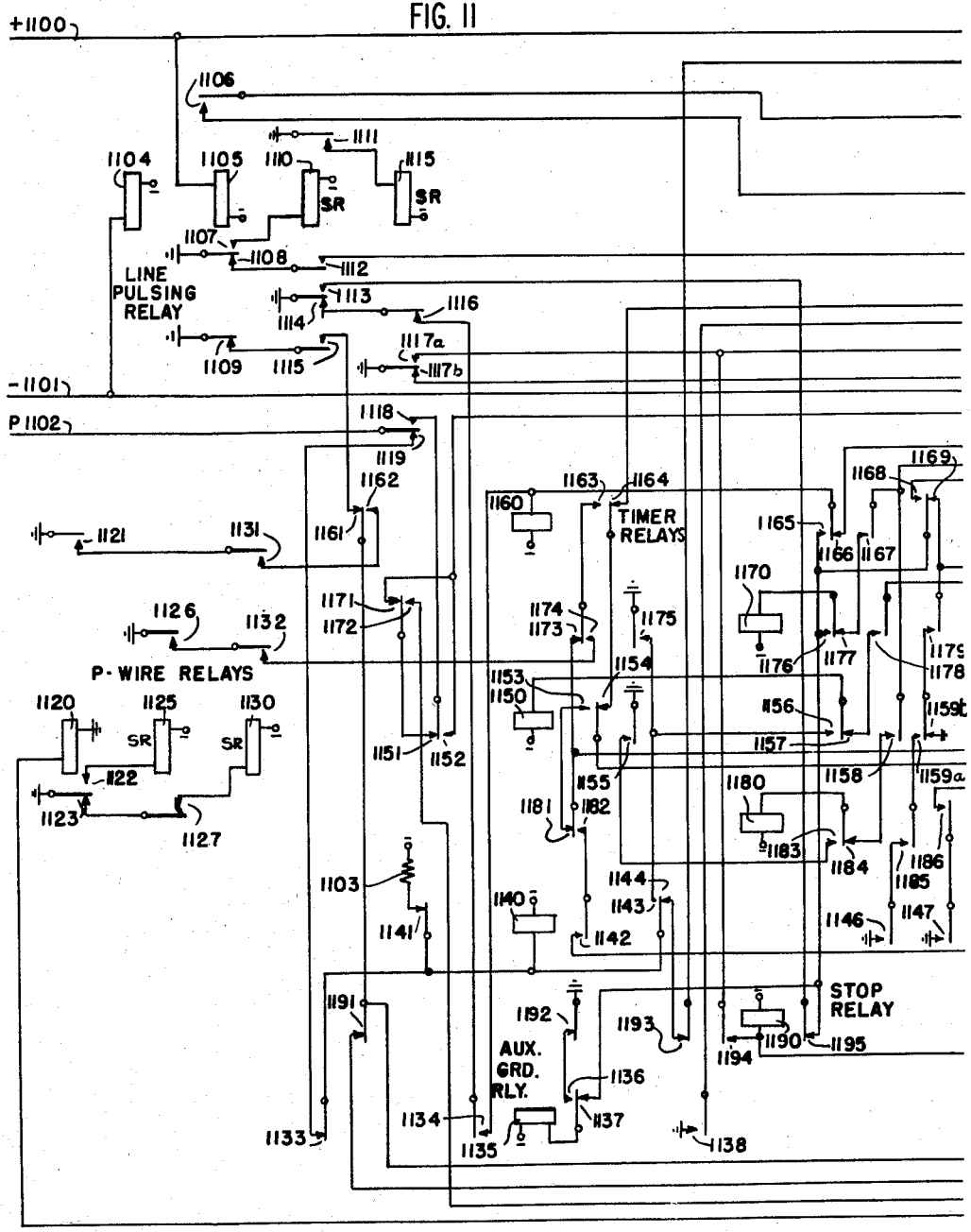
Figure 20:
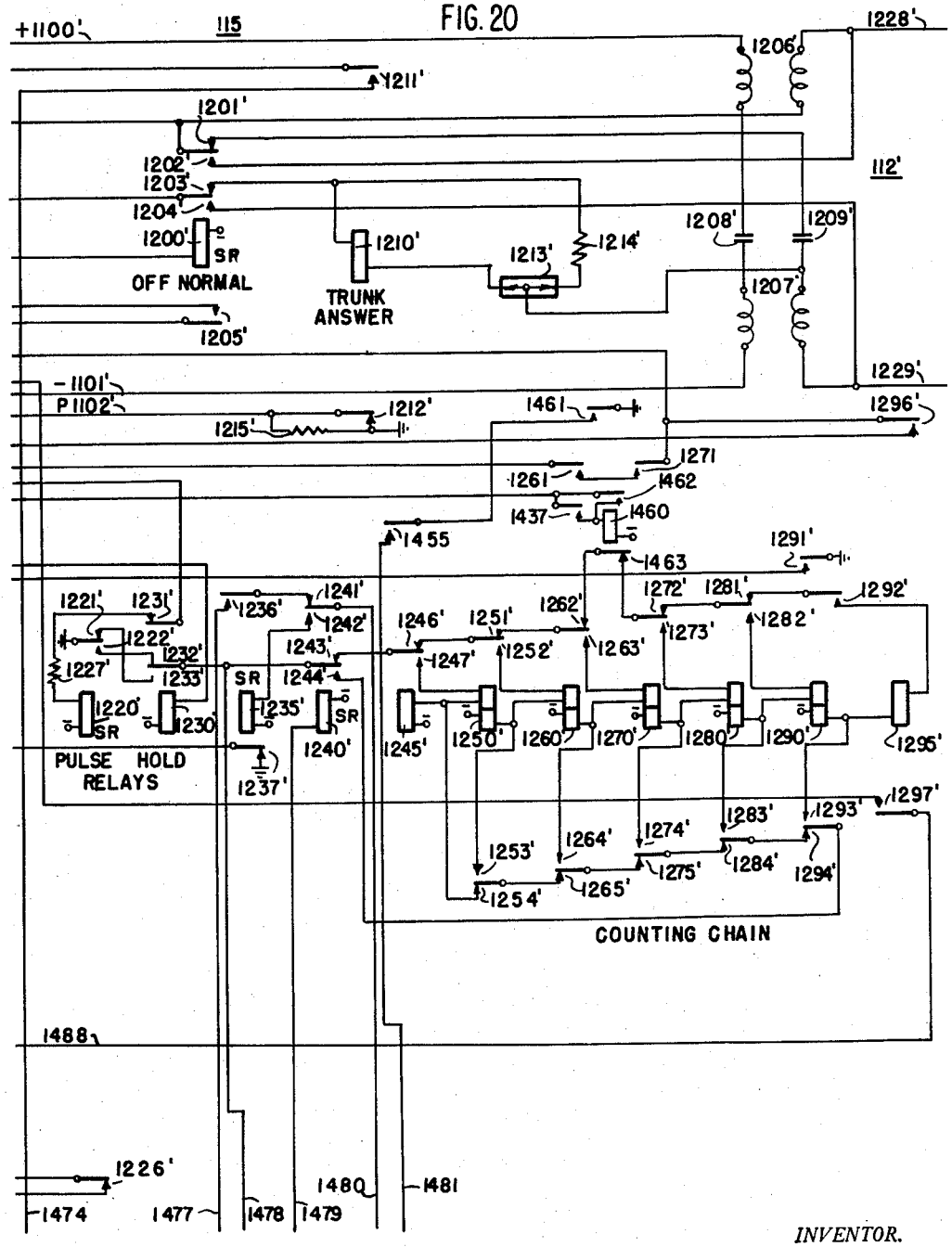

With reference now to the drawings and to the aforementioned copending application, other objects and features of the invention will be apparent therefrom when considered with the following specification and claims, in which:

Figure 1 illustrates in block diagrammatic form the manner of arrangement of the equipment as utilized in a first exchange A and the interconnection of that exchange with a second distant or "short haul" exchange B; in accordance with the invention, subscribers of exchange A may gain access to any desired subscriber in town B by merely dialing a preassigned digit (0) followed by the number of the desired subscriber, and the information concerning a call thus placed in automatically recorded on recorder equipment located in the effective one of the trunk circuits of exchange A;

Figures 2a, 2b and 2c are illustrative views of a dial adapted for use with the substations on multi-party lines in exchange A to provide identification to the link of the number of the party on the line as calls are established thereby;

Figures 2d, 3a, 3b, 3c and 4–12 when arranged in the manner of Figure 13 disclose in schematic form the details of the important switches used in town A in the provision of the described automatic identifications of the calling subscribers thereat, Figure 2d illustrating the modified dial of a multi-party line subscriber such as X, Figures 3a and 3b illustrating the line circuit and line finder equipment of link 124; Figures 4–7 illustrating the selector 130; Figure 3c illustrating the line identification board; Figure 8 illustrating the station register equipment; Figures 9 and 10 illustrating the transmitter means which transmit the information registered in the associated links such as 124 to the seized trunk; and Figures 11 and 12 illustrating one trunk of the invention;

Figure 14 is a chart illustration indicating the manner of arrangement of given cam members on the dials of the subscribers on a party line whereby subscriber identification for as many as twenty subscribers on a single line may be effected;

Figures 15 to 18, inclusive, are illustrative of the indications which will be recorded on the tape of the recorder equipment as a call is completed and also the nature of the recording effected should the call be released at various stages prior to completion of the call;

Figures 19 through 21, inclusive, illustrate schematically the circuit connections of a trunk circuit modified to include calendaring equipment; and Figures 22 and 23 are an illustration of the tape perforations effected in the completion of an exemplary call thereover.

It is to be understood that the illustrated arrangements are only exemplary of several embodiments of the invention and that numerous modifications and rearrangements thereof are possible without departing from the true spirit and scope of the invention.

OUTLINE

| | Columns |
|---|---|
| Introduction | 1 |
| General description | 5 |
| Directory numbering | 8 |
| Brief structural description | 9 |
| General operation | |
|   (a) Local calls | 10 |
|   (b) Reverting calls | 12 |
|   (c) Interexchange calls | 12 |
| Exchange structure | |
|   (a) Substations | 14 |
|   (b) Finder selector switch description | 17 |
|   (c) Trunk circuit description | 19 |
| Exchange operation | |
|   (a) Establishing a local call | 21 |
|     Line finder operation | 21 |
|     Selector operation on seizure | 23 |
|     Dialling operation | 24 |
|     Counting chain operation | 25 |
|     Selector guard relay operation | 29 |
|     Second selector and trunk allotter equipment | 30 |
|     Second selector allotter circuit operation | 30 |
|       Busy condition | 30 |
|       Seizure of an idle second selector | 31 |
|       Selecting called subscriber's line | 33 |
|   (b) Toll calls to subscribers in exchange B | 33 |
|     Trunk operation | 37 |
|     Transmission of called party number | 39 |
|     Tape spacing following registration of called number | 42 |
|     Initiating pulse from trunk to selector | 43 |
|     Transmission of calling party identification pulses by selector controller transmitting equipment | 44 |
|     Transmission of thousands digit | 45 |
|     Response of trunk circuit to receipt of the thousands digit | 47 |
|     Interdigital pause | 48 |
|     Transmission of hundreds identification digit | 50 |
|     Trunk response to receipt of hundreds digit (2) | 51 |
|     Interdigital pause | 51 |
|     Transmission of tens identification digit by selector | 52 |
|     Trunk response to receipt of the tens identification digit | 53 |
|     Interdigital pause between tens and units identification digit transmissions | 54 |
|     Transmission of units identification digit by selector | 54 |
|     Trunk response to receipt of units identification digit | 55 |
|     Interdigital pause between units and station identification digit transmissions | 56 |
|     Transmission of station identification digit by selector | 56 |
|     Response of trunk to receipt of station identification digit | 58 |
|     Tape spacing following receipt of calling party identification digit | 59 |
|     Trunk operation with answer by called party | 59 |
|     Intercall spacing | 60 |
|     Trunk release | 61 |
|     Selector release | 61 |
|     Release after incompleted call | 62 |
|     Release following dialling of called number but before answer by called party | 63 |
|   (c) Cross connection correction | 65 |
|   (d) Identification check circuits | 67 |
|     Ten-party system | 67 |
|     Twenty-party system | 69 |

|   | Columns |
|---|---|
| (e) Timed toll ticketing trunk | 73 |
| Complete automatic toll ticketing (trunk circuit 115') | 73 |
| Called party designation pulses | 74 |
| Calling party identification pulses | 75 |
| Answer | 76 |
| Timing of the call | 77 |
| Release after completed call | 79 |
| Release after incompleted call | 80 |
| Release before timer relay 1160' is operated | 80 |
| Release after the timer relay 1160' operates but before the calendar preparing relay 1430 operates | 81 |
| Conclusion | 81 |
| Claims | 82 |

GENERAL DESCRIPTION

Referring now more particularly to Figure 1 of the drawings, the telephone system shown thereat in schematic form comprises a first community exchange 110 including automatic switches of the all relay type, and a second exchange 111 including automatic switching of the mechanical type; it being understood that the second change may also be of the all relay type illustrated in the first exchange if so desired. The exchanges 110 and 111 are illustrated as being disposed in adjacent towns A and B respectively and as being interconnected by a group of "short-haul" trunk lines, such as shown at 112 and 113. Each of the trunk lines terminates in an incoming and outgoing trunk repeater circuit, such as illustrated at 114 and 117, and 115 and 116 respectively.

A plurality of subscriber lines, two of which are shown at 118 and 119 in Figure 1, are connected to the exchange switching equipment. The lines 118 and 119 are illustrated as being of the multi-party type in which as many as twenty different parties, such as the illustrated parties W and X, may be connected to each given line. According to a feature of the invention, as a party on a multi-party line initiates a call the equipment is automatically operative to identify the calling party, to immediately distinguish the calling party from the other parties on the line, and to automatically effect the registration of the calling party number on the register equipment. For simplicity of disclosure only two of the multi-party connections on a line are shown in the drawings. Selective ringing on party lines may be accomplished by the well-known bridged ringing, divided ringing, and ground return methods. Other subscriber's lines terminating at the exchange may comprise the well-known single party type line.

Each of the subscribers is provided with a substation set having dial apparatus associated therewith for selectively operating the automatic switching of the exchange to establish connection with desired ones of the subscribers in the exchange, and with subscribers in distant exchanges which are accessible thereto over the trunk circuit equipment. Those parties connected to a multi-party line, such as illustrated subscribers W, X, Y and Z have dial apparatus associated therewith which is modified to include a secondary impulsing means, whereby with the initiation of a call to a desired subscriber in an associated distant exchange such as a subscriber in town B an identification signal is transmitted which is indicative of the particular position of that subscriber on the multi-party line. As pointed out heretofore the line is identified as soon as the calling party lifts his receiver. The nature and operation of this equipment is described in more detail hereinafter.

Each of the subscriber lines, such as 118, in exchange 110 terminates in an individual line circuit such as 120 through which access is gained to a plurality of finder-selector links such as that illustrated at 124 and 125. Each group of finder selector links, such as 124, is assigned to serve a given group of one hundred subscriber lines, such as illustrated line 118, approximately 10 to 15 links being assigned to serve one hundred subscriber lines in an exchange having normal traffic conditions. The line circuit 120 for line 118 is associated with a line guard circuit 122 through which it is connected to a contact spring of a line finder switch such as 126 and the contact springs of a link first selector switch such as 130. Line finder switch 126 and first selector 130 are connected together by link lines to form a finder-selector link 124 which includes conventional line-finder selector-allotter circuit 127, a first selector guard circuit 132 and a second selector trunk allotter circuit 134. The finder selector link such as 124 is operative as seized by a line circuit, such as 120, to prepare for the extension of the connection to further switches in the exchange and to effect such extension with the transmission of the first digit by the dial of the calling party.

Each line finder selector link, such as 124 and 125, includes an identification board 124' through which the directory number of the calling line is automatically registered with the initiation of a call thereover. The selector equipment, such as 130 of each link, such as 124, includes station register apparatus 130' which is operative to register the station position of a subscriber on a multi-party line simultaneous with the initiation of a call to a predetermined group of subscribers over the selector equipment (the predetermined subscribers in the present embodiment being subscribers in the distant exchange B). The station register equipment 130' cooperates with the identification board 124 to provide complete identification of each calling party whenever said predetermined calls are established thereover and is temporarily retained in the link equipment 124 pending further extension of the call in the exchange.

The link equipment 124 also includes selector-controller equipment, illustrated generally at 160, which is associated with a group of preassigned first selectors, such as 130. The selector controller equipment 160 basically comprises a grouping of the operating members of the conventional selector which are normally used only in the establishment of a call, and which are non-functional once the connection is established. Each selector controller, such as 160, is common to a plurality of selectors, such as 130, whereby a minimum of equipment is required. Thus as a call is established by a party on line 118 over the link 124, the members in the selector-controller equipment 160 associated with the group of first selectors including the illustrated selector 130 of link 124 are rendered operative to establish connection over selector 130 to the particular group of subscribers designated by the first digit received from the dial of the calling party. The selector controller restores immediately after the calling line has been extended to the regular second selector on a call to a local line, immediately after the seizure of a second special selector on a call to the long distance operator, and immediately after the transmission of the calling party's number to the trunk equipment on a ticketed toll call and is made available to the other selectors of the associated group.

The station register apparatus 130' which registers the identification of the calling party on a multi-party line and the signalling means for transmitting the calling party directory number as registered in the link to further equipment in the exchange, is a part of the selector controller equipment 160 in the present example, it being understood that each selector could have individual station registering means.

The number of selector switches, such as 130, assigned for use with a given selector controller unit such as 160 will vary in accordance with the nature of the traffic conditions in the exchange, a reasonable number for an exchange installation having normal traffic being in the order of three to five selectors per controller unit.

The number of links such as 124 and 125 which are required for satisfactory service will depend upon the number of incoming and outgoing trunks which are connected in the system, taking into account the character of the exchange and the normal volume of telephone traffic experienced in exchanges of equivalent sizes. In an installation adapted to serve 1500 subscribers and 30 trunk lines, for instance, 150 links have proven to be adequate in the provision of satisfactory service in many localities.

The finder selector links, such as 124 and 125, may have access over a number of assigned levels to a series of second selector switches, such as indicated generally at 136, these in turn having access to a series of connector switches, such as 139 and 140, for automatically completing local calls between the subscribers of exchange 110. Thus, in establishing a call between local subscribers, such as X and Y in exchange A, the first digit dialed by the subscriber will operate the first selector to select the indicated level which thereupon extends the call to the group of second selectors, such as 136, associated with that level. The second selector, such as 136, will respond to the second digit dialed and extend the call to a connector switch such as illustrated at 139, which responds to the third, fourth and fifth digits as dialed to extend the call to the substation of the desired subscriber.

In the present arrangement the tenth level of the finder selector link, such as 124 and 125, is assigned to provide communication service to a remote exchange such as indicated at town B, access being had over outgoing trunk equipment, such as illustrated at 115 and 115'.

The outgoing trunk equipment such as illustrated at 115 or 115' are adapted to record for subsequent billing purposes, the information concerning each call which is established thereover. The trunk may be of several modifications, the first modification being shown in Figures 11 and 12. The equipment illustrated there is operative to record the calling and called number of each call which is extended over the trunk equipment as well as information as to the completion or non-completion of the call. In such arrangement the calls are billed on a flat rate basis, that is, a specified toll is charged for each call which is established thereover regardless of the time of the call. If desired, time disconnect equipment may be included to limit the length of the calls established over the trunks, such modification being obvious to parties experienced in the field.

In the outgoing trunk 115' of the second embodiment, as shown in Figures 19, 20 and 21, the equipment is adapted to record the directory numbers of the calling and called parties, and the month, day, time of day and the length of the conversation of each call which is established over the trunk. In such arrangements the calls are billed on a time expiration basis. As will be brought out in more detail hereinafter, the connection extended to the trunk equipment, such as 115', by a link such as 124, in the establishment of a call to a distant exchange comprises a three conductor connection wherein two of the conductors are utilized as a communication link and the third conductor is utilized as a test conductor. In accordance with a feature of the invention the selector controller equipment, such as 160, associated with the first selector group, such as 130, is operative following transmission of the called party number over the trunk to transmit the information registered on the identification board, such as 124' of the link 124 to the seized trunk, the information being transmitted in the form of impulses over the test conductor to the outgoing trunk independent of the talking conductors.

From the foregoing it is seen that the subscribers in exchange A may gain access to subscribers in exchange B by merely removing the handset from the local substation and dialing the digit "0" followed by the digits of the desired subscriber, the recorder equipment in the trunk effecting the automatic recording for subsequent billing purposes of the directory number of the called and calling parties.

Subscribers, such as subscriber R in exchange 111, may gain access to subscriber lines such as W, X, Y or Z, in exchange 110 over conventional mechanical switching units including line circuit 148, line finder 149, selector 151, an operator's position 152, an outgoing trunk circuit 117, an incoming trunk line 113, an incoming trunk repeater 114, an incoming selector shown at 141, a second selector, such as 136, and a connector such as 139 and 140. Calls extended from town B to town A are tabulated by the operator as completed thereby. Exchange 111 at town B is illustrated as comprising mechanical switching units and as having access to subscribers of exchange A over an operator's position for purposes of simplicity in disclosure, it being understood that any other conventional type exchange equipment (including that of the disclosure) may be adapted for interconnected use with the novel exchange arrangement of the invention.

DIRECTORY NUMBERING

The directory numbering of exchanges, such as shown in block form at town A and town B in Figure 1, will vary with the number of lines in the exchange required to provide adequate service for the town subscribers. For purposes of disclosure the exchanges of town A and B are assumed to have directory numbers of five digit values; it being understood that the equipment is not limited in its use to systems having directory numbers of a five digit value.

With the extension of a local call in exchange A, as for example, from substation "W" to substation "Y" the first selector switch will respond to the first or "thousands" digit of the directory number dialled, the second selector switch will respond to the second or "hundreds" digit, and the connector switch will respond to the third, fourth, and fifth digits of the directory number to complete the call to the desired party.

A convenient assignment of directory numbers in a ten-party system and in a twenty-party system will now be set forth.

(A) TEN-PARTY SYSTEM

In a ten-party system which includes first selectors, second selectors and connectors and in which a five digit directory number assignment is used, the first digit of the number dialled in extending a call will operate the seized one of the first selectors and the ten digits available may be assigned to make the following selection. For example, Digit 1 may be assigned to reach information, repair trunks and long distance operator (Code 110)
Digit 2 may be assigned to reach the two thousands group of lines
Digits 3 to 8 to reach the three to eight thousands group of lines
Digit 9 to reach free service trunks
Digit 0 to reach toll trunks Thus digits 1 to 9 will select levels for local calls and local switch operations and free service trunks and digit "0" is reserved to toll trunk use.

On local calls the second digit dialled is extended to a second selector associated with the seized level. In a conventional arrangement the second selectors are operative to seize the hundreds group of lines corresponding to the incoming digit. For example with receipt of Digit 1 the one hundred group of lines is selected
Digit 2 the two hundred group of lines is selected
Digits 3 to 0 etc.

The connector switch of the group seized by the second selector may be arranged to respond to the third, fourth, and fifth digits dialled in the extension of a local call as follows:

(1) The third digit dialled seizes the corresponding ten group of lines, that is, digit 1 will reach the ten group of lines, digit 2 will reach the twenty group of lines, digits 3 to 0 etc.

(2) The fourth digit dialled will effect selection of the corresponding line, that is digit 1 selects line 1, digit 2 selects line 2, digits 3 to 0 etc.

(3) The fifth digit dialled will effect selection of the corresponding station, that is digit 1 selects station 1 of the selected line, digit 2 selects station 2 of the selected line, digits 3 to 0 etc.

(B) TWENTY-PARTY SYSTEM

In a twenty party system involving first selectors, second selector, and connector switches, the first digit dialled operates the first selector, and the ten digits available may be assigned to make the level selections set forth heretofore relative to the selections by the first digit in a ten party system. The digit "0" is again reserved for toll trunk calls.

The second digit dialled on local calls in a twenty party system selectively operates the seized second selector and may be assigned to effect selections in the following manner:

Digit 1 selects the first hundred group of lines; stations 1 to 10.
Digit 2 selects the first hundred group of lines; stations 11 to 20.
Digit 3 selects the second hundred group of lines; stations 1 to 10.
Digit 4 selects the second hundred group of lines; stations 11 to 20.
Digit 5 selects the third hundred group of lines; stations 1 to 10.
Digit 6 selects the third hundred group of lines; stations 11 to 20.
Digit 7 selects the fourth hundred group of lines; stations 1 to 10.
Digit 8 selects the fourth hundred group of lines; stations 11 to 20.
Digit 9 selects the fifth hundred group of lines; stations 1 to 10.
Digit 0 selects the fifth hundred group of lines; stations 11 to 20.

The third and fourth digits as dialled in a twenty party system to effect a local call will operate the connector in the manner of the third and fourth digits of the ten party system. The fifth digit, however, will be effective in a twenty party system in accordance with the value of the second digit which was dialled, that is, digit 1 as the fifth digit will reach station 1 or 11; digit 2 will reach station 2 or 12; digit 3 will reach station 3 or 13; digit 4 will reach station 4 or 14; digit 5 will reach station 5 or 15; digit 6 will reach station 6 or 16; digit 7 will reach station 7 or 17; digit 8 will reach station 8 or 18; digit 9 will reach station 9 or 19; digit 0 will reach station 10 or 20; depending upon the value of the second digit dialled. Thus directory number 32924 in a twenty party system is the number of the fourteenth subscribers substation on line 3192.

BRIEF STRUCTURAL DESCRIPTION

In each hundred group of lines, line numbers are assigned to the lines in the following order, 10–19; 20–29; 30–39; 00–09. The relays and wiring of the switchboard however are arranged so that the lines with units digit 1 are the first in their respective ten groups and lines with unit digit 0 are the last.

Each tens relays in the line finder has thirty-six make contacts and each units relay has six make contacts, operated when their respective associated relay coils are energized. Each ten line group is connected to the lever contacts of its associated tens relays in all line finders. Inasmuch as there are three wires per line within the exchange, namely, two talking wires, positive and negative, and one test wire (P) the tens lines occupy thirty contacts of the tens relays.

The corresponding thirty make contacts are multiplied from one tens relay to the next in the same line finder, and finally connected to the contacts of the units relays. Each set of three wires leads to a different units relay. Thus of all the lines in the hundred line group only ten are connected to the units relay of a line finder when a tens relay is operated, and of these ten lines, only one is selected when a units relay is operated.

If it is desired to ascertain which line is calling over a certain line finder, it is only necessary to find which tens relay and which units relays are operated in the line finder their designations giving the number of the calling line, for example, line 21 is selected by the operation of the second tens relays F20 and the first units relay F1. Such arrangement is basic in the provision of a novel simple type party identification as shown in more detail hereinafter.

The dial of each party line subscriber substation in the exchange includes an identification cam which corresponds to the position of the subscriber on a party line. The stations may be identified in various manners, one novel manner of arrangement being set forth herein for exemplary purposes. Briefly for identifying stations 1 to 10 on a given line, each of the dials units are provided with an identification cam having an extension on the outer periphery thereof which corresponds with its assigned station number. With reference to Figure 2b which illustrates a rear view of the dial, it is observed that on a ten-party line, the subscriber at station 1 will have an identification cam having an extension at position 1; station 2 will have an extension at position 2; stations 3 to 10 etc., it being noted that the dial is wound up in a counterclockwise direction as viewed from the rear and that the extensions on the identification cam are located for registration of the party when the digit "0" is dialled.

On a twenty-party line, stations 1 to 10 may be identified as above and stations 11 to 20 may have identification cams having two extensions each. It is to be understood that various combination arrangements may be provided by varying the relative positions of the extensions and that, the following arrangement is merely one example thereof.

*Extensions on identification cam*

Station 11—positions 1 and 7.
Station 12—positions 2 and 7.
Station 13—positions 3 and 7.
Station 14—positions 4 and 7.
Station 15—positions 5 and 7.
Station 16—positions 6 and 10.
Station 17—positions 7 and 10.
Station 18—positions 8 and 10.
Station 19—positions 9 and 5.
Station 20—positions 10 and 5.

The function of the extension members in transmitting special pulses to effect identification of the calling station will be disclosed more fully hereinafter.

GENERAL OPERATION

(A) LOCAL CALLS

The operation of the system switches in extending a call as initiated at any one of the telephone substations in exchange 110 to another of the telephone substations in exchange 110 is briefly set forth hereat. In extending a call between local subscribers, as for example, between stations W and Y the subscriber at telephone substation W on line 118 removes his receiver from the switch hook in the conventional manner and dials the assigned directory number of Y which comprises a thousands digit, a hundreds digit, a tens digit, a unit digit and a code or frequency selecting ringing digit.

With removal of the receiver from the switch-hook the line circuit 120 responsively operates a finder-selector link, such as 124, which has been previously assigned by a common link selector allotter, such as 127, to seize the calling line 118. The line finder guard circuit 122 operates to prevent other lines from passing calls through until the instant call has passed through to the link whereby protection against simultaneous connection of two or more lines to the same link is provided.

As in all conventional arrangements there are fewer links than calling lines, and accordingly the calling lines may be connected over any one of a plurality of links such as the one illustrated at 124.

Assuming that link equipment 124, comprising line finder 126 and first selector 130, is assigned by the link distributor 127 to set up the connection, the tens and units relays in the finder switch 126 of the link operate to select the calling line 118 and to connect it through to the conductors of the selector switch 130 of the link. When the calling line 118 is seized and extended by way of finder switch 126 to the associated selector switch 130, it is marked as busy in all of the other connector switches of the links. The selector control equipment 160 which is common to link 124 (and several other links not shown) is conditioned for operation with selector 130 and the line finder guard circuit is freed in preparation for another call.

Such operation may be best illustrated by assigning a directory number to the called party Y, and tracing such call through the switching units. Assuming, therefore, that the called substation Y has a directory number of 71126 (station 6), a subscriber W may extend a connection to subscriber Y by lifting his receiver and dialling such directory numbers. Upon automatic extension of the call to the selector 130 of the operative link 124 as above described, dial tone is transmitted over the connection to the calling party W to indicate to the subscriber W that the directory number may now be dialled. As the subscriber W dials the directory number 71126, the selector switch 130 responds to the impulses of the thousands digit (7) by selecting one of the seventh group of thousand lines to extend the call over an idle allocated one of the second selectors in the seventh group, such as the selector shown at 136. Assuming that the illustrated second selector 136 is idle, and is selected by the first selector 130 of the finder selector link 124, as the hundreds digit (1) is now received over the connection from the calling substation, the second selector switch 136 is responsively operated to select an idle one of the first group of connector switches, such as 139.

Assuming the illustrated connector switch 139 is idle and is selected from this group by the second selector 136, the connector switch 133 will respond to receipt of the tens digit 1 to select the first group of ten lines, which includes the called line 7112. Thereafter, and in response to the dialing of the units digit 2, the called line designated 119 on the drawing (directory number 7112) is selected by the connector from the selected group of ten lines. When the called line has been thus selected, the control apparatus included in the connector circuit functions to test this line for the purpose of determining the busy or idle condition of such line. In the event that the called line is busy, busy tone current is applied over the connection to indicate to the party at the calling substation W that the desired connecion wih the subscriber Y cannot be completed at this time.

Should the called line 119 be idle at the time of selection, the code selecting or ringing digit, which in this case is digit 6, will cause a selected coded or selected frequency ringing current, (which code or frequency is assigned to subscriber Y), to be applied to the side of the line to which the ringer of the telephone substation Y is connected. During the ringing operation, ring-back tone current is applied to the calling line to indicate to the calling party at substation W that the substation Y is being signalled.

The connection between the calling and the called telephone stations is completed on answering of the call at the called telephone station Y. The link circuit apparatus is such that the link utilized in setting up the desired connection is released only when the connection is cleared at the calling one of the telephone stations, which in this connection is substation W. The first selector controller circuit 160 however is released as the calling line is extended to the second selector.

(B) REVERTING CALLS

The switching apparatus located in exchange 110 may also be utilized in setting up a connection between two telephone stations connected to the same subscriber line, as for example W and X, the sole purpose of operation of the apparatus in such application being to apply ringing current of the proper code or frequency to the mutual lines of the subscribers. In setting up a connection of this nature, the call is initiated over the line equipment in the manner heretofore described.

Following the dialling of the digits of the directory number of subscriber X by subscriber W, the calling party W replaces his receiver upon its switch-hook, whereupon the finder and selector switches of the operative link, are released, the connector switch only remaining operative and ringing current of the selected code or frequency corresponding to the called telephone station X is applied to line 118. As the call is answered by the subscriber at substation X, the operated connector is released, and the line circuit 120 is operated to make line 118 busy to the links to thereby prevent seizure of the line by a connector switch in the event of extension of another call to one of the telephone substations on line 118.

A reasonable time after the calling party has restored his receiver, the receiver is again removed from its switch-hook and the connection with the dialled party is completed. The line circuit 120 is released when the connection is cleared at the calling and called telephone station W and X respectively.

(C) INTEREXCHANGE CALLS

In the extension of calls to the distant exchanges, such as the remote exchange shown at town B, special equipment in the exchange at town A is operative to automatically register the number of the calling and called parties as well as the time duration of the call for billing purposes. As previously indicated herein, the dial equipment at each of the party substations are equipped with special cam extension members for transmitting a pre-assigned identification code for registration whenever the party dials trunk digit "0" to obtain an interexchange trunk. The selector controller equipment 160 is operative to register the received identification pulses as the trunk code digit "0" is dialled and ticketing equipment in the exchange (preferably located in the trunk equipment), is operative as the called number is dialled to record such number and is subsequently operative to record the calling subscriber's full directory number as transmitted by the selector controller equipment a short interval after completion of the dialling operation.

In brief detail, in establishing an interexchange call a subscriber, such as W, in extending a call to a subscriber, such as R in exchange B, initiates the call in the conventional manner by removing the receiver in his substation unit, whereupon the line circuit 120 is operative to seize an associated line finder-selector link, such as 124, and prepares such link for receipt of impulses from the subscriber's substation dial in the manner described heretofore in considering the extension of a local call.

As the subscriber now dials the trunk code digit "0," ten operating impulses are transmitted over the finder-selector link 124 to operate the seized first selector switch 130 to the tenth level. Assuming that the directory number of the calling party W is 32124, the dial of his instrument will be equipped with a cam member (Fig. 2b) which is operative to transmit an identifying impulse during the break period of the fourth pulse of the ten operating impulses transmitted, such identification pulse comprising the application of ground to the negative line wire.

As the selector is operated to the tenth level, a signal is transmitted to the trunk guard circuit 132 to indicate that the selector is seeking an idle trunk to thus guard against simultaneous seizure of the same trunk by two selector switches. The trunk selection allotter relays 134 of the selector 130 thereupon test the trunks as to idle and busy condition, and in conjunction with the trunk guard circuit 132, select one of a group of outgoing trunks such as 115. Assuming trunk 115 is in the idle condition the selector 130 extends the calling line 118 to the trunk 115 and effects release of the trunk selection circuit 134.

As the calling party subscriber now dials the directory number of the desired party, the number is automatically registered on the recorder equipment 165 associated with the trunk circuit 115 simultaneous with its repetition by the trunk repeater over the trunk line to the distant exchange at town B. The switching equipment at town B responds to the received impulses to effect the selection of the desired party, such as R.

As the recording of the called party directory number is completed, the trunk equipment is operative to momentarily interrupt a control circuit to the selector controller equipment 160 to initiate the transmission thereby of the calling party identification directory number as recorded thereat.

The transmission of the recorded calling number by the selector controller circuit 160 to the recorder 165 at the toll trunk circuit 115 is effected over the test wire (P wire) and hence will not delay or interfere with the conversation of the called and calling parties. The conversation may commence as soon as the called party answers. The selector controller circuit 160 (which is common to several selectors) is automatically released for use with another selector as soon as the calling party's number has been transmitted to the trunk.

The embodiment disclosed herein illustrates the manner in which the recording equipment is used at the originating end, it being obvious therefrom as to the manner the recording equipment might be associated with the incoming trunk at the distant office. In such case the called number would be recorded as it is being dialled, but the calling party's number will be transmitted by the outgoing trunk at the originating office as it is received from the selector controller, such as 160. In the first case, any kind of trunk signalling can be used (loop, composite or simplex for example). In the latter case the use of loop-dialling is not practical because of possible brief interference with the conversation of the parties during transmission of the calling party's number.

While the conversation may start before the transmission of the calling party's number to the recorder has been completed, in the case of timed calls the timing of a call cannot commence until this operation is finished. A delay in starting the timing due to this condition will be very rare due to the short time required for the registration of the calling party's number, and can only amount to a couple of seconds. Only in exceedingly few instances will such a delay result in a loss of recorded time since the time is recorded at the beginning of each minute of conversation.

The registration of the number of a calling party which is automatically effected by the selector controller equipment such as 160 whenever the digit "0" is dialled, is primarily accomplished by means of registering equipment comprising an identification board, a series of identification circuits for cooperation therewith, a set of station register relays and a sequence control system.

With reference to the previously assumed calling party W having a directory number of 32124, it is recalled that the line circuit 120 therefor is interconnected with a group of selectors, such as 130, of the "3000" and the "200" group. The identification board associated with each of the selectors in that group is therefore appropriately "jumpered" by identification jumpers, such as 375 and 380 (shown in Figure 3c and described more fully hereinafter), to indicate that the selectors are of the 3200 group. Thus whenever a toll call is extended by a subscriber associated with that group of selectors, the selector controller 160 in consulting the identification board of the selector for the calling party's identification number is offered the thousands digit "3" and the hundreds digit "2." As will be seen hereinafter the identification circuits are also extended to the "tens" and "units" relays of the operative line finder switch, such as 126, and the selector controller 160 readily determines the value of the calling party's tens and units identification digit by observing which of the line finder tens and units relays are operated. As subscriber W initiates a call the first tens relay (F10) and the second units relay are always operated.

As preivously mentioned the party line position of the calling subscriber is transmitted by the subscribers whenever the digit "0" is dialled and such identification digit is automatically registered in a set of station register relays. The identification circuits are also arranged to cooperate with the selector controller circuit 160 and offers the registered digit 4 (W's party identification number) thereto whenever the selector controller equipment approaches same in its calling number identification transmission. Suitable control means associated with the selector controller cause the selector controller 160 to approach each of the information storing sources in the proper order, i. e. thousands, hundreds, tens, units and party line digits.

The selector controller equipment is also operative in transmission of the calling number to introduce a six impulse pause between transmission of each of the successive digits of the calling number as determined to prevent any possible confusion in the recording of the several portions of information which are pertinent to each call.

The nature of the tape registrations effected by recorder 165 are set forth in perspective in Figures 15 to 18 and will be discussed in greater detail hereinafter.

In the foregoing description, it was assumed that the calling party line was connected to the associated terminal numbers in the line-finder, selector, and connector switches; that is, that the line multiple between the line-finder and the connector was run in a conventional straight manner.

However, in installations in which the calling traffic is much higher than the called traffic, a shortage of line finders may exist in the same group having more than a sufficient number of connectors and the lines are then preferably moved to a line-finder group with a correspondingly low dialling rate.

According to a feature of the invention a limited number of lines may be moved to different line hundred groups while retaining the assigned connector terminals whereby the traffic problem is solved without disturbing the directory numbers of the lines.

Further features and details of operation will be noted in the following description of the exchange equipment.

EXCHANGE STRUCTURE

(A) SUBSTATIONS

As briefly set forth above, calling identification for parties using toll trunks is automatically effected by novel exchange switching equipment as controlled in its operation by the impulsing devices located at the substations of the subscribers.

The substation control unit in its simplest form comprises a conventional substation including a conventional dial mechanism modified to include an extra set of specially disposed special service or identification springs, and a special cam member including an identification extension for operating the identification springs to transmit coded identification signals to the switching equipment.

More particularly, with reference to Figure 2a, the calling device 200 thereat is of a somewhat conventional type which is modified by the addition of a set of special service or identification pulse transmitting springs 214 and 215, a pulse preparing spring 210b and an identification cam member 285, having a projection or projections, such as 286 disposed at predetermined assigned points on the periphery thereof.

Calling device 200 basically comprises an outer casing 201, a rotatable arbor 202, a finger wheel or dial (not shown) secured to the outer end of the arbor, and a cooperating finger stop 204. The finger wheel has ten spaced apart openings (illustrated by dotted lines in Figure 2a) therein which are adapted to receive the finger of the user, and which respectively correspond to the digits 1 to 0, inclusive. A coil spring 206 is disposed about and attached to the lower end of the arbor member 202, the upper end of the coil spring 206 being secured to a slotted projecting lug 207 which is disposed on the casing 201.

A vertically disposed support member 208 attached to the main casing 201 is adapted to support a horizontally disposed set of impulse springs 210a and 210b and 211, a set of off-normal springs 212, 213a and 213b, and a set of special service springs 214 and 215. The inner ends of the main impulse springs 210a, 210b and 211 are suitably insulated from each other and from the support member 208 by a plurality of vertically disposed strips of insulating material, such as 216, and are retained in clamped position by screw mounting member 217. Terminal members 219a, 219b and 219c are secured in cooperative relation with the impulse springs for electrically interconnecting the impulsing contacts with the line circuit equipment, their interconnection therewith being more clearly brought out by the schematic sketch of Figure 3.

The inner ends of the off-normal springs 212, 213a and 213b and special service springs 214 and 215 are similarly insulated from each other and from the support member 208 by a plurality of strips of insulating material, such as 216, and are also fixedly interconnected by a set of screw members, such as 217. Terminal members 220a, b, c and 221a and b, inclusive, extend vertically from the individual spring members for interconnection with the line circuit equipment.

A post member 225 projecting upwardly from the main body 201 of the dial supports an inwardly-extending, pivotally mounted pawl member 226 having attached to its outer end a small downwardly depending pin 227 for effecting operation of the pawl to one of its three positions, that is, a normal position, a non-operative position and a contact closing position.

A break wheel 229 attached to the arbor member 202 rotates clockwise with a winding operation of the dial wheel 203 and a plurality of teeth, such as 230, located on the outer peripheral edge of the break wheel are adapted to engage the pawl pin member 227 to urge the pawl 226 into engagement with a stop member 228 as the teeth pass thereby. Each successive indentation 231 following each tooth member 230 permits the pawl 226 to be restored to its normal position by the force exerted thereupon by the forward end of a U-shaped leaf spring 232.

An off-normal cam member 233 of insulating material is attached to the outward face of the break wheel 229 and in its normal position (shown in Figure 2) an eccentric portion 234 located on the outer edge thereof is adapted to maintain the off-normal springs 212, 213a and 213b in the open position, the resiliency of spring member 213b forcing the contacts into engagement as the dial is moved off-normal.

An identification cam member 285 of insulating material is attached to the dial mechanism between the break wheel 229 and the off-normal cam 233 in concentric relation with the arbor member 202. The identification cam member 285 carries one or more extensions, such as illustrated at 286 in Figure 2b, the location of the extension at each of the substations conforming with the station number of the substation on the subscriber line. For example, assuming the substation calling directory number to be 32124 in a ten party system, the substation will be the fourth substation on the ten party line. In a twenty party line system set up with directory numbers in the manner heretofore described, the directory number indicates that the party is the fourteenth station on the twenty party line. In the manner of the identification chart set forth heretofore the extensions 286, on cam member 285, are disposed at the points indicated by numerals 4 and 7 in Figure 2b.

With reference to Figure 2c, it is observed that the cam member 285 is of smaller diameter than the break wheel 229 and of greater diameter than the cam wheel 233. Moreover, the diameter is such that the cam in moving passes the contact springs 214 and 215 without engaging same except at the points where the projection 286 extends outwardly of the cam periphery. The cam off-normal springs 212, 213a and 213b are also terminated short of the plane of the special identification cam 285 and the springs 212, 213a and 213b cannot be operated thereby.

The extension on cam member 285 when mounted in the manner indicated by the legendary numerals in Figure 2b will effect the closure of the identification contacts 214 and 215 during the open period of the operating impulse indicated by the legendary numerals. For example, if the party is the fourth station on a partly line, the projection 286 will be disposed at the point indicated by numeral 4 in Figure 2b and in the operating movement of the dial to transmit the digit "0," the projection 286 will cause the contacts 214 and 215 to be closed during the transmission of the open period of the fourth operating impulse. The springs are so operative whenever a digit of larger than 6 is dialled, but as will be seen hereinafter, the impulse transmitted is non-functional unless digit "0" is dialled.

The calling device further comprises conventional governing mechanism (not shown) which effects uniform speed of the dial on release following the winding operation.

Insertion of the finger into one of the dial holes 205 which corresponds to the digit to be transmitted, and rotation of the finger wheel in a counterclockwise direction (as view from the back of the dial) until the finger engages the fingerstop 204, will prepare the dial for transmission of the desired digit. With winding of the dial, pawl member 226 will be repeatedly operated between its normal and non-operative positions, and normally open off-normal springs 212 and 213 are momentarily operated to the closed position by eccentric member 233 as it moves therepast. No particular operation, other than dial preparation, is accomplished during this dial winding.

The subscriber, upon reaching the finger stop 204 releases the finger wheel 205, and the coil spring 206, which has been compressively wound during the winding operation, tends to restore to cause the dial wheel 205 to return to its normal position. As the dial mechanism including the arbor 202, the break wheel 229 and the cam member 234, return toward the normal rest position, the teeth 230 and associated indentations on the break wheel 229 effect repeated operation of the pawl member 227 between its normal and contact operating positions; that is, with each engagement of a tooth with the pawl pin 227, the pawl 226 is moved into engagement with the outward end of the impulse spring 210b to open the impulse contacts 211 and 210b to transmit the break portion of an impulse as in conventional circuit arrangements. At the time of accomplishment of the break periods, circuit contacts on special service pulse defining springs 210a and 210b are closed for a purpose to be more fully described hereinafter. As an indentation following a tooth passes the pawl pin 227, the pawl 226 is urged to its normal position by spring leaf 232 and the make portion of an impulse is transmitted by contacts 210b and 211.

As the pawl member 226 effects transmission of the break portion of the fourth impulse of the series for the subscriber W (32124), the projection 286 on cam 285 momentarily engages and closes the identification-preparing contacts on springs 214 and 215 to prepare the dial for transmission of a special control pulse over the identification pulse defining contacts 210a, 210b as now closed, and the interconnecting equipment.

It is apparent from the foregoing that with each operation of the dial member to transmit the digit "0," the impulse springs transmit ten switch operating impulses of the conventional make-break variety, and the identification preparing and defining springs effect transmission of an identification pulse (or pulses) during the open period of predetermined ones of the operating impulse to be so transmitted.

(B) FINDER SELECTOR SWITCH DESCRIPTION

The finder-selector links, such as the link illustrated at 124 is set forth in more detail in Figures 3a–10, inclusive. The relay groups of the link are set forth briefly hereat.

RELAY GROUPS

*Line circuit 120.*—Each subscriber line has associated line relays, such as indicated at 255, 260, 270, 275 which are interposed between the subscriber line, such as 118, and the line finder guard circuits such as 251–253.

*Line-finder common guard relays 251–253.*—Between the line circuits, such as 120, and the line-finder distribution circuit 254 is interposed the line-finder guard circuit 251–253, the purpose of which is to guard the line-finders against simultaneous seizure by two or more calls originating at the same instant. Each hundred line group is provided with a guard circuit consisting of Tens Guard relays 251 (G10 to G10A to G00 to G00A); Auxiliary relays 252 (U10 to U00); and Unit Guard relays 253 (G1 and G1A to G0 to G0A).

*Line-finder distribution relays 254.*—Between the line-finder guard relays 251–253 and the line-finder tens and units selection relays etc. are interposed the line-finder distribution relays 254 which circuit rotates the use of the line-finders, such as 124, presenting a predetermined idle line-finder to the line-finder guard circuit in preparation for seizure. Each hundred line group has its associated group of line-finder distribution relays A1 to A last, in this illustration A1 to A10, and reset relays MD, MDA and MDB. Each relay A1 to A10 has its associated multi-contact S relay (S1–S10) which switches the pulling circuits from the guard relays to the associated line-finder Tens and Units selection relays (F10–F00; F1–F0).

*Line-finder Tens and Units selection relays 301, 311 etc.*—Between the subscribers lines 118, etc., and the selectors 130 etc. are interposed the line-finder Tens and Units selection relays 301, 311 etc., the purpose of which is to select a particular calling line and extend such line to the associated link selector. Each hundred line group of lines has its associated group of line-finders to which the lines are multiplied. Each line-finder contains ten Tens relays, 301, etc. (F10 to F00) and ten Units relays 311, etc. (F1 to F0). Each line-finder is tied directly to its associated selector. By operation of a particular Tens relay in combination with a particular Units relay any line is extended to the associated selector.

*Selector preparation relays.*—Between the selector and the selector controller is interposed selector preparation relay 410 the purpose of which is to engage and disengage the connections between the selector and the selector controller 160. Between the line-finder Tens and Units relays and the selector controller 160 are interposed selector control relays 410, 350, and 385 the purpose of which is to engage and disengage connections between line-finder Tens and Units relays and the selector controller, these circuits being arranged for calling party identification and cross-connection correction. Hold supervisory relay 1195 transfers the calling line to the selector Units relays 540, etc., and makes the associated line-finder 124 busy to incoming calls. Identification termination relays 417 and 420 complete connections and effect release of the selector controller. Each selector also has its SS relay 560 which connects the selector Units 540 etc. relays and the P-wires or trunks or connectors on a certain level to the trunk test relays 760 etc. for making connection with an idle trunk or connector.

*Selector hundreds and units selection relays.*—Controlled by the selector control relays are the selector Hundreds relays 504, etc., and Units selection relays 540, etc., the purpose of which is to select a group of trunks or lines and to extend the calling line to a particular trunk or line in the group. Each selector contains as many S—Hundreds relays as there are levels to be reached, and ten Units relays S1 to S0 540, etc., one of which selects the particular outgoing trunk or line.

*Selector controller basic control relays.*—Two or more selectors have an associated common selector controller the purpose of which is to receive incoming pulses, route the call to the appropriate level, register the identity of the calling station, and transmit the calling party's directory number identification to toll trunks. The control relays proper include relays 400, 430, 435, 434', 440, 450 and 445, 453, 455, 460, 470, 475, 480, 485, 490 and 498.

*Selector counting chain relays 600—690.*—The selector counting chain consists of relays 610—690 and cooperating chain sequence relays 470, 480 and 490. Relay 600 is an auxiliary counting chain relay. The counting chain and sequence relays are arranged to receive conventional selection pulses from the calling party by means of control relay 435; to receive calling station identification pulse (s) through control relay 430; and to receive identification pulses from the line relay 435 as controlled by the selector controller transmitting relays. The counting chain extends circuits to Hundreds selection relays 504 etc. and to station register relays 800—890 when responding to the operating pulses from a subscriber substation and extends identification circuits to the identification board when operating with the party identification equipment.

*Selector controller station register relays 800—890.*— The station register relays comprise the relay group 800—890. One of these relays operates and locks to identify a calling station in the group 1 to 10. Two of these relays operate and lock to identify one of the stations in the group 11 to 20.

*Selector controller transmitting relays.*—Relays 970, 980, 990, 960, 950, 940, 930, 920, 915 and 900 control the transmission of the calling party's directory number identification pulses by the selector controller equipment to toll trunks.

*Selector controller transmitting sequence relays.*—Relays 1000, 1010, 1020, 1030, 1040 constitute a control circuit for connecting the identification circuits to the transmitting relays, the circuit being sequentially energized by sequence relays 1050, 1060 and 1070 to effect transmission of the calling party's identification number to the toll trunks in the proper order.

*Selector identification board.*—An identification board is associated with each selector for providing the thousands, hundreds, units and tens identification digit to the selector controller transmitter relays as requested thereby.

*IDF cross connection board.*—In larger exchanges it sometimes happens that a certain Hundreds group has a much higher calling than called traffic rate so that there may be a shortage of line-finder switches while there are a sufficient number of connector switches. Provisions are made herein to permit moving of a limited number of lines to different line Hundreds groups with a lesser calling traffic while retaining the assigned connector terminals, thus retaining the directory numbers of the lines. This is accomplished by opening the straight multiple between the line-finder and connector switches and re-establishing the multiple through cross-connecting jumpers on an IDF (intermediate distributing frame).

*IDF cross connection relays.*—When a line which terminates in a line-finder group different from its connector group lands in the line-finder, associated relays 340 and 340a and 360 are operated to cause the proper directory Thousands, Hundreds, Tens, and Units digits to be transmitted to the toll trunks.

*Guard relays.*—After a selector Hundreds relay 504 etc. has operated, the selector guard relays 700 and 710 etc. associated with the particular selector controller operate. The operation of relays 700 and 710 operate the SS relay 560 of the selector. The SS relay 560 connects the operating circuits of the selector Units relays 540 etc. and the P-wires of the trunks or connectors of the selected level of the Trunk Test Relays 760 etc.

Relays 700 and 710 etc. associated with each selector controller are arranged in a series circuit so that operation of a specific set of relays 700 and 710 opens the series circuit to prevent operation of the like relays associated with all other selector controllers in that Hundred group of selectors. This guards against the simultaneous connection of two or more selector controllers to a trunk test circuit.

*Trunk test relays.*—Relays 760 and 765 and 760i and 765i test the trunks or connectors on the selected level select an idle trunk or connector, and operate the appropriate selector Units relay 540 etc. to switch the call to this particular trunk or connector. Relays 725 and 750 limit the time for selecting an idle trunk or connector before returning a busy signal and control overload registration circuits.

The nature and function of the other specific relays in the link will become more apparent hereinafter.

The manner of connection of the line-finder link in an exchange, as for example exchange 110, becomes apparent with reference to Figures 3a–10, inclusive. As there shown, each subscriber line, such as line 118, is connected over an associated line circuit, such as 120, to an associated line-finder switch, such as 126 or 128 of a finder-selector link, such as 124 or 125. The finder switch is, in turn, connected to an associated first selector, such as 130, which has its outgoing conductors extending to a group of second selectors, such as 136, and a group of outgoing trunks, such as 115. The second selectors extend to the connector switches, such as 139 and 140, which have access to the line circuits 120, 121, etc.

The trunk circuits, such as 115, have access to trunk line extending to the distant exchange 111 in town B.

(c) TRUNK CIRCUIT DESCRIPTION

The trunk circuit 115 is shown in detail in Figures 11 and 12, and as there illustrated, primarily comprises impulse repeating equipment for extending the impulses received from the dial of the calling party to the distant exchange and ticketing equipment for recording the called and calling party numbers as well as the time duration of the call for billing purposes. Generally, the trunk equipment is operative to receive the called party identification pulses over the line loop from the dial of the calling subscriber and to relay these pulses over the trunk line to the remote exchange B for selection of the called party while simultaneously recording these pulses for toll ticketing purposes. Thereafter, the trunk equipment is operative to initiate transmission by the selector controller unit 160 of the calling number identification pulses and to record these pulses for toll ticketing purposes. Following establishment of the call and the answer by the called party, the repeater is operative to record the answer signal and to effect the registration of the final billing information.

The repeater equipment is basically divided into equipment for repeating the incoming impulses and equipment for effecting the desired registration of the calls which are established thereover. In general the repeater 115 comprises the following relay equipment:

Line relay 1105 which pulses over calling line loop in series with an associated balancing coil 1104.

Ground control relays 1110, 1115 and 1135 which maintain control of holding ground for the repeater circuit during establishment of a call thereover.

Pulsing off-normal relay 1200 which operates on first pulse received from line relay 1105 and releases shortly after last pulse of each digit.

Trunk answer relay 1210 which operates with removal of receiver by called party.

Timer relay 1160 which marks the end of the pulsing of the called number;

Timer relay 1170 which marks the end of the spacing effected following registration of the called number;

Timer relay 1150 which marks the end of the receipt of the calling number;

Timer relay 1180 which marks the end of the spacing effected following registration of the calling number;

Timer relay 1190 which marks the end of spacing following answer by called party, and releases or initiates release of the previous timer relays 1160, 1170, 1150, 1180, and 1140 and pulse hold relay 1240.

Supervisory Relay 1140 which effects "P" wire supervision and acts as auxiliary trunk answer relay;

Pulse Hold relays 1220 and 1230—During pulsing of the hold number, relay 1230 is in the operated position and relay 1220 in the non-operated position. At the end of the pulsing of a hold number the relay 1230 releases and relay 1220 operates and remains thus during the spacing which follows. Upon answer by the called party the relay 1230 reoperates and 1220 releases and the relays remain in such condition for the spacing following answer. For each switch of operated condition of the relays 1220 and 1230, the counting chain comprising relays 1240 and 1295 is restored.

Pulse Hold relays 1230 and 1240—During pulsing of a digit, pulse hold relays 1235 and 1240 are in the operated position, and control advancement of the counting chain comprising relays 1245 to 1295. At the end of pulsing of a digit, relays 1235 and 1240 restore for the spacing following the digit and again effect advancement of the counting chain.

"P" wire relays 1120, 1125, 1130 respond to incoming identification impulses as received over the "P" wire 1102 from the selector equipment to control recording equipment.

"P" wire relays 1245 to 1295—counting chain which counts the digits and the spacing impulses as applied to the recorder tape.

The function of the other relays in the exchange will become apparent from the further operational description herein.

The repeater also includes units comprising coils 1206 and 1207 arranged in the trunk conductors in a conventional manner.

The mechanical recording equipment in the trunk circuit which is controlled by the aforedescribed relays, comprises a punch recorder 1216 including a punch magnet 1217 and a step magnet 1219. With each energization of the punch magnet 1217 a hole is punched in the associated tape member and the step magnet 1216 is prepared to advance the tape a step. As the punch magnet 1217 is restored, it in turn effects restoration of the step magnet 1219 and the tape is advanced. In the present arrangement the step magnet is also arranged to be energized independently of the punch magnet by certain of the control relays, whereby advancement of the tape without perforation thereof may be effected as desired. Coded spacing effected in this manner between the registration of the various information concerning the transmitted calls provides a further degree of information for billing purposes.

The connection of the trunk circuit 115 in the exchange is clearly brought out by the block diagram of Figure 1 and the specific connections set forth in Figures 11 and 12. Incoming conductors 1100, 1101 and 1102 of the trunk circuit extend to the tenth level of the selectors of the associated selector group, and the outgoing conductors 1228 and 1229 (trunk cable 112) of the trunk 115 extend trunk equipment, such as 116, in the remote exchange in town B.

EXCHANGE OPERATION

(A) ESTABLISHING A LOCAL CALL

Operation of the exchange switches in the setting up of a connection between two local substations of exchange 110, such as subscriber W and Y, is set forth hereat.

A call is initiated in the conventional manner when the receiver at the calling substation W is removed from its associated hook, such as indicated at 245 (Fig. 2d). An energizing circuit is completed thereby for a line relay, such as 270, in a line circuit 120 which is associated with a line finder, such as 126, such circuit extending over a loop circuit extending from the line circuit 120, negative battery over the lower winding of relay 255, contacts 264, 277, over conductor 248, the primary winding 243 of induction coil 240, the transmitter unit T, normally closed pulsing contacts 210b and 211, hook switch contacts 246, conductor 249, contacts 276 and line relay 270 to negative battery.

Line finder operation

The line finder line relay 270 operates in series with the operated winding of LS relay 255. Inasmuch as the details of the line finder circuits are well known in the art, the portions thereof which are not important to the invention disclosure are shown in block form.

Line relay 270 at its contacts 273 closes an energizing circuit to the guard relay G10 associated with the tens digit of the calling line (F10 in this example), the tens guard relays being shown in block form at 251. The operating circuit for the guard relay G10 extends from battery over the contacts 272, 265, 273 and 266 to the relay in block 251. Line relay 270 at its contacts 272 also prepares an operating circuit for the associated units guard relay G1 (block 253) by way of the contacts of the auxiliary relay (block 252), the circuit being prepared to the guard relay G2 associated with the units digit of the calling line. (F2 in this example.)

If all of the line finders, such as 126, are in a busy condition, a busy tone will be inductively extended to the subscriber in conventional manner, the busy tone circuit extending over contacts 257 and the non-operative winding of relay 255, the winding of relay 260 to battery.

Busy tone is responsively induced into the operative winding of relay 255 and thence over contacts 264 and 277 to conductor 249 and the receiver of the subscriber.

In the event that the line finder is not busy, the guard tens relay G10, which has been selected by the line relay 270, operates and locks to ground and completes an operating circuit for the MBA relay 290. The operated tens guard relay G10 and associated slave relays operate to prepare circuits for the finder tens relay associated with the tens digit of the calling line, in this instance tens relay 301 (F10).

The tens guard relay G10 also effects operation of the associated auxiliary relay U10 in the group 252 and opens the locking circuit for all other tens guard relays in group 251. The MBA relay 290 operates, and being of the slow-to-release type, remains operated for an interval after release by the switching relay to effect the opening of the operating circuits for all guard tens relays in group 251 making the guard circuit unavailable to calls from other tens groups until the current call has been switched through and the guard circuit subsequently released. In such manner, provision against possible multiple connection of line in different tens groups to the same line finder and selector is prevented.

Auxiliary relay U10 (group 252) associated with the illustrated line circuits operates to connect the operating circuit for the guard units relay in group 253 to the control of the contacts 272 on line relay 270. The associated unit guard relay associated with the units digit of the calling line (in this case G2) is operated over the ground extended over contacts 272 and 265 and the operated auxiliary relay in block 252.

Guard units relay G2 operates and locks to ground and effects operation of an associated auxiliary relay (not shown) to open the operating circuits of all other units guard relays and to close the circuit to the selection relay (S1 and S10) of an idle line finder.

The tens guard circuit (block 251) is so arranged that the ground for operating and locking the G10 relay therein passes through the contacts of the so-called "A" relays in the line finder distribution relay group 254 and is shifted as the "A" relays functions so that it enters the guard circuit at different points. With such arrangement several relays of the G10 to G00 may be energized simultaneously but only one may lock up, that is, the one (nearest) to ground. As an example, if the ground feed enters the tens guard circuit at G10, G10 is nearest ground, followed in sequence by G20, G30, etc. With the ground feed entering the tens guard circuit at G20, G20 is nearest to ground, G30 next and G10 is the farthest from ground.

The operating circuit of the G10 relays are controlled by the contacts on MBA relay 290 and then extend over at least two paths to the ground supply from the "A" relays, whereby contact failure of one of the relays cannot tie up the guard circuit.

The circuits are also arranged so that successive calls engage different line finders in rotation. Each line finder selector link, such as illustrated link 124 has its associated relay in the group relays A1 to A10, and each relay A1 to A10 has an associated S relay as indicated in block form in the line finder distribution relay group 254. When a line finder selector link is available its associated relay A1 is operated from the S lead for the selector and locked to battery through a resistor unit.

With ground extended through the contacts of the units guard relays (group 253) and the line finder distribution relay A1 (group 254), relay S associated with line finder 1 is operated. If line finder 1 is not available, but line finder 2 is idle the ground from the units guard relay (group 253) is extended through the contacts of the first and second "A" relays to the relay S associated with the second line finder and the second line finder will be seized.

When all of the line finder distribution relays A1 to A10 are in the released condition, a series circuit through a given set of contacts on these relays operates the reset relays of all the relays A1 to A10 in preparation for the re-operation thereof. If any of the line finder selector links become idle, ground will have been restored to the S lead associated therewith, and the associated A relay immediately operates and locks in the operated position. If all line finder selector links are busy, battery is supplied by a series set on relays A1 to A10 awaiting release of a line finder link (or links) to operate the associated relay or relays A1 to A10.

Continuing now, assuming that in the extension of the call from subscriber W to subscriber Y, that the illustrated link 126 is idle, the associated A relay will be in the operated condition as the link is seized the associated "S" relays is energized to extend a holding circuit to relay A1 to prevent the release thereof until S releases thereby guarding against the connection of two or more line finders to the calling line. A circuit is also completed thereby to operate the line finder tens selection relay 301 (F10) in line finder 126 and closes a circuit to operate the line finder units selection relay 312 (F2).

Line finder tens selection relay 301 (F10) operates and at its contacts 1F10 to 34F10 extends the positive, negative and "P" wires of lines 10 to 19 of the 3200 group to the finder units relay F1 to F0, and at its contacts 35F10 extends its operating ground to the line finder units selection relays for extension to the H conductor 463 in the selector switch 126.

As the units selection relay 312 (F2) operates, it is effective at its contacts 312e to extend the operating circuit for the tens selector ground relay F10 to the H wire 463; at its contacts a, b and d extends the positive, negative and "P" wires of the calling subscriber to the corresponding wires of the selector 130 to complete a loop circuit which extends between the subscriber substation and the line relays 430 and 435 of the selector switch.

With the extension of ground over the H lead 463 to the selector an operating circuit is completed over contacts 418 for the selector preparatory relays 410, 385 and 350, selector preparatory relays 385, 350 and 410 operates and relay 410 at its contacts C1 to C10 extends the connection from the units and tens line finder relays to the identification board, and at its contacts C11 to C20 connects the selector controller relay group to the selector guard relays. Selector preparatory relay 350 at its contacts 351 to 354 prepares the identification hunting circuits and relay 385 prepares the cross connection board for use as required.

*Selector operation on seizure*

Selector controller line relays 430 and 435 operate in series over the line loop extended thereto and furnish talking ground and battery for the calling party substation.

Relay 430 at its contacts 431 connects dial tone to the negative side of the subscriber's line, the circuit extending from dial tone source DT over contacts 431, contacts 461, contacts 476, a 5000 ohm resistor, and contacts C24 and 408 to the negative conductor 428 extending to the line finder and subscriber station.

Line relay 435 at its contacts 436 completes an operating circuit for the hold relay 433 which in turn effects operation of slave hold relay 440. Hold relay 433 operates and at its contacts 434 initiates operation of the relays in the guard timing circuit 706 in a manner to be more fully described hereinafter.

Slave hold relay 440 operates and at its contacts 442 connects ground to the H conductor 463 to provide a holding ground for the operated line finder units and tens selection relay (F10 and F2) and the selector preparatory relays 410, 385 and 350. Hold relay 433 at its contacts 447 interrupts the operating circuit for the normally energized marking relay 400. Slave relay 440 at its contacts 446 prepares the pulsing circuit for the selector counting chain and its associated sequence relays, such ground also serving as a holding ground for certain of the other selector relays in the operation of the equipment. Relay 433 at its contacts 444 connects ground to the "P" wire conductor to effect operation of the cutoff relay 275 in the line circuit, the operating circuit extending from ground over contacts 444, contacts C24, conductor 429, contacts 312a, contacts 7F10, contacts 261 and the winding of cutoff relay 275 to negative battery.

Relay 400 restores and at its contacts 401 removes the ground which is normally extended over the S wires, such as 464, to the line finder selector links associated with which the selector controller is associated. With the removal of this ground, all the associated A relays in the line finder selector links associated with this selector controller are released to prevent seizure of the selector controller by another line finder selector link during the extension of the present call.

The cutoff relay 275 operates and at its contacts 278 locks to ground on the "P" wire conductor as presently provided by the selector and at its contacts 276 and 277 interrupts the operating circuits for the relays 255 and 270, and at its contacts 279 completes an operating circuit for the lock-out relay 260 this relay being operative in the conventional manner.

Line relay 270 in restoring effects the release of the associated tens guard relay G10 and the associated units guard relay in the group 253, which in turn effect the release of their associated slave relays and the auxiliary relays in group 252. The tens guard relay and its associated relay in restoring effect the release of the S relay in the line finder distribution group 254, which in turn effects release of the MBA relay 290 and the associated A relay (A in this example). With restoration of the A1 relay, a circuit is completed for the reset relay MD, which operates to effect energization of reset relays MDA and MDB. Reset relays MDA and MDB operate to prepare battery for re-operation of relays A1 to A10 and to prepare an operating circuit for guard tens relay G10 to G00.

The line finder equipment is now partially in its call extending conditions having accomplished the location of an idle link, extended the connection from the calling line over conductors 427, 428, 429, 463 to 467 inclusive to the selector switch 130, and effected the operation of the selector controller associated therewith. Additionally, the line finder switch 126 has operated to busy the calling line to the other automatic switches having access thereto and the finder selector link has been made busy itself to other calling lines associated therewith, the distribution relays 254 having rotated the distribution circuit to present an idle line finder subsequent in the group to the subscriber lines in the 3200 series.

The selector 130 of the finder-selector link 124 and the associated selector controller equipment are in the prepared condition awaiting receipt of impulses from the dial 200 of the calling station W, the subscriber being informed of this fact in the conventional manner by the dial tone which is being presently transmitted over the connection.

*Dialling operation*

The subscriber at station W now dials the first digit (7) of the called party's directory number 71126. The dialling mechanism operates to alternately interrupt and complete the pulsing loop to thereby effect repeated energization and deenergization of the series line relays 430 and 435.

Specifically, with the first interruption of the loop circuit line relays 430 and 435 are released, line relay 430, in restoring, is effective at its contacts 431 to open a point in the dial tone circuit whereby dial tone is removed from the line, and at its contacts 432 interrupts a point in the identification control circuit to the station register relays.

Line relay 435 simultaneously restores, and at its contacts 436 interrupts the operating circuit for hold relay 433, which being slow-to-release, remains operated for the duration of the break period of each incoming impulse. Relay 435 at its contacts 437 opens a point in the control circuit for the selector counting chain; at its contacts 437a prepares a point in the identification control circuit to the station register relays (which is presently interrupted by the open contacts 432 of relay 430); and at its contacts 439 completes an operating circuit to relay 453 which extends from battery over the winding of relay 453, contacts 439, and contacts 446 to ground.

Relay 453 operates, and at its contacts 454 completes an operating circuit from battery to ground for an auxiliary or slave transfer relay 455. Relay 455 is slugged so as to be of the conventional slow-to-release type, and will accordingly remain operated for the period that the incoming set of impulses representing the first digit are received by the selector. Slave relay 455 operates and at its contacts 457 and 458 opens a point in the operating circuit for the selector relays S110, S2000 to S0000.

*Counting chain operation*

Relay 435 at its contacts 439 also completes a circuit to the first counting chain relay 610, which extends from battery over the winding of relay 610, contacts 673, 683, and 693, conductor 416, contacts 487, 473, 439, and 446 to ground.

Counting chain relay 610 operates and at is contacts 611 prepares a self-holding circuit to the selector link holding ground, which circuit extends from battery over the winding of relay 610, contacts 611, 685, conductor 907, contacts 902, conductor 908, contacts 495, 483, and 446 to ground.

Counting chain relay 610 at its contacts 612 prepares a point in the operating circuit for the first sequence relay 670, at its contacts 613 prepares a point in the operating circuit for the selector hundreds relay S110; at its contacts 614 prepares a point in the circuit to the station register relay 810 and a point in one of the identification checking circuits; at its contacts 615 prepares a point in the operating circuit for relay 620 of the counting chain relays; and at its contacts 610a completes an operating circuit to the chain slave relay 600 which extends from battery over relay 600, contacts 610a, contacts 673, 683, 693, conductor 416, contacts 487, 473, 439 and 446 to ground. Auxiliary chain relay 600 operates and at its contacts 603 locks to the described operating ground and at its contacts 602 prepares a further point in the identification circuits.

In brief summary, with receipt of the first break period of the first impulse, line relays 430 and 435 have restored to operate the selector counting chain relays 600 and 610 and to prepare circuits to the several control relays in the event that no further pulses are received. Relays 440, 453, and 455 are in the operated condition and remain in that condition for the duration of receipt of the series of impulses of the first digit by reason of their slow-to-release characteristics.

On receipt of the make period following the first break period, selector line relays 430 and 435 are again energized over the aforedescribed loop circuit. Relay 435 at its contacts 436 recompletes the energizing circuit for the hold relay 440; at its contacts 437a is ineffective at this time, and at its contacts 439 interrupts the operating circuit for counting chain relay 610 which is now maintained energized over the aforedescribed self-holding circuit.

Relay 435 at its make contacts 438 completes an energizing circuit for sequence control relay 670, the circuit extending form battery over the winding of relay 670, contacts 687, 612, C403, and contacts 438 and 446 to selector link ground. It is noted that the make contacts 437 and 438 of line relay 435 are alternately effective in their control operations, that is, make contacts 438 are effective with receipt of the first, third and further alternate impulses to control energization of the sequence relays 670, 680, 690 over conductor 403 and the contacts of the counting chain relays 610, 630 etc. whereas make contacts 437 are alternatively effective with receipt of the second, fourth, etc. impulses to control the sequence relays over conductor 402 and the contacts of counting chain relays 620, 635 etc.

Sequence relay 670 is operated with closure of line relay contacts 438, and at its contacts 672 prepares a further point in the operating circuit for the selector relays S100, etc; at its break contacts 673 interrupts a further point in the initial operating circuit for counting chain relay 610, and at its make contacts 674 prepares an operating circuit for the second counting chain relay 620. Sequence relay 670, at its contacts 676 also completes a self-holding circuit which extends from battery over the winding of relay 670, contacts 687, 676, C907, contacts 902, C908 and contacts 495, 483 and 446 to ground. The ground on conductor 907 constitutes the holding ground for each of the sequence relays in their further operation and will be referred to as such hereinafter. Finally, sequence relay 670 at its contacts 677 opens a point in the operating circuit for sequence relay 690.

Briefly then, responsive to the make period following the break period of the first impulse transmitted by the calling party, line relays 430 and 435, relays 440, counting chain relays 600 and 610, and the first sequence relay 670 are in the energized condition.

As the break period of the second impulse transmitted by the calling party is received, line relay 430 and 435 will be operated as heretofore described. The counting chain operation however will differ somewhat from that described as a result of the previous circuit preparations. Line relay 435, in releasing, now connects the operating ground of the selector to the second counting chain relay 620 over a circuit extending from counting chain battery over the winding of relay 620, contacts 615, 674, 683, 693, C416, contacts 487, 473, 439 and 446 to ground.

Counting chain relay 620 operates, and at its contacts 621 completes a self-holding circuit which extends from counting chain battery over the winding of relay 620, contacts 621, 695, to the holding ground in C907. Relay 620 at its contacts 622 prepares an operating circuit for relay 680 of the sequence relays; at its contacts 623 prepares a circuit to its associated second selector group relay (not shown); at its contacts 624 prepares a point in the circuit to the station register relay 820 and the identification check circuit; and at its contacts 625 prepares a point in the operating circuit for the third counting chain 630. Thus, following receipt of the break period of the second impulse control relays 440, 453, 455, and counting chain relays 600, 610 and 620, and 670 are in the operated condition.

Responsive to receipt of the make period of the second impulse, line relays 430 and 435 are reoperated, as heretofore described, and relay 435 at its contacts 437 completes an operating circuit for the second sequence relay 680, which extends from counting chain battery over the winding of relay 680, contacts 697, 622, C402 and contacts 437 and 446 to ground.

Relay 680 operates and at its contacts 687 opens the holding circuit to C907 for the first sequence control relay 670, at its contacts 686 completes a self holding circuit which extends from counting chain battery over the winding of sequence relay 680, contacts 697, and 686 to ground on C907. Sequence relay 680 at its contacts 684 prepares a point in an operating circuit for the third counting chain relay 630, and at its contacts 682 prepares a point in the circuit for selector relay S2000 (indicated but not shown).

The first sequence control relay 670 releases and at its contacts 674 opens a further point in the operating circuit for the second counting chain relay 620; at its break contacts 675 prepares a point in the holding circuit for counting chain relay 630; at its make contacts 676 opens a further point in its self holding circuit; and at its contacts 677 prepares a point in the operating circuit for the third sequence relay 690.

Briefly, then following receipt of the make period of the second transmitted impulse, an energizing circuit for the third counting chain relay 630 is prepared and control relays 430, 435, 440, 453, 455, counting chain relays 600, 620 and the second sequence relay 680 are in the operated condition.

Responsive to receipt of the break period of the third incoming impulse, line relays 430 and 435 release in the manner heretofore described, and relay 435 at its contacts 437 opens a point in the operating circuit for the operated sequence relay 680, which is now held energized over the self holding circuit to ground on C907 as heretofore described. Line relay 435 at its break contacts 439 completes an operating circuit to the third counting chain relay 630 which extends from counting chain battery over the winding of relay 630, contacts 625, 684, 693, C416 and contacts 487, 473, 439 and 446 to ground.

Counting chain relay 630 operates and at its contacts 631 completes a self holding circuit which extends from counting chain battery over the winding of relay 630, contacts 631, 675, to ground on C907. Counting chain relay 630, at its contacts 632 prepares a point in the operating circuit for relay 690; at its contacts 633 prepares a point in the circuit for relay 690; at its contacts 633 prepares a point in the circuit to the selector group relay S3000 (not shown) which controls a second selector in the group assigned to the 3000's group; at its contacts 633a prepares a point in the circuit to the station register relay 830 and an identification checking circuit; and at its contacts 634 prepares a point in the operating circuit for the fourth counting chain relay 635. Thus, following the receipt of the break period of the third impulse the counting chain relays 600, 630 and 680 will be in the operated position.

With the subsequent re-operation of line relays 430 and 435, responsive to receipt of the third make period transmitted, line relay 435 at its contacts 438 completes an operating circuit for the third sequence relay, such circuit extending from counting chain battery over the winding of sequence relay 690, contacts 677, 632, C403 and contacts 438 and 446 to ground. Sequence relay 690 operates, and at its contacts 692 prepares a point in the circuit to the selector relay S1000, etc., at its contacts 694 prepares a point in the operating circuit for the fourth counting chain relay 635, at its contacts 695 opens the holding circuit for the second counting chain relay 620; and at its contacts 696 completes a self holding circuit which extends from counting chain battery over the winding of sequence relay 690, contacts 677, 696 to ground C907.

Counting chain relay 620 releases and at its contacts 625 opens the operating circuit for the third counting chain relay 630 (which is held operated over the described holding circuit); at its contacts 621 opens a further point in its self-holding circuit; at its contacts 622 opens a point in the energizing circuit for the second sequence relay 680; at its contacts 623 opens a further point in the circuit to the selector group relay S2000; and at its contacts 624 opens a further point in the circuit to the station register relay 820. Thus, following receipt of the third impulse, relays 430, 435, 440, 453, and 455, counting chain relay 600, 630 and 690 are operated and an operating circuit for the fourth counting chain relay 635 is prepared.

Responsive to receipt of the open period of the fourth impulse transmitted by the subscriber, line relays 430 and 435 will release, and line relay 435 at its contacts 438 opens the energizing circuit to the third sequence relay 690 (which is maintained operated over its self-holding circuit heretofore described), and at its contacts 439 completes an energizing circuit to the fourth counting chain relay 635. Such circuit extends from counting chain battery over the winding of counting chain relay 635, contacts 634, 694, C416 and contacts 487, 473, 439 and 446 to ground.

Counting chain relay 635 operates, and at its contacts 637 prepares an operating circuit for sequence relay 670; at its contacts 638 prepares a circuit to the selector group relay S4000 leading to a predetermined group of second selectors; at its contacts 638a prepares a circuit to the station register relay 840 and an identification circuit, and at its contacts 639 prepares a circuit for the fifth counting chain relay 640. The counting chain operates in this manner to advance to the seventh counting chain relay 650.

It has been assumed that the directory number of the calling party W is 32124 and the dial of that substation will therefore have a cam 285 having an identifying projection 286 located at the point indicated by numeral 4 in Figure 2b and 2d. Since the dial at station 4 transmits the identification pulse during the fourth pulse when "0" is pulled, it will not be transmitted when digit "4" is dialled for the position numbers of the extension on the identification cam run in opposite direction to the numbering of the finger holes. A station number can only be registered during the dialling of one predetermined digit in the case "0." If the first digit is 7, for instance, party 4 will cause register relay 1 to operate, and is ineffective on a local call; that is, the projection 286 on the cam member 285 for party 4 on a line passes the special service pulse preparing springs 214 and 215 to close contacts thereon with the transmission of the open period of the first pulse, the pulse defining springs 210a and 210b are closed and positive potential is applied to the negative line conductor 249 to effect operation of line relay 430 in the selector. Since line relay 435 is restored at this time, line relay 430 is effective at its contacts 432 to complete a circuit for the first station register 800 which extends from battery over the winding of relay 800, C806, contacts 601, C415, contacts 497, contacts 432, 437a and 446 to ground. Relay 800 operates and at its contacts 803 locks to ground over C879, C904 and contacts 446. The identification of the subscriber stations for the purpose of billing local calls has not been included in the present arrangement and accordingly operation of the station register relay 830 at this time is non-functional and incidental. It is to be understood, however, that an embodiment in which the station register relays are rendered effective for party identification purposes in the establishment of local calls is considered to be within the scope of this invention.

If more than one group of toll ticketing trunks are to be reached it would be necessary to arrange the equipment for trunk code of two digits, for instance, "00," "90," "80" etc., where the first digit indicates the trunk group and the second is used for party identification.

On completion of the break period of the seventh impulse as received over the line from the subscriber substation, the counting chain relays 600, 650 and 690 are in the operated condition, and circuits are prepared for the eighth counting chain relay and the first sequence relay 670.

With receipt of the make period following the seventh break period line relays 430 and 435 operate, and relay 435 at its contacts 438 completes a circuit for the first sequence relay 670, which circuit extends from counting chain battery over the winding of sequence relay 670, contacts 687, 652, C403 and contacts 438 and 446 to ground. Line relay 435 at its contacts 437a prepares a holding and operating circuit for the second sequence relay 680 and the subsequent counting chain relay, and at its contacts 439 opens the energizing circuit for the seventh counting chain relay 650. Relay 650 is now held operated over its self-holding circuit heretofore described.

The first sequence relay 670 operates and at its contacts 672 prepares a circuit for the selector relay S7000; at its contacts 674 prepares a point in the operating circuit for the eighth counting chain relay 655; at its contacts 675 opens the holding circuit for the sixth counting chain relay 645; at its contacts 676 completes a self-holding circuit which extends from counting chain battery over the winding of sequence relay 670, contacts 687, 676 to ground on conductor 907; and at its contacts 677 opens the holding circuit for relay 690. The sixth counting chain relay 645 and the third sequence relay 690 now release. Thus, on completion of the receipt of the make period following the seventh break, counting chain relays 600 and 650, the first sequence relay 670 are operated.

In that the subscriber at substation W has dialled the digit seven, the incoming digit is now completely received, and the loop from the subscriber substation is maintained closed. Line relays 430 and 435 are held operated over the completed loop and relay 433 is held operated by contact 436 of the operated line relay 435. Relay 453, which has been maintained operated for the duration of the seven impulses, is now restored by interruption of the energizing circuit at the opened contacts 439 of line relay 435 for a period which exceeds the time delay in release of relay 453. In restoring, relay 453 at its contacts 454 opens the energizing circuit for slave relay 455 which restores in turn, and at its contacts 457 connects selector link ground to the selector group relay S7000 for extending the connection to a second selector of the four thousands group. The operating circuit for relay S7000 extends from battery over the winding of relay S7000, C17, C596, contacts 653, C413, contacts 458, C414, contacts 672, 681, 691, C907, contacts 902, C908, contacts 495, 483 and 446 to ground.

Selector group relay S7000 operates, and at its contacts 503c to 534c extends the positive, negative and test conductor leads to the units relays of the second selectors of group 7000, and at its contacts 533c and 536c, prepares circuits for operating conventional type metering equipment of the well known type. Selector group relay S7000 at its contacts 501c completes an operating circuit for guard circuit control relay 485 which is adapted to control an associated one of the guard circuit relays 700 to prevent simultaneous selector seizure of the second selector group, the circuit extending from battery over the winding of relay 485, C467, contacts C32, 501c, contacts C34, C469 and contacts 472, 483 and 446 to ground. Guard circuit control relay 485 operates and at its contacts 487 opens a point in the selector pulsing circuit to the counting chain to prevent operation thereof during extension of the call to the second selector group, and at its contacts 486 connects the selector pulsing circuit instead to relay 475, which is operative to signal the subscriber in the event that a digit is improperly dialled prior to seizure of a second selector.

Guard control relay 485 at its contacts 488 completes a circuit for associated guard relay 700 in the selector guard arrangement, the relay 700 being in a guard circuit so as to be individual to the first selector 130.

*Selector guard relay operation*

In more detail, the selector guard equipment as illustrated in Figure 7, comprises a group of selector relays, each of which is individual to a first selector, much in the manner that guard relay 700 is individual to the illustrated selector 130. Thus, if there are fourteen first selectors over which the given parties have access to the second selectors, there will be fourteen selector guard relays in the guard circuit. It is obviously essential that two or more first selectors, such as selector 130, be prevented from simultaneously attempting to seize one of the second selectors, and it is the purpose of the individual relays 700 and 710 in the circuit arrangement illustrated to prevent such operation.

The operating path of each guard relay 700, 700a, etc. passes over control contacts of a group of associated relays 710, 710a, etc., the associated relays being operated responsive to operation of its associated guard relay 710a, 710b, etc. Thus, in the event that one of the associated relays 710, 710a, etc. is operated, the operating circuit for the remaining guard relays 700, 700a, etc. will be opened, and the tendering of a call by a further selector will be thwarted by the guard circuit.

For example, assuming selector 130 is forwarding a connection and that no other selector in the group is in the process of seizing a second selector, the associated relays 710, 710a, etc. will be in the non-operated position and an operating circuit will extend to guard relay 710 individual to selector 130, the circuit for energizing guard relay 700 extending from battery over the winding of relay 700, C422, contacts 488, C423, contacts 711, 715m . . . a, contacts 715, to selector guard ground. Relay 700 operates, and at its contacts 701 locks independent of the other guard relays and at 702 completes an operating circuit to its associated relay 710 which extends from battery over the winding of relay 710, contacts 702 and 701 to ground. Relay 710 operates, and at its contacts 715 opens the operating circuit for the remaining guard relays 700a to 700m associated with first selectors 2 to 14 in the group to prevent operation thereof pending selection of a second selector by selector 130. Relay 710 at its contacts 712 completes an operating circuit for allotter circuit control relay 560 which controls connection of the test leads of the desired second selectors to the second selector or trunk allotter circuit. The circuit for allotter circuit control relay 560 extends from battery over the winding of relay 560, contact C36, C590 and contacts 712 and 701 to selector guard ground.

*Second selector and trunk allotter equipment*

Relay 560 operates, and at its contacts 560g to 560p, inclusive, extends the operating circuit of the selector unit's relays 540 to 540i to the allotter circuit, at its contacts 560q to 560z, inclusive, completes a circuit from the test conductors P of the second selectors of the four thousand group to the testing relays 760 to 760i, inclusive, and at its contacts 560c prepares a circuit to operate the conventional exchange metering equipment.

As the trunk guard control relay 560 operates, the test conductor of each of the second selectors of the group which is seized (in this instance, the 7000 group), will be connected to the test relays 760 to 760i, inclusive.

A second selector in the idle condition connects low resistance battery to its test conductor, and a busy second selector connects ground to its test conductor.

*Second selector allotter circuit operation*

BUSY CONDITION

In the event that each of the second selectors of the group are in use, the guard timing circuit 706 is operative to so inform the subscriber. With reference to the initial seizure of the selector 130, it will be remembered that hold relay 433 is immediately operated and is maintained in such condition until the connection is switched through to further apparatus. Hold relay 433 at its contacts 434a completes an energizing circuit for the guard timing circuit relay 730, which extends from battery over the winding of relay 730, contacts 728, C416 and contacts 434a to ground. Timing circuit relay 730 operates and at its contacts 731 connects ground to timing circuit relay 735. Relay 735 operates, and at its contacts 736 opens a further point on the operating circuit for signal relay 475; at its contacts 737 completes an operating circuit to timing relay 740; and at its contacts 738 opens a circuit to the conventional overflow metering equipment.

Timing relay 740 operates, and at its contacts 741 prepares a circuit for the remaining relays in the timing arrangement for operation at a later period. Timing relays 730, 735 and 740 are held operated pending operation of the trunk guard control relay, such as 560.

As relay 560 operates, an energizing circuit for timing circuit relay 725 is completed from battery over the winding of timing relays 725, C565, contacts 560c, contacts C34, C469, and contacts 472, 483 and 446 to selector control ground. Timing circuit relay 725 operates, and at its contacts 726 prepares a point in the operating circuit for signal relay 475 (presently opened at contacts 736) at its contacts 727 closes a point in the operating circuit for timing circuit relay 750; and at its contacts 728 and 729 opens a point in the operating circuit for timing circuit relay 730. Timing circuit relay 730 releases slowly and at its contacts 731 opens the operating circuit to timing circuit relay 735.

Relay 735 releases after a brief time interval and at its contacts 736 completes a point in the operating circuit for signal relay 475; at its contacts 737 interrupts the operating circuit for timer circuit relay 740; and at its contacts 738 completes a point in the energizing circuit to the overload meter. Relay 740, being of the slow-to-release type, remains operated for a brief interval and then releases; and at its contacts 741 interrupts the operating circuit to timing circuit relay 750. If an idle selector is not found, switching relays 770, 775 and 780 will not be operated, and timing relays 745, 750 and 755 will also be inoperative. Thus, with restoration of timing relay 735, an operating circuit is completed to signal relay 475, which extends from battery over relay 475, C468, contacts C33, C566, contacts 560f, contacts 756, 736, and 726 to trunk guard circuit ground.

Signal relay 475 operates, and locks to ground over contacts 479. At its contacts 476 relay 475 disconnects the dial tone conductor and connects the busy tone conductor to the line over contacts 477 and a 5000 ohm resistance, and at its contacts 478 completes an operating circuit to an associated signal relay 470. Relay 470 operates and at its contacts 471 connects ground to the busy tone circuit equipment via terminal BS to energize same, whereby busy tone is placed on the busy tone conductor via terminal BT and the negative conductor of the subscriber's line to indicate to the subscriber that the second selectors are busy. Relay 470 at its contacts 472 interrupts the operating circuit to the timer relay 725 and the selector relay 485; and at its contacts 473 opens the pulsing circuit to the relays of the counting chain.

Relay 485 releases, and at its contacts 487 recloses a point in the counting chain pulsing circuit; and at its contacts 488 opens the energizing circuits for the operated selector guard relays S4000 and relay 700. Relay 700 releases, and at its contacts 701 opens the operating circuit for relay 710 and trunk control relay 560. Line relays 430, 435 and control relays 440 and 445 are maintained energized until such time as the calling party restores his receiver to release the finder selector link 124 in the well known manner; or, in the event that timing control relays of the conventional type are employed, the relays will be maintained energized until a given time period has expired, whereupon holding ground for the link equipment will be removed on expiration of a given time interim, independent of the subscriber operation.

SEIZURE OF AN IDLE SECOND SELECTOR

If each of the second selectors is idle as selector 130 extends the test leads thereto, low resistance battery will be connected to test relays 760 to 760i, inclusive. The connecting circuit for the first test relay 760 associated with the first selector 136 of the second selector group extends, for example, from low resistance battery in the second selector 136 over the test wire P(593), contacts 505c, C586, contacts 560z, C586, contacts 770, the winding of the first test relay 760 over a 1200 ohm resistance to ground. Each of the other test relays 760a to 760i will be operated over similar paths in the event that their associated selector is in the idle condition. Those of the test relays which operate are effective at their contacts 762 to 762i to complete a circuit to ground to thus short circuit the 1200 ohm resistance and apply a more positive potential to the associated test conductor. The operated ones of the test relays 760 to 760i, at their contacts 761 to 761i, operate auxiliary associated relay 765 to 765i over obvious circuits.

Thus, the relays 765 to 765i associated with the operated ones of the relays 760 to 760i will now be energized. The operated ones of the associated relays 765 to 765i at their contacts 766 to 766i prepare an energizing circuit for individual selector units relay 540 to 540i; as for example, relay 765 at its contacts 766 prepares a circuit for selector unit's relay 540.

The operated ones of the relays 765 to 765i, inclusive, at their contacts 767 to 767i complete an operating circuit for relays 770, 775 and 780 which are adapted to interrupt the test conduction and test relay connections, and at their contacts 764 to 763i prepare to ground the test leads of the associated second selector switches.

If any of the second selectors are idle, relays 770, 775 and 780 will now be operated to connect ground to the test wires from the trunk guard circuit. For example, switching relay 770, being associated with the second selector 136, will operate to connect ground to the test wire 593 of the first selector, such circuit extending from ground over contacts 761, 764, 770e, C586, contacts 560z, conductor 586 and contacts 505c of selector group relay S4000 to the test lead P(593) of the second selector 136.

Switching relays 770, 775 and 780 operate and at their contacts, such as 770b, d and f, open the energizing circuits for the test relays 760 to 760i. Relays 760 to 760i restore in turn releasing all relays 765 to 765i with the exception of one relay which is held operated by the operated one of the selector guard relays 710 to 710m.

In the present illustration, relay 710 in the selector guard circuit associated with the operated selector 130 is in the operated condition, and a holding circuit for relay 765 is thus completed from battery over the winding of relay 765, contacts 769, C561, contacts 560a, C561, contacts 718 to selector guard circuit ground. The remaining relays 765a to 765i release. After relay 760 releases, ground is maintained through contacts 769 and 764 on the test wire.

It is apparent that if the first of the second selectors were busy, test relays 760 and 765 would have been inoperative, and assuming the next selector is not busy, test relay 765a would now be held in the operated condition by the ground forwarded by relay 710 via lead 561. Thus the test relay "closest to the ground" associated with an idle second selector is held operated.

It will be remembered that timing relay 725 in operating responsive to operation of control relay 560 opened the operating circuit for timing relay 730 to effect the timed release of relays 730, 735 and 740 responsive thereto. Since these relays are of the slow-to-release type, a relatively large interval of time transpires prior to release of timing relay 735 and the completion of the circuit to the signal relay 475, this time interval being provided to insure a sufficient opportunity to seize an idle second selector.

As noted heretofore, if an idle selector is found, the switching relays 770, 775 and 785 operate and relay 780 at its contacts 780a completes an operating circuit for timing circuit relay 750, which extends from battery over the winding of relay 750, contacts 727, 741, 748 and 780a to ground. Timing circuit relay 750 operates, and at its contacts 751 completes an operating circuit for timing circuit relay 755. Relay 755 operates, and at its contacts 756 opens a point in the operating circuit to signal relay 475, prior to closure of that circuit by relay 735 in its restoration, in order to extend the time for selection of an idle second selector. Relay 755 at its contacts 757 also completes an operating circuit for timing circuit relay 745.

Relay 745 operates, and at its contacts 748 opens the operating circuits for timing circuit relays 750 and in turn 755 to restore same, and at its contacts 749 locks to ground over the contacts 780a of the operated switching relays 780. Timing circuit relay 745, at its contacts 746, connects ground over the contacts 766 of the operated one of the second selector allotter relays 765 to the selector units relay associated with that allotter relay, which in the given illustration is selector units relay 540. Timing relay 745, at its contacts 746, completes a circuit to the selector units relay 540 associated with the operated test relay 765, the circuit extending from battery over the winding of units relay 540, C576, contacts 560p, C576', contacts 766 and 746 to ground.

Selector units relay 540 operates and at its contacts 541, 542 and 543 connects the positive, negative and test conductors of first selector 130 to second selector 136', at its contacts 544 completes an operating circuit for the conventional type call meter (not shown) to register the extension of a call thereto, the circuit extending from ground over contacts 560d, C564, contacts 544 and 533c to the call initiating conductor CM for the second selector 4000 group. Additionally, the units relay 540 at its contacts 546 completes an operating circuit for relay 480 for effecting release of the majority of the selector control relays, the circuit for release relay 480 extending from battery over the winding of relay 480, C466, contacts C31 and contacts 546 to the selector link ground on conductor 426. Unit relay 540 has also locked to ground.

Relay 480 operates and at its contacts 481 prepares operation circuits for the identification transmitter control relays 490 and 498 which are not rendered effective by reason of the local nature of the present call; and at its contacts 482 completes an operating circuit for link ground control relay 405 extending from ground over contacts C7, 482 and 446 to relay 405 and battery. Release relay 480 at its contacts 483 opens a point in the operating circuit for the selector relay S700, which is now maintained operated over the self-holding circuit heretofore described.

Selector ground control relay 405 operates and at its contacts 406 and 408 opens a point in the loop circuit to selector line relays 430 and 435, at its contacts 407 and 409 connects the subscriber positive and negative conductors through the selector 130 to the second selector 136. Relays 430, 435, 443 and 440 release in sequence. Relay 405 at its contacts 410a connects the ground to the H conductor 463 to replace the ground removed therefrom as relay 440 is released, and at its contacts 411a removes the ground from the selector circuit to effect release of the selector control relays, excepting relay 405.

SELECTING CALLED SUBSCRIBER'S LINE

The connection at this point is extended through the finder selector link 124 to the second selector 136, a pulsing path being extended through the selector 130 over conductors 427 and 428, contacts 407 and 409, C311" and C312", 541 and 542, 503c and 506c and conductors 519 and 592 to the second selector 136. As the subsequent digit "1" is dialed, the second selector 136 is operated, in a manner similar to that described relative to operation of selector 130, to extend the connection through to a connector switch, such as 139, which is associated with line 119 of the called party Y. The digits "1" and "2" are then respectively dialled into the connector 139 to cause the switch to select the desired calling line 119, and a final digit "6" is then dialled into the connector to cause ringing current of a predetermined type to be applied to line 119 to signal the desired subscriber Y.

The connection is completed and ringing current removed from the line as the called party removes the receiver from his hook switch. Release of the connection is established in a well known manner responsive to release of the connection by the calling party.

(B) TOLL CALLS TO SUBSCRIBERS IN EXCHANGE B

Whenever a subscriber in exchange 110 wishes to establish communication with a subscriber in neighboring exchange 111, the call is extended over a toll trunk such as 115 which includes toll ticketing equipment for automatically recording the call for subsequent billing purposes. Access to the toll trunk is automatically effected with the dialling of the digit "0" and the call is extended to the desired subscriber responsive to the dialling of the directory number of the desired subscriber thereafter. Registration of the pertinent data relative to the call is effected automatically by the equipment in exchange 110. The establishment of a call by the subscriber W in exchange 110 having a directory number 32124 (the 4th station in line 12) to the subscriber R in the distant exchange 111 having the directory number 211231 will now be described. As the calling party lifts his receiver, a loop is established over the positive and negative conductors 248 and 249 to effect the seizure of a finder selector link, such as 124, and the operation thereof in the manner heretofore described.

Briefly, if all line finders are busy, busy tone is extended over the conductors to the calling subscriber substation to indicate to the party that such condition exists and that the call will have to be reinitiated at a subsequent time. In the event that there is an idle line finder, the line finder switch such as 126 operates in a manner heretofore described to extend the calling line to its associated selector switch, such as first selector 130. Selector switch 130 is operated in response thereto to prepare associated control equipment for operation by the impulses received over the interconnecting line loop from the calling station and furnishes talking ground and battery to the calling party substation for such purposes. The selector switch further effects the return of dial tone to the subscriber to indicate to such party that the finder selector link has been seized and further effects the removal of ground from the interconnecting wires to the line finder equipment to effect release to the associated A relays in the line finder distribution set 254 to prevent seizure of the selector control by other line finder selector links during the impending switching operation.

Calling party W then inserts his finger into the dial finger hole "0" and turns the finger wheel clockwise until his finger engages the finger stop, thus winding the dial for the transmittal of the digit "0." As the dial is released it rotates counterclockwise to its rest position and the regular pulsing contacts 210b and 211 are operated to transmit ten operating pulses to the selector switch 130. Additionally, at least one special identification impulse is simultaneously transmitted in a coded manner by the special identification cam member 285 on the calling subscriber's dial.

Inasmuch as the calling party, in the given example, is the fourth station on line 12, the special impulse will be transmitted during the open period of the fourth operating impulse.

The selector switch 130 responds to receipt of the ten operating impulses and the special identification impulse by advancing to the tenth level thereof to seize a toll trunk for the calling party simultaneously effects operation of the fourth special station register relay 830, to register the station identification number of the calling party.

Following receipt of the tenth impulse by the selector equipment, the tenth counting chain relay 665 auxiliary counting chain slave relay 600, first sequence relay 670, station register relay 830, selector controller relays 410, 350, 385, 435, 433, 440, 453, and 455 in the selector are in the operated condition.

Relative to the operated condition of the fourth station register relay 830 it is noted that the special cam 285 on the dial of substation W effects the transmission of the ground pulse to the selector switch during the break period of the fourth impulse. Line relay 430 is therefore operated and the line relay 435 is released, and since the third counting chain relay 630 is operated at this time, a circuit is completed for the fourth station register relay 830 which extends from negative battery over the winding of relay 830, contacts 821, conductor 849, contacts 633a, contacts 602, conductor 415, contacts 497, 432, 437a and 446 to ground. The fourth station register relay 830 at its contacts 833 locks to the selector ground on conductor 904 and at its contacts 831 opens the operating circuit for the fifth station register relay to prevent operation thereof. It is apparent that the circuit for the station register relay could have been run through the contacts of the fourth counting chain relay instead of the third counting chain relay in which case the operating sequence would have been as follows: line relay 435 releases, counting chain 635 operates, station register relay 830 operates, line relay 435 re-operates. It is apparent that by running the operating circuit for the fourth station register relay through the preceding counting chain relay 630, an additional margin of operating time for the fourth station register relay 830 is provided. The operation of the other registers relay 860 to 890 for the other parties is similar, with the exception of the first register relay 800 and the operation of the fifth and ninth register relays for party 19 in a twenty party system of the type described.

That is, in the event that a party is a first station on a party line, the dial therefor will have an extension 286 on the identification cam 285 at the point indicated by numeral 1 on the cam in Figure 2b. In such event, the station register relay 800 is operated in the following manner. With the transmission of the first operating impulse, the cam extension member 286 is effective to transmit the special identification impulse to prevent release of the line relay 430 as the first line relay 435 restores to operate the first counting chain relay 610. The first station register relay 800 operates simultaneously and as the auxiliary counting chain relay 600 is operated immediately thereafter. As the line relay 435 re-operates, the sequence relay 670 is energized. It is noted that in this instance the operation of the station register relay 800 is controlled by the contacts of the auxiliary counting chain relay 600.

The further exception in the aforedescribed operation of the station register relays 800 to 890 occurs with the operation of the fifth relay 840, which is effective at its contacts 842 to close a circuit for controlling the transmission of the station identification pulses to the toll trunks. In the event that the ninth station register relay 880 and the fifth station register relay 840 are operated on the same call, as for example, for identifying station 19 in a twenty party line, or when operated with the tenth relay 890 to identify station 20, the pulse initiating circuit controlled by contacts 842 is disabled to prevent its taking precedence over the circuits controlled by contacts 882 on relay 880 or contacts 891 on relay 890 in their control with relay 840 of the stop relay 900. These variations will be brought out more specifically hereinafter.

A predetermined interval after the receipt of the digit "0" by the selector 130, slow-to-release relays 453 and 455 restore to complete the prepared operating circuit for the selector group relay S0000 over a circuit extending from battery over the winding of relay S0000, contacts C20, conductor 599, lead 869b, contacts 839, 828, 818, 808, lead 869a, contacts 668, conductor 412, contacts 457, lead 414, contacts 672, 681, 691, conductor 907, contacts 902, conductor 908, contacts 495, 483, and 446 to ground. It should be observed that with this arrangement, only those parties having special dials for party identification and hence operating one (or more) of the station register relays can effect operation of S0000 and hence gain access to the associated trunk group.

In case a subscriber not having a special identification dial attempts to gain access to the "0" trunk group by dialing "0," the non-operation of a station relay (or relays) will cause operation of the busy signal relay 475 which results in busy tone being returned to the calling party and blocks further dialing. This circuit is as follows: battery through relay 475, lead 468a, contacts 898 to 808, lead 869a, contacts 668, lead 412, contacts 457, lead 414, contact 672, 681, 691, conductor 907, contacts 902, conductor 908, contacts 495, 483, and 446 to ground.

Selector group relay S0000 operates and locks to ground over contacts 535g and conductor 426, contacts C26 and contacts 441; at its contacts 511j to 535j extends the plus, minus and P wires of the trunks in the associated trunk group to the selector units selection relay S1 to S0; at its contacts 533g and 536g completes circuits to the aforedescribed exchange metering equipment; and at its contacts 502g and 504g prepares operating circuits for the station identification transmission control relays 490 and 498, selector group relay S0000 at its contacts 511g completes the operating circuit for the selector guard equipment control relay 485 in the manner heretofore described to initiate the selection of an idle one of the associated trunk lines which extend to the distant exchange. The selection of an idle trunk proceeds in the manner heretofore described, the signal relay 475 being operated in the event that an all-trunks busy condition is encountered. If an idle trunk is not located within the given predetermined allotted time and the selection is not completed within a predetermined allotted time, a busy condition is registered by the operation of relay 475 and busy tone is returned to the calling subscriber.

Assuming that the first trunk 115 is idle, the selector guard equipment operates in the manner heretofore described to effect the seizure thereof. Briefly, assuming that the first trunk is idle, the TA1 relay 765 will be operated and will lock to ground over the selector guard relay 710 associated with the selector controller. Relay 765 further prepares a circuit for the units relay 540 which becomes effective as the guard timer relay 745 is operated. Relay 540 operates and locks to ground over conductor 426, contacts C26 and 422 to ground. Relay 540 at its contacts 541, 542 and 543 connects the positive, negative and P-wires to the first trunk of the selected group and at its contacts 546 completes an operating circuit for the call extension control relay 480, the circuit extending from negative battery over the winding of relay 480, conductor 466, contacts C31, contacts 546, conductor 426 and contacts C26 and 442 to ground.

Relay 480 operates and at its contacts 481 completes the prepared circuit for the station identification transmitting control relays 490 and 498, the circuit extending from battery over the winding of the respective relays contacts 481, conductor 465, contacts C35 and 502g and 504g to ground. The operating circuit for these relays is only prepared with operation of the selector to the toll trunk level (level ten), whereby the identification equipment is rendered operative only in toll trunk calls.

Relay 480 at its contacts 482 also completes an operating circuit for the hold supervisory relay 405, which extends from negative battery over the winding of relay 405, contacts C7, contacts 482 and 446 to ground. Further relay 480 at its contacts 483 interrupts the holding circuits for the counting chain relay 665 and the first sequence relay 670 to effect the release thereof and to also effect the release of relays 485, 460 and guard relay 725 in order.

As the relay 485 releases following interruption of the energizing circuit therefor by the open contacts 482 on relay 480, relays 700, 710, 560, trunk test relay 765, relay 770, 775, 780, 745 and 460 are released in sequence and the selector controller is maintained in the prepared condition, awaiting receipt of an initiating pulse from the trunk equipment.

Hold supervisory relay 405 operates and at its contacts 407 and 409 connects positive and negative wires to the selected trunk; at its contacts 410a supplies holding ground to the H wire 463; and at its contacts 411a holds the circuit to the associated line finder "A" relay open. Relay 490 further prepares the station identification transmitting equipment for operation at its contacts 493 by transferring control of the line relay 435 from the line loop extending to the calling subscriber's substation to conductor 906 and the identification transmitter relays (Fig. 9). Relay 490 at its contacts 496 prepares an operating circuit for stop relay 900 and at its contacts 491 initiates operation of the identification transmitter relays by completing an operating circuit for the series P-wire relay 970 which extends from negative battery over the winding of relay 970, resistor 966, contacts 954, conductor 905, contacts 491, 462 and 444 to ground.

As relay 460 releases with the restoration of relay 485, contacts 462 are opened the ground controlled thereby is removed from the P-wire, the series P-wire relay 970 being held by ground thereafter received over the trunk P-wire from the seized toll trunk equipment, relay 460 thus functions to maintain ground on the trunk P-wire until the trunk could establish its own holding circuit.

As associate control relay 489 operates it is effective at its contacts 499 to interrupt a further point in the operating circuit for the identification terminating relay 420 and thus further prepare the transmitter relays for operation.

Series P-wire relay 970 operates and at its contacts 973 completes an operating circuit for its associate start relay 980, the circuit extending from negative battery over the winding of relay 980, contacts 973 and 964, conductor 904, contacts 446 to ground. Relay 980 operates and at its contacts 983 completes a holding circuit which extends over contacts 964 to the operating ground on conductor 904.

*Trunk operation*

With extension of the call to the trunk, the line relay and other seizure responsive units prepare the trunk for receipt of the incoming impulses from the calling party dial and to establish a circuit for holding the equipment in condition for such use. As the impulses are received the trunk equipment is operative to record these pulses for ticketing purposes while simultaneously repeating these pulses over the outgoing side of the trunk to the distant exchange for selection of the desired party substation in the distant exchange.

The trunk further records the directory number of the calling party as transmitted thereto by the selectors and records the completion or non-completion of the call.

The information in the disclosed embodiment is registered by a recorder including a punch magnet and a step magnet which are operative to punch a tape member in accordance with the nature of the information supplied thereto.

The seizure of the trunk for operation in this manner is effected by the selector equipment in the manner just described. Basically as the selector group relay S0000 is operated, the "P" wires of all trunks in the group are connected to the selector trunk test relays 760 to 760i inclusive for testing purposes. With reference to the trunk circuit 115 in Figure 11 it is apparent that the P wire 1102 when the trunk is idle will have low resistance battery applied thereto over a circuit extending from battery, resistance 1103, contacts 1141, 1133, and contacts 1119. Each of the other idle trunks in the group is similarly marked as the P wires are offered to the selector trunk test relays, each idle trunk will operate its corresponding trunk test relay 760 to 760i in the trunk test relay circuit.

Assuming the illustrated trunk circuit 115 to be the first circuit in the trunk group, the "P" wire 1102 will be associated with the trunk test relay.

Assuming the trunk circuit 115 is idle and the P wire 1102 is marked with low resistance battery as the call is extended to the trunk group, the first test trunk relay 760 is operated over a circuit extending from ground, the 1200 ohm resistor associated with relay 760, contacts 770 f, conductor 586', contacts 560z, contacts 515g to the "P" wire 1102, trunk 115, contacts 1119, 1133 and the winding of supervisory relay 1140 is positive battery. The low resistance circuit normally completed over contacts 1141 of the supervisory relay is effective as an operating source in that the resistance to battery is in the order of 350 ohms and supervisory relay 1140 is a high resistance relay in the order of 1200 ohms.

As trunk test relay 760 in the selector operates over the described circuit, it is effective at its contacts 762 to shunt the 1200 resistance associated therewith and to connect the high resistance supervisory relay in the trunk circuit to low resistance ground to effect the operation thereof.

As supervisory relay 1140 in the trunk circuit 115 operates, it is effective at its contacts 1141 to disconnect the 350 ohm resistor from the "P" wire operating circuit, whereby high resistance battery now is connected to the "P" wire 1102 extending to the selector circuit to indicate a trunk busy condition. Trunk test relays 765 and 770 are now operative to transfer their operating circuits to direct ground on the "P" wire and to effect the release of the trunk test relay 760 in the manner heretofore described relative to completion of a local call. High resistance supervisory relay 1140 in the trunk circuit 115 however is maintained energized over the direct ground provided by the trunk test relays 770 and 765.

Several trunks in the group may be idle as the selector 130 extends the call thereto, and accordingly the high resistance supervisory relays, such as 1140, of several trunks may operate simultaneously. The trunk test circuit of the selector, however, is operative in the manner heretofore described to remove ground from all of the "P" wires of the idle trunks except one.

Assuming the illustrated trunk 115 to be the trunk seized by the selector 130, a line loop is extended over contacts 513g, 516g and 515g to the conductors 1100, 1101, and 1102 of the illustrated trunk equipment and the line pulsing relay 1105 operates in series with balancing coil 1104 over the line loop extended thereto by the selector equipment.

Line relay 1105 at its contacts 1106 closes the outgoing trunk loop which lands the call in a distant trunk such as 116 to operate the line relay and balancing coil thereof; at its contacts 1107 extends operating circuit to the first ground control relay 1110 which operates and in turn, at its contacts 1113 completes operating circuits for the auxiliary ground control relay 1135, the third pulse hold relay 1230, and at its contacts 1111 completes an obvious circuit for ground control relay 1115.

The operating circuit for pulse hold relay 1230 extends from ground over contacts 1113, 1195 and 1169, and the winding of pulse hold relay 1230 to negative battery. A parallel operating circuit is completed to the auxiliary ground relay 1135 which extends over contacts 1113, 1195, 1137, and the winding of auxiliary ground relay 1135 to negative battery.

Auxiliary ground relay 1135 operates and at its contacts 1137 opens its energizing circuit and at its contacts 1136 completes an obvious self-holding circuit over contacts 1192 of the stop relay 1190.

Ground relay 1115 operates and at its contacts 1119 interrupts the energizing circuit for supervisory relay 1140 to effect the release thereof and at its contacts 1118 connects ground to the "P" wire 1102 over a circuit extending over contacts 1118, 1151, 1171 and 1212 to ground. The series P wire relay 970 in the selector is maintained in the energized condition by such ground, the direct ground from the selector trunk test relay circuit being removed with the restoration of relay 760.

As mentioned previously with operation of the trunk line relay 1105 and closure of contacts 1106, the outgoing trunk circuit was completed the line relay of a corresponding incoming trunk circuit 116 in the distant office, the circuit extending from positive battery thereat over the line relay thereof, trunk conductor 1228, the right-hand section of the repeater coil 1206, contacts 1106, contacts 1203, resistor 1214, rectifier 1213, the right-hand winding of repeater coil 1207, trunk conductor 1229, the balancing coil at the remote trunk equipment (similar to illustrated coil 1104), to negative battery.

The trunk repeater circuits 115 and 116 are therefore in the operated seized condition and are ready to respond to the selective impulses from the dial of the calling subscriber W.

*Transmission of called party number*

As the calling party dials the number of the called party, the substation dial opens and closes the line loop to the trunk repeater 115 a number of times corresponding to the value of the digits dialled, to effect a corresponding number of operations of the trunk circuit line relay 1105 in series with the balance coil 1104.

Assuming that the directory number at the distant exchange is a six digit number, the following description is exemplary of the manner of operation of the trunk equipment in effecting the transmission of the dialled number thereto and the manner in which information pertaining to the call is recorded for toll ticketing purposes.

With each restoration of the line pulsing relay 1105 responsive to receipt of each break portion of incoming impulses from the calling party substation set, the trunk loop is opened to effect release of the line pulsing relay at the equipment at the distant end. Simultaneously the line relay effects operation of the punch magnet 1217 of the punch recorder 1216 in the trunk equipment and the punching of a hole in the associated paper tape to record the receipt of the pulse. Specifically, punch magnet 1217 is operated with each release of the line relay 1105 over a circuit extending from negative battery over the winding of the punch magnet 1217, contacts 1191, 1161, 1114b and 1109 to positive battery. Punch magnet 1217 at its contacts 1218 completes an obvious operating circuit for the step magnet 1219 which prepares to advance the tape one step with the subsequent release of the punch magnet and deenergization of the step magnet as the line relay 1105 is re-operated with receipt of the make period of the subsequent pulse.

With receipt of the break period of the first incoming impulse, the line relay 1105 is also effective at its contacts 1108 to complete an operating circuit for the off-normal relay 1200, which being of the slow-to-release type, remains operated during receipt of the series of pulses making up each of the digits and releases shortly after the receipt of each digit.

Off-normal relay 1200 at its contacts 1202 and 1204 completes a trunk loop circuit which is independent of the repeat coil secondary coils 1206r and 1207r to provide a trunk dialling loop of lower resistance. The new line loop extends from the distant exchange over trunk conductor 1228, contacts 1202, contacts 1106, contacts 1204 to trunk conductor 1229 and the line relay and negative battery at the distant exchange.

The off-normal relay 1200 in its operation also completes an energizing circuit for the first pulse hold relay 1240, such circuit extending from negative battery over the winding of relay 1240, contacts 1154, 1164, 1205 and 1138 to positive battery.

The pulse hold relay 1240 operates and at its contacts 1242 completes an obvious operating circuit for the second pulse hold relay 1235, and at its contacts 1244 completes an operating circuit for the first relay 1245 of the trunk counting chain, the circuit extending from negative battery over the winding of relay 1245, contacts 1254, 1265, 1275, 1284, 1294, 1244, 1233 and 1221 to positive battery.

Thus following receipt of the break period of the first impulse, the punch magnet 1217 has been operated to record the receipt of the first impulse, line relay 1105 is restored, the ground control relays 1110, 1115, 1135, off-normal relay 1200, the pulse hold relays 1230 and 1240 and the first counting chain relay 1245 are energized and a low resistance pulsing loop is being maintained closed to the distant interconnected trunk equipment for pulsing purposes.

As the open period of the first pulse of the first digit is terminated, line relay 1105 re-operates to reclose the trunk loop at its contacts 1106. Line relay 1105 is further effective at its contacts 1109 to interrupt the energizing circuit for punch magnet 1217 associated with the punch recorder 1216 to effect the release thereof which in turn effects the release of the step magnet 1219. With release of the step magnet 1219, the paper tape is advanced one step to prepare same for the receipt and recordation of a subsequent pulse.

With receipt of each of the subsequent impulses of the first digit, the line relay effects re-transmission thereof to the distant trunk equipment 116 and the operation of the punch recorder 1216. The punch recorder perforates the tape once and advances the tape one step with each impulse received. Thus assuming the directory number of the called party is 421231 as the first digit has been received, the first four perforations will be recorded on the tape.

Following receipt of the last impulse of the first digit, line relay 1105 is maintained in the operated position by the closed loop extended thereto by the substation equipment, and at its contacts 1108 maintains the energizing circuit for the off-normal relay 1200 open for a time period which is greater than the hold time thereof.

As this predetermined delay time elapses, the off-normal relay 1200 releases and at its contacts 1205 interrupts the energizing circuit for the first pulse hold relay 1240 to effect the release thereof.

Pulse hold relay 1240 releases and at its make before break contacts 1243 completes an operating circuit for the second counting chain relay 1250 prior to opening of contacts 1244 and the interruption of the energizing circuit for the first counting chain relay 1245.

The second counting chain relay 1250 is operated over the circuit extending from negative battery over the winding of relay 1245, the upper winding of relay 1250, contacts 1247, 1243, 1233 and 1221 to positive battery, whereby the first counting chain relay 1245 is held operated in series with the second counting chain relay 1250. The second counting chain relay 1250 operates and at its contacts 1254 interrupts a further point in the original energizing circuit for the first counting chain relay 1245 and at its contacts 1253 prepares a self holding circuit.

As pulse hold relay 1240 releases, it is further effective at its contacts 1242 to interrupt the energizing circuit for the second pulse hold relay 1235, which being of the slow-to-release type, releases after the elapse of a short predetermined interval. During the elapse of such interval an operating circuit is closed to the step magnet 1219 for the punch recorder 1216 which extends from negative battery over the winding of step magnet 1219, contacts 1236 and 1241 to positive battery. Step magnet 1219 operates in response thereto. As the slow-to-release relay 1235 subsequently restores, it is effective at its contacts 1236 to interrupt the energizing circuit for the step magnet, which is effective in its release to advance the tape one step whereby an interdigital spacing of one space is effected between the first and second digits (4 and 2).

With receipt of the second digit (2) of the called number the impulses are re-transmitted over the outgoing trunk and two perforations are placed in the tape to indicate the value of the second digit received. Specifically as the first impulse is received, pulse hold relays 1235 and 1240 are operated as heretofore described and maintained energized until the incoming digit is subsequently terminated. Pulse hold relay 1240 is effective with the receipt of the first pulse of the second digit to interrupt the series operating circuit for the first and second counting chain relays 1245 and 1250, respectively at its contacts 1243, and is effective at its make before break contacts 1244 to complete a holding circuit for the second counting chain relay 1250. The holding circuit for relay 1250 extends from negative battery over the lower winding of relay 1250, contacts 1253, 1265, 1275, 1284, 1294, 1244, 1233 and 1221 to positive battery. The first counting chain relay 1245 restores.

The punch recorder operates with each impulse of the incoming digit and effects the perforation of the tape with each operation.

As the last impulse of the second digit is received, pulse hold relay 1240 restores after a given period in the manner heretofore described and is effective at its contacts 1244 to interrupt the holding circuit for the second counting chain relay 1250. Simultaneously at its make before break contacts 1243, pulse hold relay 1240 completes a series operating circuit for the second and third counting chain relay 1250 and 1260, respectively, the circuit extending from negative battery over the lower winding of relay 1250, the upper winding of the third counting chain relay 1260, contacts 1252, 1246, 1243, 1233 and 1221 to positive battery.

The third counting chain relay 1260 operates and at its contacts 1265 opens a further point in the holding circuit for the second counting chain relay 1250 and at its contacts 1264 prepares a self holding circuit.

With release of the pulse hold relay 1240 and the subsequent release of the second pulse hold relay 1235, the step magnet of the punch recorder is effective to advance the tape one step for the purposes of recording an interdigital space between the second and third digits (2 and 1).

As the third digit (1) of the called party's directory number is received from the calling party's substation, the line relay 1105 is operative to extend the pulse over the outgoing side of the trunk and to operate the punch recorder 1216 to perforate the tape once. The trunk equipment is operative a brief period after receipt of the incoming pulse in the manner heretofore described, the pulse hold relays 1235 and 1240 advancing the counting chain to the fourth relay 1270, holding the third relay 1260 and effecting the release of the second counting chain relay 1250. With the termination of receipt of the third incoming digit, the step magnet 1219 again effects the advance of the tape as described heretofore, for the purpose of recording an interdigital space between the third and fourth digits (1 and 2).

The counting chain is advanced in a similar manner with receipt of the fourth, fifth and sixth digits (2, 3 and 1) the fifth counting chain relay 1280 being operated and the third counting chain relay 1260 being released with receipt of the fourth digit; the sixth counting chain relay 1290 being operated and the fourth counting chain relay 1270 being released with receipt of the fifth digit; and the seventh counting chain relay 1295 being operated and the fifth counting chain relay 1280 being released with receipt of the sixth digit.

With receipt of each of the digits the impulses thereof are re-transmitted over the outgoing loop, the number of impulses in the digit are recorded on the tape with a single space interposed between the recorded digits. A series of six digits will be recorded on the tape at this time, each of the six digits being separated by an interdigital space to avoid confusion in subsequent reading of the recorded information on the tape member.

As the counting chain is advanced to the seventh relay 1295, following receipt of the sixth digit, contacts 1296 thereof are closed to complete an operating circuit for the first timer relay 1160, the operating circuit extending from negative battery over the winding of relay 1160, contacts 1166, contacts 1296 and 1117a to positive battery.

Timer relay 1160 operates and at its contacts 1169 interrupts the energizing circuit for the pulse hold relay 1230 to effect the release thereof. Pulse hold relay 1230 restores and at its contacts 1233 interrupts the holding circuit for counting chain relays 1290 and 1295 to effect the release thereof; at its contacts 1231 completes an operating circuit for the slow-to-operate pulse hold relay 1220. Pulse hold relay 1220 is provided with a slow-to-operate characteristic to provide a sufficient period of elapsed time in which the sixth and seventh counting chain relays may be released before the chain drive circuit as controlled by the pulse hold relays 1220 and 1230 is completed.

*Tape spacing following registration of called number*

The first timer relay 1160 in its operation is also effective at its contacts 1163 to prepare a pumping circuit for the pulse holding relays 1235 and 1240 which is effective in its operation to advance the tape a predetermined number of spaces between the recorded number of the called party and the number of the calling party to be now recorded. The pumpings of relays 1235 and 1240 to effect such spacing is initiated with restoration of these relays following the termination of receipt of the last incoming impulse of the last digit of the called number.

Specifically as the second pulse relay 1235 releases, it is effective at its contacts 1237 to complete an operating circuit for the first pulse hold relay 1240 which extends from negative battery over the winding of relay 1240, contacts 1154, 1163, 1173 and 1237 to positive battery.

It is noted that during the pulsing of the called number the pulse hold relay 1220 was not operated and the pulse hold relay 1230 was operated. However, during the stepping of the tape to provide the spaces following the called party's number the pulse hold relay 1220 is maintained operated and the pulse hold relay 1230 is maintained inoperative. Additionally, the pulsing of the pulse hold relay 1240, which was previously controlled by the off-normal relay 1200 during the pulsing of the called number is now transferred by the first timer relay 1160 to the control of pulse hold relay 1235.

The pumping arrangement comprising first and second pulse hold relays 1235 and 1240, as heretofore described is rendered operative when the pulse hold relay 1235 is released following the termination of receipt of the sixth digit. Specifically the operating circuit is completed for the first pulse hold relay 1240 by the closed contacts 1237 of relay 1235. Pulse hold relay 1240 operates and is effective at its contacts 1242 to complete an operating circuit for the first counting chain relay 1245 which extends from negative battery over the winding of relay 1245 contacts 1254, 1265, 1275, 1284, 1294, 1244, 1232 and 1222 to negative battery.

Pulse hold relay 1240 at its contacts 1242 completes an obvious operating circuit for relay 1235 which operates and at its contacts 1237 interrupts the operating circuit for the pulse hold relay 1240. Relay 1240 releases and at its contacts 1242 interrupts the operating circuit for pulse hold relay 1235. Relay 1235 restores and at its contacts 1237 effects reoperation of the pulse hold relay 1240.

With each release of the pulse hold relay 1240 in such pumping operation, an operating circuit is completed for the step magnet 1219 of the punch recorder 1216, and with each subsequent release of the pulse hold relay 1235 the step magnet is deenergized and the tape is advanced one step. Simultaneously, the counting chain advances in the manner heretofore described (as a result of the pulsing of relay 1240) until such time as three spaces have been effected and the fourth counting chain, relay 1270 is operated in series with the third counting chain relay 1260. At such time an operating circuit is completed for the second timer relay 1170, the circuit extending from negative battery over the winding of relay 1170, contacts 1177, contacts 1167, contacts 1261, 1271 and 1117a to positive battery.

The second timer relay 1170 operates and at its contacts 1176 completes a self holding circuit which extends over contacts 1176, 1195 and 1113 to positive battery.

The second timer relay 1170 at its contacts 1179 completes an operating circuit for the pulse hold relay 1230, which extends from negative battery over the winding of relay 1230, contacts 1179, 1159b to positive battery. Pulse hold relay 1230 operates and at its contacts 1232 interrupts the holding circuit for the third and fourth relay of the counting chain, relays 1260 and 1270, respectively to effect the release thereof. The pulse hold relay 1230 is also effective at its contacts 1231 to interrupt the holding circuit for pulse hold relay 1220, relay 1220 being slow-to-release to provide ample opportunity for the release of the counting chain relays 1260 and 1270.

The second timer relay 1170 further at its contacts 1173 interrupts the initial energizing circuit for the pumping relays 1235 and 1240, and transfers the control thereof at its contacts 1174 to the "P" wire relays 1125 and 1130 respectively.

Thus after the receipt of the called number, the tape is advanced four steps from the point of application of the last punch, that is, one step immediately following the punch plus three additional steps which are effected as the counting chain is advanced to the third relay 1260 by the pulse hold relays 1235 and 1240.

*Initiating pulse from trunk to selector*

As the counting chain is advanced to the third and fourth relays thereof to operate the second timer relay 1170, the equipment is operatively controlled to transmit a pulse to the selector equipment over the interconnecting "P" wire 1102 as a signal to the selector that transmission of the calling party identification pulses which are registered on the selector identification board should now be initiated. Specifically, as the second timer relay 1170 operates it is effective at its contacts 1171 to remove ground from the "P" wire 1102 and to transfer control thereof thru its contact 1172 to contact 1226 of the pulse hold relay 1220. As the ground is removed from the "P" wire by the opening of contacts 1171, the operating circuit for the series "P" wire relay 970 in the selector control is interrupted and release thereof is effected. Relay 970 releases and at its contacts 972 completes an operating circuit for its second associate relay 990 which operates and locks to ground over contacts 992, 981 and 446.

Slow-to-release relay 1220 in the trunk releases following provision of the spaces on the tape following recording of the called number as heretofore described, the pulse hold relay 1220 is effective at its contacts 1226 to connect the trunk "P" wire relay 1120 in series with the series "P" wire 970 relay in the selector, the circuit extending from positive battery over the winding of relay 1120, contacts 1226, contacts 1172, 1151, 1118, "P" wire 1102, contacts 515g, conductor 313', contacts 543, conductor 313'', contacts 425, contacts C8, contacts 491, contacts 954, resistor 966 and the winding of relay 970 to negative battery.

As the series "P" wire relay 970 re-operates as a result of the connection thereof in series with the trunk relay 1120, it is effective at its contacts 971 to complete an operating circuit for preparatory relay 960 which extends from negative battery over the contacts 971 and 991 to the ground lead. Preparatory relay 960 operates and at its contacts 963 completes a self holding circuit to ground; at its contacts 962 completes a pumping circuit for the pulsing relays 940 and 950 to effect repeated alternate operation thereof; at its contacts 961 completes an operating circuit for the "thousand" transmitter sequence relay 1000; at its contacts 964 opens the circuits of the first P wire associate relay 980 which releases immediately, and the second P wire associate relay 990 which being of the slow-to-release type releases an interval later; and at its contacts 965 places a shunt across resistor 966, whereby the trunk relay 1120 may now operate in series with the selector relay 970 over the circuit heretofore described.

The transmitter sequence relay 1000 operates and at its contacts 1001 completes a self holding circuit which extends over contacts 1065, C879, C904 and contacts 446 to positive battery.

The first transmitter sequence relay 1000 is operative to prepare the identification circuit for the "thousands" digit of the calling party number for selection and transmission over the P wire to the trunk recording circuit.

As the "P" wire relay 1120 operates in the trunk circuit, in series with selector relay 970, it is effective at its contacts 1122 to complete an obvious operating circuit for the associated "P" wire relay 1125. The trunk circuit is now prepared for receipt of the calling party identification pulses from the selector.

It is important to note at this time that protection is placed on the "P" wire of the link trunk connection to insure that the seized trunk will test busy to a hunting selector during the period when the initiating pulse is being transmitted by the trunk to the selector requesting the transmission of the calling party's identification number.

More specifically, an available trunk is normally marked by the presence of low resistance battery on its associated "P" wire. The trunk busy condition is marked by the absence of low resistance battery on the "P" wire or in the alternative, that is, by ground, by high resistance battery, or by the absence of both battery or ground.

During the transmission of the start pulse by the trunk to the selector circuit, battery in series with a high resistance 966 is connected to the "P" wire by the relay 970 in the selector. The trunk will therefore test busy to a hunting selector if the "P" wire is selected during such period. Resistance 966 is later short circuited or shunted by the operation of preparatory relay 960 and the closing of contacts 965.

Also should a selector guard circuit connect a guard relay to the "P" wire during the transmission of the open pulse by the trunk, the selector relay 970 will not receive enough current to prevent it from releasing.

During the closed period of subsequent pulse, the 500 ohm relay 970 is in series with the 50 ohm trunk relay 1120. Inasmuch as the "P" wire is at about 10 volts from ground at such time, the "P" wire will test busy to any selector guard circuit which might be hunting a trunk.

During the open period of subsequent pulses there is no battery whatsoever on the "P" wire as the pulsing is done in the selector. Series "P" wire relay 970 has a coil of 500 ohms and normally has a resistor 966 connected in series therewith which is in the order of about 900 ohms. Selector relay 970 is adjusted to release on 20 milliamperes and to operate on 30 milliamperes, whereas the "P" wire relay 1120 in the trunk circuit has a coil winding of about 50 ohms.

The trunk circuit is now in the prepared condition awaiting receipt of the calling party identification impulses from the selector switch.

*Transmission of calling party identification pulses by selector controller transmitting equipment*

In brief summary, the number of the calling party W was assumed to be 32124 and such number is presently registered on the selector identification board. The selector being of the "3200" group, the "thousands" identification jumper 375 is connected at level three on the thousands group of the board and the "hundreds" jumper 380 is connected at level two of the hundreds group. The line finder tens relay "F10" and the units relay F2 are in the operated condition to provide the tens and units digit identification. Finally station register relay 830 is operated to provide the station identification digit as necessary. As the initiating pulse is now received from the trunk circuit 115, the sequence relays control the transmitter relays to transmit in proper sequence, the registered thousands, hundreds, tens, units and station digits to the trunk equipment.

*Transmission of thousands digit*

With initiation of the operation of the pumping relays 940 and 950 responsive to receipt of the initiating pulse from the trunk, the "P" wire circuit to the trunk is repeatedly interrupted at contacts 954 to effect transmission of pulses to the trunk which correspond to the thousands digit of the calling party directory number as registered on the selector identification board, this being determined by simultaneously pulsing of the selector line relay 435 by the pumping relays 940 and 950 to advance the selector counting chain in a hunting manner across the levels of the thousand group of the identification board to determine the value of the "thousands" digit of the calling party number registered thereon.

Specifically with the operation of the pulsing relay 950 as initiated by the transmitting preparatory relay 960, relay 950 is effective at its contacts 951 to complete an obvious operating circuit for the second pumping relay 940; at its contacts 953 interrupts the holding circuit for the selector line relay 435; and at its contacts 954 interrupts the series circuit for the selector "P" wire relay 970 and the trunk "P" wire relay 1120 to effect the restoration of "P" wire relay 970.

With the release of the line relay 435 and closure of contacts 439 an operating circuit for the first counting chain relay 610 is effected in the manner previously described relative to the extension of a local call through the selector equipment to the called party. Relay 610 at its contacts 610a completes a circuit for auxiliary counting chain relay 600.

The second pumping relay 940 operates, and at its contacts 941 interrupts the energizing circuit for the first pumping relay 950 to effect the restoration thereof. The second pumping relay 940 is slow-to-release and accordingly a given predetermined interval of time is effected prior to the accomplishment of the interruption of the energizing circuit for the first pumping relay 950.

As pumping relay 950 once more restores, it is effective at its contacts 954 to reclose the interrupted portion of the "P" wire circuit to effect re-operation of the selector "P" wire relay 970 and to terminate the transmission of the pulse over the trunk "P" wire. The relay 950 is also effective at its contacts 953 to reestablish the operating circuit for line relay 435 which operates and is effective at its contacts to control the operation of the first sequence relay 670 of the counting chain, the operation thereof having been set forth fully at the point of description relative to the response of line relay 435 on establishment of a local call. Relay 950 at its contacts 951 interrupts the operating circuit for the pumping relay 940 to effect the restoration thereof.

This pumping operation of relays 940 and 950 continues to effect the transmission of pulses both to the line relay 435 and over the trunk "P" wire to the interconnected trunk equipment.

The selector line relay 435 advances the selector counting chain in the manner heretofore described and as the third pulse is extended thereto, the counting chain is advanced to the third chain relay 630.

As the third counting chain relay 630 is operated it is effective at its contacts 633a to complete the prepared "thousands" identification circuit for the stop relay 900, the circuit extending from negative battery over the winding of relay 900, conductor 909, contacts 496, conductor 415, contacts 602, contacts 633a, conductor 849, conductor 809, selector thousands identification jumper 375, contacts 346, 362, conductor 837, contacts 1003, 1051, 1061, 1071, conductor 915, contacts 931 to positive battery.

In that the selector 130 illustrated in the drawings has been assumed to be in the 3200 group, and the "thousands" jumper 375 is connected to the third level of the thousand group and the identification circuit offered by the third counting chain relay 630 therefore effects energization of the stop relay 900 and termination of the impulse transmission for the thousands digit. With the advancement of the counting chain to the third relay, three impulses have been sent over the "P" wire to the trunk equipment to properly identify the thousands digit of the calling party by effecting the registration of three impulses in the equipment thereat.

Stop relay 900 is effective at its contacts 901 to complete an operating circuit for a slave relay 910, the operating circuit extending from negative battery over the winding of relay 910, contactsc 922, 901, conductor 908, contacts 494 and 446 to positive battery; and at its contacts 902 prepares the release of the selector counting chain.

Slave relay 910 operates and at its contacts 913 locks in series with the right hand winding of relay 920, the circuit extending from negative battery over resistor 915 winding of relay 910, contacts 913 and the right hand winding of relay 920, conductor 908 and contacts 494 and 446 to positive battery. Relay 920 is shunted by the original operating ground for slave relay 910 and therefore does not presently operate.

Slave relay 910 at its contacts 911 interrupts the pulsing circuit for the first pumping relay 950, the second pumping relay 940 being in the operated condition at this time.

The first pumping relay 950 restoring as a result of the opening of its energizing circuit at contact 941, at its contacts 951 effects the restoration of the second pumping relay 940.

The first pumping relay 950 in its release is effective at its contacts 953 to complete an operating circuit for line relay 435 which extends from positive battery over the winding of relay 435, contacts 493, conductor 906, contacts 953 and resistance 916 to negative battery.

Line relay 435 operates and at its contacts 438 completes an operating circuit for the third sequence relay 690 which extends from negative battery over the winding of relay 690, contacts 677, contacts 632 of the operated relay of the counting chain, contacts 438 and 446 to positive battery. The third sequence relay 690 operates and at its contacts 697 interrupts the holding circuit for the second sequence relay 680 to effect the release thereof, and at its contacts 695 interrupts the holding circuit for the second relay of the counting chain 620 to effect the release thereof.

The second pumping relay 940 in its release is effective at its contacts 942 to interrupt the holding circuit for the third sequence relay 690 and the third counting chain relay 630, the stop relay 900 having prepared for such release at its contacts 902. Relay 690 and 630 of the counting chain restore.

Counting relay 630 in its restoration is effective at its contacts 633a to interrupt the energizing circuit for the stop relay 900 to effect the restoration thereof.

Stop relay 900 in restoring is effective at its contacts 901 to interrupt the energizing circuit to slave relay 910 to effect removal of the shunt from the right hand winding of relay 920 and to permit the operation thereof.

Pulse termination relay 920 operates in series with slave relay 910 and is effective at its contacts 924 to prepare a self holding circuit and shunt circuit for the slave relay 910, both circuits becoming effective with the next operation of the stop relay 900.

Pulse termination relay 920 is further effective at its contacts 925 to insert a short circuit across the pulsing circuit to the trunk "P" wire to prevent the transmission of pulses in the "P" wire during a predetermined pause period which is now effected prior to transmission of the "hundreds" identification digit.

Pulse termination relay 920 at its contacts 921 completes an obvious operating circuit for the pause initiating relay 930.

Pause initiating relay 930 operates and at its contacts 934 completes an operating circuit for the first sequence relay 1050 of the transmitter sequence arrangement relay, the operating circuit extending from negative battery over the winding of relay 1050, contacts 1067, contacts 1002, conductor 917, contacts 934 and 961 to positive battery.

The pause initiating relay 930 at its contacts 937 completes an operating circuit for the pumping arrangement comprising relays 940 and 950, which extends from negative battery over the winding of pumping relay 950, contacts 941, 962, 937, 912 to positive battery.

The pulsing relays are now operative to effect a pause of a predetermined period prior to transmission of the hundreds digit, whereby the recorder equipment is provided with a time period sufficient to introduce a space between the thousands digit received and the hundreds digit which is to arrive subsequently.

The first sequence relay 1050 which has operated prepares for the operation of the hundreds relay 1010 of the sequence control arrangement. Relay 1050 completes a self holding circuit for itself which extends over contacts 1067, 1056, conductor 904 and contacts 446 to positive battery. The selector identification equipment now introduces a pause which is equivalent to a six pulse duration.

*Response of trunk circuit to receipt of the thousands digit*

With reference now to the trunk circuit as set forth in Figures 11 and 12, the three impulses of the first digit of the calling party identification number as transmitted by the selector are received over the "P" wire pulsing circuit which extends over conductor 1102, contacts 1118, 1151, 1172, 1226 to the winding of relay 1120 and positive battery.

It will be remembered that the first and second "P" wire relays 1120 and 1125 were energized on the restoration of relay 1220 of the trunk and is subsequently maintained energized over the "P" wire pulsing circuit.

With receipt of the break portion of the first incoming impulse, the "P" wire relay 1120 is released and at its contacts 1122 interrupts the energizing circuit for the second "P" wire relay 1125, which being of the slow-to-release type, will remain held during the period of incoming pulses.

The first "P" wire relay 1120 at its contacts 1123 completes an energizing circuit to the third "P" wire relay 1130 which extends over contacts 1123 and 1127. The third "P" wire relay 1130 is also of the slow-to-release type and will remain in the operated position during the receipt of the incoming pulses of each digit over the "P" wire. The third "P" wire relay 1130 is operative at its contacts 1132 to complete an operating circuit for pulse hold relay 1240, the circuit extending from negative battery over the winding of relay 1240, contacts 1154, 1163, 1174, 1132, 1126 to positive battery.

Pulse hold relay 1240 operate and at its contacts 1242 completes an obvious operating circuit for the second pulse hold relay 1235 and at its contacts 1244 completes the operating circuit for the first counting chain relay 1245 over the circuit heretofore described.

Inasmuch as the third "P" wire relay 1130 remains operated during the period that incoming pulses of the first digit are received over the "P" wire, it will be effective at its contacts 1132 to maintain the first and second pulse hold relay 1235 and 1240 in the energized condition for an equivalent length of time.

As the break portion of the first incoming impulse is terminated the trunk selector series "P" wire circuit is completed and the first "P" wire relay 1120 is re-operated. Relay 1120 at its contacts 1121 completes an operating circuit for the punch magnet of the punch recorder which extends from negative battery over the winding of the punch coil 1217, contacts 1191, contacts 1162, 1131 and 1121 to positive battery.

The punch magnet 1217 operates to punch a hole in the tape and at its contacts 1218 completes an energizing circuit for the step magnet 1219.

As the break portion of the second impulse is received the "P" wire relay 1120 is released and at its contacts 1121 effects the restoration of the punch magnet and the release of the step magnet 1219 to advance the tape one space.

As the break portion of the second pulse is terminated the first "P" wire relay 1120 re-operates to again operate the punch magnet 1217, and in turn the step magnet 1219 whereby a second hole is punched in the tape to indicate the receipt of the second impulse.

The repeated operation of the first "P" wire relay 1120 in this manner responsive to receipt of the three incoming identification pulses effects registration of the thousands digit of the calling party.

As the make pulse of the last incoming pulse of the series is received, the first "P" wire relay 1120 is energized and after a given period of time has expired following receipt thereof, the third "P" wire relay 1130 restores. The third "P" wire relay 1130 releases and is effective at its contacts 1131 to restore the punch magnet 1217 as well as the step magnet 1219 to effect the advance of the tape one step.

The release of the third "P" wire relay 1130 also effects opening of the operating circuit for the pulse hold relays 1235 and 1240, the second pulse hold relay 1235 being slow-to-release and remaining operated a short period after the release of the first pulse hold relay 1240. With the first pulse relay 1240 in the non-operated position and the second pulse hold relay 1235 in the operated position the step magnet 1219 is operated over the aforedescribed circuit comprising contacts 1241 and 1236 to effect the energization of the step magnet 1219.

A short predetermined interval subsequent to the release of the second impulse hold relay 1235, step magnet 1219 is deenergized and in releasing advances the tape a step to accomplish registration of an interdigital space.

The first pulse hold relay 1240 is further effective at its contacts 1243 to complete an operating circuit for the first and second counting chain relays 1240 and 1245, the circuit extending from positive battery over the windings of relay 1245 and 1250, contacts 1247, 1243, 1233, and 1221 to negative battery.

The first and second "P" wire relay 1120 and 1125 are now maintained operated over the series trunk selector "P" wire pulsing circuit pending the provision by the selector transmitter control relays of a six pulse pause between transmission of the thousands and hundreds identification digits.

*Interdigital pause between thousands and hundreds identification digit transmissions*

Specifically, with the termination of the transmission of the thousands digit by the selector identification relays, the pause control relay 930 is operative to complete an energizing circuit for the pumping relays 940 and 950. Pumping relay 950 operates and at its contacts 951 effects operation of second pumping relay 940 and at its contacts 953 interrupts the holding circuit for the line relay 435 to effect the release thereof.

Line relay 435 effects the operation of the first counting chain relay 610, as heretofore described, and the second pumping relay 940 in its operation is effective at its contacts 941 to interrupt the energizing circuit for the first pumping relay 950 to effect the restoration thereof.

First pumping relay 950 restores and at its contacts 951 interrupts the energizing circuit for the second pumping relay 940, and at its contacts 953 recompletes an energizing circuit for the line relay 435 to effect the energization thereof.

Line relay 435 operates to effect the energization of the first sequence relay 670 associated with the selector counting chain. The pumping relays 940 and 950 alternatively operate and release to operate the line relay 435 to thereby effect the advance of the counting chain in the manner heretofore described to the sixth relay 645 thereof at which time an operating circuit for the stop relay 900 is completed and the interdigital pause is ended.

That is, with the operation of the sixth counting chain relay 645 an operating circuit is extended to the stop relay 900 from negative battery over the winding of relay 900, conductor 909, contacts 496, conductor 415, contacts 602, conductor 648a, conductor 858 and conductor 877, contacts 932 to positive battery.

Stop relay 900 operates and at its contacts 902 opens a portion of the holding circuit for the sixth counting chain relay 645 and the third sequence relay 690 associated with the selector counting chain.

Stop relay 900 at its contacts 901 completes a shunt circuit for the slave relay 910 and a holding circuit for the pulse termination relay 920. Slave relay 910 releases and at its contacts 913 interrupts the energizing circuit which extends from the right hand winding of the pulse termination relay 920 and at its contacts 912 interrupts the energizing circuit for the pumping relays 940 and 950. The transmission of impulses to the line relay 435 is thereby terminated and the interdigital pause completed.

As the actuating ground is removed from the pumping relay arrangement and the second pumping relay 940 effects the final restoration of the first pumping relay 950 as described heretofore, contacts 953 thereof are closed to complete an operating circuit for the line relay 435 and contacts 951 thereof are open to release the second pumping relay 940.

As the line relay 435 operates, it is effective to complete an operating circuit for the third sequence relay 690 which at its contacts 695 interrupts the holding circuit for the fifth counting chain relay 640 and at its contacts 697 interrupts the holding circuit for the second sequence relay 680 to effect the release thereof.

As the second pumping relay 940 restores, it is effective at its contacts 942 to effect the release of the sixth counting chain relay 645 and the third sequence relay 690.

As the sixth counting chain relay 645 releases, it is effective at its contacts 648a to interrupt the holding circuit for the stop relay 900 and to effect the restoration thereof which in turn is effective at its contacts 901 to release the pulse termination relay 920.

Pulse termination relay 920 restores, and at its contacts 921 interrupts the energizing circuit for the pause initiating relay 930, and at its contacts 925 removes the short circuit from the trunk "P" wire pulsing circuit to permit further pulsing thereover.

With the restoration of the pause initiating relay 930, an operating circuit is completed for the hundreds identification relay 1010, the circuit extending from negative battery over winding of relay 1010, contacts 1004, 1054, 1063, 1073, conductor 916, contacts 933 and 961 to positive battery.

Pause control relay 930 at its contacts 936 also recompletes the energizing circuit for the pumping relays 940 and 950 to re-initiate the transmission of the calling party identification pulses over the "P" wire series circuit, the pulses transmitted at this time comprising the hundreds digit of the calling party number.

The hundreds identification relay 1010 of the sequence control arrangement operates and at its contacts 1012 prepares an operating circuit for the second sequence relay 1060; at its contacts 1013 prepares the hundreds identification checking circuit; and at its contacts 1011 completes a self holding circuit which extends over contacts 1011, 1075 and conductor 879, conductor 904, contacts 446 to positive battery.

*Transmission of hundreds identification digit*

In that the calling party W is connected to the 3200 selector group, the jumper 380 for the hundreds group on the identification board is connected at level "2."

As the first pumping relay 950 operates with completion of the energizing circuit therefor by the pause control relay 930, the second pumping relay 940 is energized and the line relay 435 is released in the manner heretofore described. The open period of the first pulse is transmitted with the opening of contacts 954 by the first pumping relay 950 in its operation, the series relay 970 in the trunk "P" wire circuit being released with the transmission thereof.

With the release of the line relay 435, the first counting chain relay 610 is operated.

The second pumping relay 940 operates and at its contacts 941 opens the operating circuit for the first pumping relay 950. First pumping relay 950 releases and at its contacts 954 terminates the transmission of the open period of the pulse of the trunk "P" wire and effects the re-operation of the series relay 970. Pumping relay 950 at its contacts 953 reestablishes the energizing circuit of the line relay 435 which operates to control the energization of the first sequence relay 670.

Pumping relay 950 at its contacts 951 restores the second pumping relay 940 which releases and at its contacts 941 recompletes the operating circuit for pumping relay 950.

The first pumping relay 950 re-operates and effects the transmission of the open period of the second pulse, the release of the second pumping relay 940, and the release of the line relay 435 to effect advancement of the counting chain to the second relay 620.

With the advancement of the counting chain to the second relay 620, the two identification pulses have been transmitted to the trunk and the selector chain has advanced to the hundreds identification circuit an operating circuit is now completed for the stop relay 900, to terminate transmission of pulse for the hundreds digit, the circuit extending over negative battery, the winding of relay 900, conductor 909, contacts 496, conductor 415, contacts 602, contacts 624, conductor 848, conductor 808, jumper 380, contacts 348, 364, conductor 836, contacts 1013, contacts 1052, 1061, 1071, conductor 915 and contacts 931 to positive battery.

Stop relay 900 operates and at its contacts 902 prepares for the release of the counting chain and at its contacts 901 completes an operating circuit for the slave relay 910.

Slave relay 910 operates and locks in series with the right hand winding of pulse termination relay 920, this relay being shunted by the original operating circuit for the slave relay 910. Slave relay 910 at its contacts 911 interrupts the energizing circuit for the pumping relay to terminate transmission of pulses over the "P" wire circuit. In the meantime, however, the second pumping relay 940 has operated.

In further sequence the second pumping relay 940 at its contacts 941 interrupts the operating circuit for the pumping relay 950 to effect the restoration thereof, which in turn restores the second pumping relay 940 to operate the line relay 435 in the manner heretofore described. Line relay 435 operates and completes an operating circuit for the second sequence relay 680, which in operating effects the release of the first sequence relay 670 and the first counting chain relay 610.

As the second pumping relay 940 now restores, it is effective at its contacts 942 to effect the release of the second counting chain relay 620 in the second sequence relay 680.

The second counting chain relay 620 restores and at its contacts 624 interrupts the energizing circuit for the stop relay 900 to effect the release thereof.

Stop relay 900 restores and at its contacts 901 removes the shunt circuit for the pulse termination relay 920. With removal of the shunt, pulse termination relay 920 operates in series with the slave relay 910 and at its contacts 921 completes an obvious operating circuit for the pause control relay 930 and at its contacts 925 completes a short circuit for the pulsing path to the trunk "P" wire to further prevent transmission of further pulses for the hundreds digit.

Pause control relay 930 operates and at its contacts 937 completes an operating circuit to the pumping relays 940 and 950 to introduce a six pulse pause following transmission of the hundreds identification digit.

Pause control relay 930 is also effective at its contacts 935 to complete an operating circuit for the second sequence relay 1060, the circuit extending from negative battery over the winding of relay 1060, contacts 1077, contacts 1012, conductor 918, contacts 935 and contacts 961 to positive battery. The second sequence relay 1060 operates and completes a self holding circuit which extends over contacts 1077, 1066 and conductor 879, 904 and contacts 446 to ground.

*Trunk response to receipt of hundreds digit (2)*

It will be recalled that the trunk repeater equipment has established the registration of three punches in the tape member followed by an interdigital spacing responsive to receipt of the thousands identification digit. As the hundreds identification digit is now received, the tape is perforated twice, this being the value of the received hundreds identification digit.

Specifically, the operation of the trunk responsive to receipt of the two incoming impulses is similar to that set forth hereinbefore with reference to the receipt of the thousands identification digit. That is, as the break period of the first incoming impulse is received the "P" wire relay 1120 restores to effect the operation of the third "P" wire relay 1130 to thereby effect the operation of the first and second pulse hold relays 1235 and 1240. The operation of the first pulse relay 1240 effects restoration of the first counting chain relay 1245, the second counting chain relay 1250 being maintained operated over its self holding circuit.

With the receipt of each pulse the "P" wire relay 1120 effects the operation of the punch magnet and the step magnet 1219 to perforate the tape once and advance the tape one step for a subsequent recording. With the receipt of two impulses at this time, the "P" wire relay 1120 is operated twice to place two perforations in the tape for the hundreds identification digit of the calling party.

Following termination of receipt of the second impulse and the subsequent restoration of the third "P" wire relay 1130, the first and second pulse hold relays 1235 and 1240 operate in the manner heretofore described to provide an interdigital spacing on the tape member. The first pulse hold relay 1240 is further effective at its contacts 1243 to complete an operating circuit for the third counting chain relay 1260, the circuit extending from negative battery over the windings of relay 1250, the winding of the third counting chain relay 1260, contacts 1252, 1246, 1243, 1233 and 1221 to positive battery.

*Interdigital pause between hundreds and tens identification digit transmissions*

A pause is introduced between the transmission of the hundreds digit and the subsequent transmission of the tens identification digit, such pause being equivalent in length to the transmission of six normal pulses and being introduced in the manner that the interdigital pause between the thousands and hundreds digits was accomplished.

In brief summary, with the release of the pause control relay 930 in the selector to initiate the operation of the pumping relays 940 and 950, the line relay 435 is operated to advance the counting chain to the sixth counting chain relay 645. Whereupon the pause control relay 930 is restored and an operating circuit is completed for the tens identification relay 1020 in the sequence control group. The operating circuit for relay 1020 extends from negative battery over the winding of relay 1020, contacts 1014, 1064, 1073, conductor 916, contacts 934 and 961 to positive battery. The tens identification sequence relay 1020 operates and at its contacts 1021 completes a self holding circuit which extends over contacts 1021, 1055, conductor 879, 904 and contacts 446', at its contacts 1023 prepares a tens identification checking circuit and at its contacts 1022 prepares a circuit for the third sequence relay 1070 of the arrangement.

*Transmission of tens identification digit by selector*

It will be remembered that the calling party W has a directory number of 3212 and accordingly the registered tens identification digit is digit "1." Following the introduction of the second six-pulse pause by the selector equipment, the tens identification digit is transmitted over the interconnecting "P" wire pulsing circuit to the trunk 115 in the following manner.

As the pause control relay 930 restores upon termination of the pause introduced between the transmission of the hundreds and tens digit, it is effective at its contacts 936 to recomplete the energizing circuit for the pumping relays 940 and 950. Pumping relay 950 operates and at its contacts 951 completes the energizing circuit for the second pumping relay 940, at its contacts 953 interrupts the energizing circuit for the line relay 435, at its contacts 954 opens the trunk "P" wire to effect the transmission of an open pulse thereover to the interconnected trunk equipment and simultaneously effects the release of the selector "P" wire relay 970. As the line relay 435 releases, it is effective to operate the first relay 610 of the selector counting chain and the auxiliary relay 600.

The first counting chain relay 610 operates and at its contacts 614 completes the identification circuit for the tens digit to effect operation of the stop relay 900 and to terminate transmission of the identifying pulses therefore, it being recalled that tens identification digit for the calling subscriber W is one (1).

Specifically, the operating circuit for the stop relay 900 extends from negative battery over the winding of relay 900, conductor 909, contacts 496, conductor 415, contacts 602, contacts 614, conductor 847, conductor 807, conductor 321, contacts C1 of the operated relay 410, contacts 36f of the operated line finder tens selection relay F10 in the line finder, conductor 334, contacts 354, conductor 839, contacts 1023, contacts 1062, 1071, conductor 915 and contacts 931 to positive battery.

Stop relay 900 operates and at its contacts 902 prepares release of the selector counting chain, and at its contacts 901 completes an operating circuit for slave relay 910.

Slave relay 910 operates and at its contacts 913 completes a series locking circuit with the right hand winding of the pulse termination relay 920, the relay being shunted by the original operating ground for the slave relay 910. Slave relay 910 at its contacts 912 also interrupts the energizing circuit for the pumping arrangement, the second pumping relay 940 being in the operated condition at such time.

Second pumping relay 940 now proceeds to interrupt the energizing circuit for the pumping relay arrangement, relay 940 at its contacts 941 further interrupting the holding circuit for the first pumping relay 950 which releases; at its contacts 951 effecting the release of pumping relay 940; at its contacts 953 completing the operating circuit for the line relay 435; and at its contacts 954 terminating the transmission of the open period of the pulse over the trunk "P" wire to effect re-operation of the series "P" wire relay 970 in the selector.

Line relay 435 in operating effects energization of the first sequence relay 670. As second pumping relay 940 now releases it is effective at its contacts 942 to interrupt the energizing circuit for the first counting chain relay 610 and the first sequence relay 670 to effect the restoration thereof.

As the first counting chain relay 610 restores, it is effective at its contacts 614 to interrupt the energizing circuit for the stop relay 900 which restores, and at its contacts 901 removes the shunt circuit from the pulse termination relay 920 to permit the operation thereof.

Pulse termination relay 920 operates in series with slave relay 910 and at its contacts 921 effects operation of pause control relay 930 while simultaneously short circuiting the pulsing path to the trunk "P" wire at its contacts 925.

Pause control relay 930 operates and at its contacts 934 completes an operating circuit for the third sequence relay of the transmitter sequence arrangement. The operating circuit extending from negative battery over the winding of relay 1070, contacts 1057, contacts 1022, conductor 917, contacts 934 and 961 to positive battery. The pause control relay 930 also completes an energizing circuit for the pumping relay 950 and 940 to provide an interdigital six pulse pause between the transmission of the tens and units identification digits.

The third sequence relay 1070 operates, and at its contacts 1076 completes a self holding circuit extending from negative battery over the winding of relay 1070, contacts 1057, contacts 1076, conductor 879, conductor 904, contacts 446, the third sequence relay being operative to prepare the units identification relay 1030 for the transmission of the units identification digit.

*Trunk response to receipt of the tens identification digit*

The trunk "P" wire relays respond to the incoming tens digit much in the manner described relative to the operation thereof with receipt of the hundreds and thousands identification digits.

Briefly, the first "P" wire relay 1120 responds to the open portion of the first impulse to complete an operating circuit for the third "P" wire relay 1130, which in turn completes an operating circuit for the punch magnet 1217 and the step magnet 1219 in the punch recorder 1216.

The third "P" wire relay 1130 in operating is also effective at its contacts 1132 to complete an operating circuit for the first and second pulse hold relays 1235 and 1240 in the manner heretofore described, the operation of the first pulse hold relay 1240 at this time effecting the release of the second counting chain relay 1250.

The third counting chain relay 1260 is held operated over the energizing circuit extending from negative battery over contacts 1264, 1275, 1284, 1294, 1244, 1233 and 1221 to positive battery.

With termination of receipt of the single impulse (which is the tens identification digit in this example) the "P" wire relays 1120 and 1125 are maintained in the energized condition and the third "P" wire relay 1130 is restored after a brief interval. With restoration of the third "P" wire relay 1130, the energizing circuit for the punch magnet 1217 is interrupted and the release thereof, along with the release of the step magnet 1219 is effected. Additionally, the circuit is opened to the first pulse hold relay 1240 which restores and at its contacts 1242 interrupts the holding circuit for the second pulse relay 1235. Relay 1235 is slow to release, and as the first pulse hold relay 1240 closes its contacts 1241, an operating circuit is completed for the step magnet 1219 to effect the advancement of the tape one step. As pulse hold relay 1235 restores a brief interval thereafter, the step magnet releases and the tape is advanced one step.

Also with release of the pulse hold relay 1240, a series operating circuit is completed for the fourth counting chain relay 1270, the operating circuit extending from negative battery over the lower winding of relay 1260, the upper winding of relay 1270, contacts 1263, 1251, 1246, 1243, 1233 and 1221 to positive battery.

The first and second "P" wire relays 1120 and 1125 respectively are maintained operated during the following pause which is effected by the selector between the hundreds and units digits.

*Interdigital pause between tens and units identification digit transmissions*

A pause which is equivalent in length to the transmission of six normal impulses is introduced between the transmission of the tens and units identification digits by the selector equipment, such pause being effected in a manner similar to that described heretofore as accomplished between the tens and hundreds and the hundreds and thousands digit.

As the pause control relay 930 restores at the end of the accomplishment of such pause, it is effective at its contacts to complete an operating circuit for the units identification relay 1030, the operating circuit extending from negative battery over the winding of relay 1030, contacts 1024, 1074, conductor 916, contacts 933 and 961 to positive battery.

Units identification relay 1030 operates and at its contacts 1031 locks to ground over contacts 1065, conductor 879, 904 and contacts 446 to ground, the units identification relay 1030 being operated at this time to prepare the checking circuit for terminating operation of the selector counting chain as the proper units identification digit has been transmitted.

*Transmission of units identification digit by selector*

With the restoration of pause control relay 930, the operating circuit for the pumping relays 940 and 950 is completed by the closure of contacts 936, and the pumping arrangement becomes effective to advance the counting chain and transmit impulses over the line in the manner heretofore described with reference to the transmission of the thousands, hundreds, and tens identification digit.

Briefly, the first pumping relay 950 at its contacts 951 accomplishes operation of the second pumping relay 940; at its contacts 953 releases the line relay 435, and at its contacts 954 opens the trunk "P" wire to effect the transmission of the open period of a pulse over the interconnecting "P" wire pulsing circuit and effects the release of the series "P" wire relay 970 in the selector. Release of the line relay 435 effects the operation of the first counting chain relay 610 and associate relay 600.

The second pumping relay 940 operates to release the first pumping relay 950 which at its contacts 954 terminates transmission of the outgoing open pulse and re-operation of series "P" wire relay 970.

The first pumping relay 950 at its contacts 953 re-operates the line relay 435 which operates the first sequence relay 670 and at its contacts 451 effects the release of the second pumping relay 940.

As the second pumping relay 940 restores, it effects re-operation of the first pumping relay 950 which at its contacts 954 accomplishes the transmission of the second pulse over the outgoing "P" wire pulsing circuit to the trunk unit 115. Line relay 435 is restored which advances the chain by completing an operating circuit for the second counting chain relay 620.

It will be recalled that the directory number assigned to the illustrated calling party W is 3212, and the units identification digit to be transmitted is therefore digit 2. As the counting chain now advances to the second counting chain relay 620 as the result of the transmission of the two identification impulses, the stop relay 900 is operated to terminate the transmission of further impulses for the units digit.

The check circuit for units digits extends over the line finder units selection relays and specifically over the second units relay (F2) associated with the calling party substation W. As the counting chain advances to complete the identification circuit thereover, the impulse transmission is terminated.

The units identification circuit to the stop relay 900 extends from negative battery over the winding of relay 900, conductor 909, contacts 496, conductor 415, contacts 602, contacts 624, conductor 848, conductor 808, conductor 322, contacts C2, contacts f of the line finder selection units relay 312 (F2), conductor 333, contacts 353, conductor 838, contacts 1033, contacts 1072, conductor 915, contacts 931 to positive battery.

With the operation of the stop relay 900, the identification transmitter relays 910 and 920 operate in the manner heretofore described to terminate the transmission of pulses, to short circuit the pulsing path to the trunk "P" wire to prevent transmission of further outgoing pulses thereover, and to effect the operation of the first sequence relay 1050 of the transmitter sequence arrangement, as well as the operation of the pause control relay 930.

Briefly, as the stop relay 900 operates it is effective at its contacts 901 to operate slave relay 910, which operates and locks in series with the right hand winding of the pulse termination relay 920. Relay 920 is presently prevented from operating by the existing shunt circuit for the slave relay 910. Slave relay 910 at its contacts 912 also interrupts the pulsing ground for the pumping relays 940 and 950.

The pumping relay 940 operates in the meantime to release the first pumping relay 950 which in turn releases the second pumping relay 940 and operates line relay 435.

Line relay 435 operates the second sequence relay 680 and effects the release of the first counting chain relay 610 and the first sequence relay 670. As the second pumping relay 940 restores, it effects release of the second counting chain relay 620 and the second sequence relay 680. The second counting chain relay 620 in restoring effects release of the stop relay 900, which in its restoration removes the shunt from the pulse termination relay 920 to effect the operation of the pause control relay 930, and the short circuiting of the pulsing path to the trunk "P" wire.

With operation of the pause control relay 930, an operating circuit is completed for the first sequence relay 1050 which extends from negative battery over the winding of relay 1050, contacts 1067, contacts 1032, conductor 918, contacts 935, and 961 to positive battery. The first sequence relay 1050 operates and at its contacts 1074 prepares a circuit for the station identification relay 1040 and at its contacts 1056 completes a self holding circuit which extends over contacts 1067, 1056, conductor 879, conductor 904, contacts 446 to positive battery.

The pause control relay 930 is effective in the manner heretofore described to complete an operating circuit for the pumping relays 940 and 950 which introduces a six impulse pause between the transmission of the units and station identification digits.

*Trunk response to receipt of units identification digit*

With receipt of the two incoming impulses which are representative of the units identification digit, the "P" wire relays 1120, 1125 and 1130 respond in a manner heretofore described to effect the operation of the punch magnets and step magnet to perforate the tape member twice. With receipt of the first impulse of the units identification digit the "P" wire relay 1120 also effects the operation of the pulse hold relays 1240 and 1235 which, in turn, effect the release of the third counting chain relay 1260 in the trunk 115. A brief interval after the termination of the last impulse of the units identification digit has been received, the third "P" wire relay 1130 is restored and the pulse hold relays 1240 and 1235 are released.

The pulse hold relays 1240 and 1235 effect the operation of the step magnet 1219 to advance the tape one space and pulse hold relay 1245 additionally effects the series operation of the fifth counting chain relay 1280 in series with the fourth counting chain relay 1270.

*Interdigital pause between units and station identification digit transmissions*

A pause equivalent in length to six normal pulses is introduced between transmission of the units and station identification digits in the manner referred to in more detail hereinbefore, the pause control relay 930 effecting completion of the energizing circuit for the pumping relays 940 and 950 in its operation following transmission of the units identification digit.

As the pause control relay 930 is restored following the accomplishment of an interval equivalent to six pulses, the station identification relay 1040 is operated over a circuit extending from negative battery over the winding of relay 1040, contacts 1034, contacts 1054, 1063, 1073, conductor 916, contacts 933 and 961 to positive battery.

Pause control relay 930 at its contacts 936 also recompletes operating circuit for the pumping relays 940 and 950 to initiate transmission of the station identification digit pulses over the interconnecting "P" wire series circuit.

*Transmission of station identification digit by selector*

In that the calling party W in the illustration has a directory number of 32124, the registered station identification digit is 4, and accordingly the four impulses are now transmitted by the selector identification relays to the trunk 115.

With the operation of the first pumping relay 950, the line relay 435 is restored to initiate advancement of the counting chain, the series "P" wire relay 970 is released, and the series pulsing circuit to the trunk circuit is interrupted to effect the transmission of the open period of the first pulse.

The pumping relays 950 and 940 alternatively operate in the manner heretofore described to effect advancement of the counting chain to the fourth relay and the simultaneous transmission of four impulses over the interconnected "P" wire pulsing circuit.

With the operation of the fourth relay of the counting chain, the digit 4 will have been transmitted to the toll trunk and the station identification circuit is completed to the stop relay 900 to terminate the pulse transmission. It will be remembered that the fourth station register relay 830 is in the operated position as a result of the special pulse transmission by the dial of the calling subscriber, and is now effective in determining the extent of advancement of the selector counting chain and the number of the station identification impulses transmitted.

Specifically, the operating circuit for the stop relay 900 extends from negative battery over the winding of stop relay 900, conductor 909, contacts 496, conductor 415, contacts 602, contacts 638a, conductor 856, contacts 832, conductor 878, contacts 1043, contacts 1052, 1061, 1071, conductor 915, contacts 931 to positive battery.

Stop relay 900 operates and at its contacts 901 completes an energizing circuit for slave relay 910 and at its contacts 902 prepares to effect the release of the selector counting chain which will take place upon the subsequent release of pumping relay 940.

Slave relay 910 operates and locks in series with the right hand winding of the pulse termination relay 920, the pulse termination relay 920 being shunted by the original operating ground for the slave relay 910 and therefore inoperative at the present time. Slave relay 910 at its contacts 911 interrupts the energizing circuit to the pumping relays 950 and 940 to temporarily discontinue operation thereof. Both relays, which have a slightly delayed release characteristic, will be in the operated position at the time of the operation of relay 910.

Presently as the first pumping relay 950 restores, it is effective at its contacts 951 to interrupt the energizing circuit for the second pumping relay 940, and at its contacts 953 completes an operating circuit for the line relay 435 to effect the operation thereof. Line relay 435 operates and effects operation of the first sequence relay 670, which in turn operates and effects the release of the third counting chain relay 630 and the third sequence relay 690. The second pumping relay 940 restores and at its contacts 942 interrupts the holding circuit for the fourth counting chain relay 635 and the first sequence relay 670 to effect the release thereof.

As the fourth counting chain relay 635 restores it is effective at its contacts 638a to interrupt the holding circuit for the stop relay 900 to effect the release thereof. Stop relay 900 restores and at its contacts 901 removes the shunt for the pulse termination relay 920 to effect the operation thereof in series with slave relay 910.

Pulse termination relay 920 operates and at its contacts 921 completes an operating circuit for the pause control relay 930 and short circuits the pulsing path to the trunk "P" wire.

The pause control relay 930 in operating at this time does not complete an operating circuit for a sequence relay in the manner of its previous operations for the contacts on the station identification relay 1040 are not arranged in the manner of the units, tens, etc., identification relays.

However, with the operation of the slave relay 910 following completion of the transmission of the station identification digit, a prepared operating circuit is completed for the identification terminating relay 420 which extends from negative battery over the winding of relay 420, contacts C9, conductor 903, contacts 914, conductor 919, contacts 1044, conductor 879, conductor 904 and contacts 446.

The identification terminating relay 420 operates and at its contacts 421 completes an obvious circuit for slave relay 417, at its contacts 423 locks to ground through contacts 410a, at its contacts 422 extends the "P" wire ground on 313" over the conductor to the line finder to thus accomplish holding of the line relay 275 and in turn the lock-out relay 260 in the line circuit. The identification terminating relay 420 at its contacts 424 extends the same "P" wire trunk ground to relay 405 to maintain said relay in the operated condition.

Slave relay 417 operates and at its contacts 418 interrupts the energizing circuit for the selector control relays 410, 350 and relay 385.

As selector control relay 410 restores along with relay 350 and relay 385, the selector controller is released and the associated relays 484, 485, 480, 490 and 498 are likewise restored. Relay 490 at its contacts 493 interrupts the energizing circuit between the selector controller and the line relay 435 as well as the holding circuit for the series "P" relay 970 to effect the restoration thereof.

Line relay 435 releases and at its contacts 436 effects the release of the hold relay 433 which restores and at its contacts 434 effects the release of slave relay 440.

The slave relay 440 restores and at its contacts 446 interrupts the holding circuit for the identification transmitter relays 960, 910, 920, the station identification relay 1040, and the sequence relay 1050 of the transmitter sequence arrangement. As the pulse termination relay 920 restores, it effects the restoration of the associated pause control relay 930. Slave relay 440 at its contacts 447 completes an operating circuit for relay 400, which at its contacts 401 restores the ground circuits for all of the line finder distribution relays 254, etc., which are associated with the other selector switches in the group, i. e., switches two, three, four, etc. Ground is not forwarded by selector one in that selector one is busy and the hold supervisory relay 405 is operated.

Assuming at least one idle selector in the group ground will be forwarded through the contacts 411 of the idle selector to operate the associated line finder relay of the group A1 to A10 to effect the release of reset relay MD.

Relay MD will release and effects the release of reset relays MDA and MDB. The selector controller equipment is now ready for reuse with any of the idle selectors in the group of selectors assigned thereto.

*Response of trunk to receipt of station identification digit*

With receipt of the first impulse of the station identification digit, the "P" wire relay 1120 restores to effect operation of the third "P" wire relay 1130. As the first "P" wire relay 1120 is reoperated with receipt of the make period following the first break period, a single perforation is placed in the tape member by the punch recorder.

The first pulse hold relay 1235 and 1240 are operated and relay 1240 at its contacts 1243 effects release of the fourth counting chain relay 1270, the fifth counting chain relay 1280 remaining held over a circuit extending from negative battery over the lower winding of relay 1280, contacts 1283, 1294 and 1244, 1233 and 1221 to positive battery.

The four incoming impulses of the station identification digit effect the operation of the "P" wire relay 1120 to effect the repeated operation of the punch recorder and the provision of four perforations in the tape member.

A given interval after the receipt of the fourth incoming impulse, the third "P" wire relay 1130 will return in the restored condition and the release of first pulse hold relay 1240 will be effected. As relay 1240 restores, it is effective at its contacts 1241 to complete the operating circuit for the step magnet of the punch recorder 1216 to cause the tape to be advanced one step and a resultant spacing between the last recorded station identification digit and the subsequent information to be noted thereon. (See Figure 15.)

A brief interval thereafter the second pulse hold relay 1235 restores in the manner heretofore described.

With restoration of the first pulse hold relay 1241 an operating circuit is completed for sixth counting chain relay 1290 in series with the fifth counting chain relay 1280, the operating circuit extending from negative battery over the lower winding of relay 1280, the upper winding of relay 1290, contacts 1282, 1272, 1262, 1251, 1246, 1243, 1233 and 1221 to positive battery.

As the sixth counting chain relay operates, it is effective at its contacts 1291 to complete an operating circuit for the recording follower relay 1150 which extends from negative battery over the winding of relay 1250, contacts 1157, 1178 and 1291 to positive battery.

Recording follower relay 1150 operates and at its contacts 1156 completes a self holding circuit which extends over contacts 1175 to positive battery; at its contacts 1159b interrupts the holding circuit for the third pulse holding relay 1230 to effect the release thereof which is in turn operative at its contacts 1233 to interrupt the holding circuit for the fifth and sixth counting chain relays 1180 and 1190 to effect the restoration thereof.

The third pulse hold relay 1230 in its release is also effective at its contacts 1231 to complete an operating circuit for the fourth pulse hold relay 1220 which is slow to operate to insure provision of sufficient time for accomplishing the release of the counting chain relays 1280 and 1290 prior to the point where a chain drive circuit is prepared through contacts 1222 and 1232.

Recording follower relay 1150 at its contacts 1151 also interrupts the series circuits which extend to the "P" wire relay 1120 to effect the release thereof and reestablishes the trunk holding ground for the "P" wire which circuit extends from "P" wire over contacts 1118, contacts 1152, conductor 1102 and contacts 1212 to positive battery.

A short interval after the release of the first "P" wire relay 1120 the second "P" wire relay 1125 also restores. The release of the first "P" wire relay 1120 also effects operation of the third "P" wire 1130 but without any operative effect, the slow release relays 1125 and 1130 then releasing in cascade thereafter.

The recording follower relay 1150 in operating also prepares a circuit for the pump relays of the pulse hold circuit 1240 and 1235 to provide a tape spacing following the perforations which indicate the calling party number.

*Tape spacing following receipt of calling party identification digit*

As the result of the operation of the recording follower relay 1150, the third pulse hold relay 1230 is now in the inoperative condition and the fourth pulse hold relay 1220 is operative, this being the opposite condition that existed during the receipt of the identification pulses. It is also noted that the control of the pulse hold relay 1240 is now once more transferred to the contacts of the pulse hold relay 1235.

Specifically, when the pulse hold relay 1235 releases following receipt of the identification pulses, it is operative at its contacts 1237 to complete a circuit for the first pulse hold relay 1240 which extends from negative battery over the winding of relay 1240, contacts 1153, contacts 1181 and 1237 to positive battery. Pulse hold relays 1235 and 1240 now pump until the energizing circuit therefor is interrupted, the first pumping relay 1240 operating a second pumping relay 1235 which releases the first pumping relay 1240 and which in turn releases a second pumping relay 1235. With each release of the second pumping relay 1235, the step magnet 1219 advances the tape for one space. The counting chain is also advanced in the manner heretofore described by the repeated operation relay 1240.

In brief summary, with the first operation of pulsing relay 1240 the first counting chain relay 1245 is operated. With the release of relay 1240, the second counting chain relay 1250 is operated in series with the first counting chain relay 1245 and the step magnet 1219 is energized. As the second pulse relay 1235 releases shortly thereafter the tape is advanced one space. Relays 1235 and 1240 pump in such fashion until the third counting chain 1260 is operated to accomplish provision of three spaces on the tape member. With the third and fourth counting chain relays 1250 and 1260 operated at such time, a circuit is completed to energize the space terminating relay 1180, the operating circuit extending from negative battery over the winding of relay 1180, contacts 1183, 1155 to positive battery. The space termination relay 1180 at its contacts 1185 prepares a circuit for the pulse hold relay 1230; at its contacts 1181 interrupts the pumping circuit for the pulse hold relays 1235 and 1240; and at its contacts 1182 prepares a circuit for the first pulse hold relay 1240 which will be completed as the supervisory relay 1140 subsequently operates.

Thus following receipt of the station identification digit of the calling party number, the tape is advanced four spaces, the recording follower relay 1150 setting up the counting chain and the pulse hold relays 1235 and 1240 to automatically effect such spacing. The space termination relay 1180 is then rendered operative to terminate the advance of the tape and to prepare the repeater for operation responsive to the answer by the called party. (See Figure 15.)

*Trunk operation with answer by called party*

As the called party lifts his receiver in response to the signal thereat, the polarity of the trunk conductors is reversed at the distant end in the conventional manner.

With reversal of the polarity on the trunks the trunk answer relay 1210 is operated over a circuit extending from negative battery through the line relay in the equipment at the distant end trunk conductor 1228, the right hand winding of repeater coil 1206, contacts 1106, contacts 1203, winding of trunk answer relay 1210, rectifier unit 1213, the right hand winding of repeater coil 1207, trunk conductor 1229 and the balancing coil at the distant end to positive battery.

Trunk answer relay 1210 operates and at its contacts 1212 effects the insertion of resistance 1215 which is in the order of 150 ohms in the trunk "P" wire ground for the purpose of providing answer supervision to operators and pay station units.

The trunk answer relay 1210 at its contacts 1211 completes an operating circuit for the supervisory relay 1140, the circuit extending from negative battery over the winding of relay 1140, contacts 1144, 1193 and contacts 1211 to positive battery.

Supervisory relay 1140 operates and at its contacts 1145 completes an operating circuit for the third pulse hold relay 1230, the circuit extending from negative battery over the winding of relay 1230, contacts 1179, 1159a, 1185 and 1146 to positive battery.

Third pulse hold relay 1230 operates and at its contacts 1234 completes an operating circuit for the punch magnet 1217 which extends from negative battery over the winding of the punch magnet 1217, contacts 1191, 1234, 1223, 1186 and 1147 to positive battery.

Punch magnet 1217 operates to provide a single answer punch in the tape (see Figure 15) and to effect at its contacts 1218 the energization of the step magnet 1219.

The third pulse hold relay 1230 in operating at its contacts 1231 interrupts the energizing circuit for the fourth pulse hold relay 1220, which being of the slow-to-release type, releases after a short interval and at its contacts 1223 interrupts the holding circuit for the punch magnet 1217.

Punch magnet 1217 restores and at its contacts 1218 interrupts the holding circuit for the step magnet 1219 to deenergize same and to effect the advancement of the tape one step. The punching of the tape in such manner is designated as the answer marking punch and indicates to the reader of the tape that the call which has been submitted by the registered called party has been answered by the party.

As the fourth pulse hold relay 1220 restores it is effective to initiate the tape advancement of seven steps to accomplish the so-called intercall spacing.

*Intercall spacing*

Specifically, as the fourth pulse hold relay 1220 now releases, after the expiration of the predetermined interval, an operating circuit is completed for the first pulse hold relay 1240 which extends from negative battery over the winding of relay 1240, contacts 1225, 1142, 1182 and 1237 to positive battery. Relay 1240 operates and at its contacts 1241 completes an energizing circuit to second pulse hold relay 1235. Inasmuch as the second pulse hold relay 1235 controls the point in the operating circuit for the first pulse hold relay 1240 at contacts 1237, the pumping circuit comprising these two relays is once more rendered effective and continues until such time as a further point in the operating circuit for relay 1240 is interrupted.

With the pumping of the relays 1235 and 1240 the counting chain advances in the manner heretofore described, the counting chain being advanced and the step magnet 1219 operated simultaneously to effect advancement of the tape one step. As the chain is advanced to the point where the third and fourth relays 1260 and 1270 are energized, contacts 1261 and 1271 are closed, but are ineffective at this time to complete the operating circuit to the space terminating relay 1180 in that it is locked up over its contacts 1183 and 1155 to positive battery. Accordingly, the counting chain continues in its advancement until the seventh counting chain relay 1295 is operated in series with the sixth counting chain relay 1290; at this time six spaces are provided in the tape member.

As the seventh counting chain relay 1295 operates it is effective at its contacts 1297 to complete an operating circuit for the chain stopping relay 1190, the circuit extending from negative battery over the winding of relay 1190, contacts 1297, 1224, 1186, 1147 to positive battery.

Chain stopping relay 1190 operates and at its contacts 1194 locks up to positive battery over contacts 1178; at its contacts 1195 effects the release of timer relays 1160; and at its contacts 1192 interrupts the holding circuit for the auxiliary ground relay 1135 to effect the release of these three relays.

As timer relay 1170 releases, it is effective at its contacts 1175 to interrupt the holding circuit for the recorder follower relay 1150 and the supervisory relay 1140 to effect the release thereof. Relay 1170 is also effective at its contacts 1179 to interrupt the holding circuit for the third pulse relay 1230 to effect the restoration thereof.

As the recorder follower relay 1150 restores, it is effective at its contacts 1155 to interrupt the holding circuit for the space terminating relay 1180. The equipment in the trunk repeater remains in this condition while the called and calling parties carry on their conversation and until the call is completed and one of the parties restores the handset to his substation.

Trunk release

Release of the equipment after the parties have completed their call, or release for any call which has been extended to the point where the chain stopping relay 1190 in the trunk circuit has been operated, is accomplished by the calling party.

That is, when the calling party hangs up, the line loop is interrupted to effect the release of the trunk line relay 1105 which at its contacts 1107 interrupts the holding circuit for the ground control relay 1110 which in turn effects release of ground control relay 1115. Ground control relay 1115 at its contacts 1117a interrupts the holding circuit for the chain stopping relay 1190 to effect the restoration thereof, and ground control relay 1115 at its contacts 1118 effects the removal of ground from the "P" wire to thereby effect the release of the selector, line finder, and line cutoff relays which are held operated thereby.

If the called party should hang up first, the operating circuit for the trunk answer relay 1210 is interrupted and the release thereof is effected. However, if the calling party hangs up first, the trunk answer relay 1210 is released by the restoration of line pulsing relay 1105 and the interruption of the circuit for the trunk answer relay by contacts 1106. In either case the trunk answer relay 1210 restores before the chain stopping relay 1190; and the nature of the release of the trunk answer relay by the calling or called party is therefor not significant.

During release, the off-normal relay 1200 operates momentarily through the ground control relay contacts 1112 and the line pulsing contacts 1108; but inasmuch as the auxiliary ground relay 1135 is restored at such time the operation of the off-normal relay is without effect.

Selector release

In the selector, as the ground is removed from the "P" wire with the release of the trunk ground control relay 1115, the holding circuit for relay 405 is the selector and the cutoff relay 275 and lockout relay 260 are interrupted, and the release thereof is effective.

With the restoration of the hold supervisory relay 405, contacts 410 are opened to interrupt the holding circuit for the identification terminating relay 420 to effect the release thereof which in turn is effective at its contacts 421 to release the slave relay 417. Slave relay 417 restores and at its contacts 418 reestablishes the circuits for selector control relays 410, 350 and 385.

With the restoration of the hold supervisory relay 405 in the selector, further restoration of the operated relays in the line finder is accomplished with the removal of the ground extended thereto over conductor 463. Specifically, with the removal of ground from conductor 463 the holding circuits for the operated line-finder units selection relay (in this example F2) and the line-finder tens selection relay (in this example F10) are opened and the restoration of these relays is effected. With the restoration of the hold supervisory relay 405 ground is again placed on conductor 464 over contacts 411 and extended to the line finder relay A1 and the line finder distribution equipment to prepare such relay for reset with the next operation of reset relay MD, whereby the selector equipment will be marked as idle for further use by the subscribers.

With the restoration of cutoff relay 275 in the subscriber line circuit, operating circuits are re-established for the LR and LS relays 270 and 255 respectively thereat. With the restoration of the lockout relay 260, the circuit is reestablished for the line finder guard relays 251, 252 and 253 respectively. The exchange equipment used in the call is now once more restored for use by the subscribers in effecting further calls.

Release after incompleted call

As heretofore described, the completed call is considered one in which the chain stop relay 1190 in the toll trunk equipment has been operated. In the event of release by the calling party prior to the advancement of the call to this stage, the release of the equipment will be effected in a different manner. The manner of release will vary further in accordance with the stage to which the call has been extended as the restoration by the calling party is effected.

The release of the equipment by a calling party at a time prior to the operation of the first timer relay 1160 in the toll trunk circuit (that is release before dialling commences), is now considered.

Line relay 1105 in the trunk repeater circuit restores in response to the release and an incidental punch is recorded and the tape is advanced one step. As the first timer relay 1160 operates a further incidental step advancement of the tape and six so-called "after call steps" are effected to provide a total of eight spaces between the incidental punch and the first punch of the next call. The appearance of the tape with the occurrence of such release being illustrated in Figure 16.

More specifically, with the restoration of the handset by the calling party without effecting a dialling operation, the line relay 1105 in the toll trunk equipment is released and the ground control relays 1110 and 1115 are restored in cascade. Auxiliary ground relay 1135, however, remains locked up to maintain the trunk in the busy position.

The release of the line relay 1105 incidentally operates the punch magnet 1217 and in turn the step magnet 1219 in an obvious manner. With the release of the ground control relay 1110 the punch magnet 1217 and step magnet 1219 are released in cascade and a punch is incidentally recorded on the tape (see Fig. 15).

Line relay 1105 in restoring also effects the closing of contacts 1108 and the operation of the off-normal relay 1200, which in turn at its contacts 1205, effects the operation of the first pulse hold relay 1240 over the circuit heretofore described.

With the operation of first pulse relay 1240, the second pulse relay 1235 and the first counting chain relay 1245 are operated as previously described. The third pulse hold relay 1230 is also operated over a circuit extending from negative battery to the winding of relay 1230, contacts 1169, 1195 and 1113 to positive battery. As the ground control relay 1110 restores, contacts 1113 are opened and the first counting chain relay 1245 and the third pulse hold relay 1230 are restored.

As the ground control relay 1110 restores, it is also effective at its contacts 1112 to interrupt the operating circuit for the off-normal relay 1200, and at its contacts 1111 interrupts the holding circuit for the ground control relay 1115 to effect the restoration of these two relays.

Ground control relay 1115 in restoring is effective at its contacts 1116 to complete an operating circuit for the first timer relay 1160 which extends from negative battery over the winding of relay 1160, contacts 1134, 1116, 1113 to positive battery. As the first timer relay 1160 operates, it is effective at its contacts 1164 to further interrupt the operating circuit for the first pulse relay 1240 (if such interruption has not already been accomplished by the release of the off-normal relay 1200 and the opening of contacts 1205).

As the first pulse relay 1240 restores, the step magnet 1219 is reenergized in the manner heretofore described, and with the subsequent release of the second pulse hold relay 1235, the step magnet 1219 restores to advance the tape one step.

With the operation of the timer relay 1160, an operating circuit is completed for the two pumping pulse hold relays 1235 and 1240, and the impulse pumping thereby is effected to advance the counting chain to the seventh relay 1295. In the advancement of the counting chain and the pumping of the pulse hold relays 1235 and 1240, the step magnet is operated and released six times to advance the tape six more steps.

As the seventh counting chain relay 1295 operates, it is effective at its contacts 1297 to complete an operating circuit for the chain stopping relay 1190 which effects release of the auxiliary ground relay 1135 and in turn the timer relay 1160 and the fourth pulse hold relay 1220.

As the timer relay 116 restores, the operating circuit for the first pulse relay 1240 is opened to terminate the pumping operation. The fourth pulse hold relay 1220 releases and in turn effects the restoration of the sixth and seventh counting chain relays 1290, 1295 respectively. Thus the equipment is restored and an incidental punch followed by an eight step spacing is recorded on the tape prior to the appearance of the next recorded call thereon.

If the release by the calling party should occur after dialling has commenced, but before the operation of the timing relay 1160, the digits of the called number which have been dialled will be recorded on the tape in the manner heretofore described. As the calling party restores, the line relay 1105 releases and an incidental punch is effected on the tape in the manner just described. It is possible, of course, that such punch may coincide with a punch of the called number. Following the incidental punch, the tape is advanced one step and with operation of the timer relay 1160 during the release a second tape advancement is effected. The trunk continues its operation as just described and six "after call" spaces are provided to effect a total of eight spaces between the incidental punch and the first punch of the next call. The appearance of the tape upon release after dialling two digits of the called party directory number 421231 is shown in Figure 17.

*Release following dialling of called number but before answer by called party*

In the event that the call has proceeded to the point where the first timer relay 1160 in the toll trunk repeater circuit has been operated, the called number will be registered and the release may occur alternatively during after digit spacing, after number spacing, or recording of the calling number. With release subsequent to operation of the timer relay 1160, an incidental space followed by six regular "after call" spaces is effected by the equipment.

Specifically, as the release is effected the line relay 1105 and ground control relays 1110 and 1115 in the toll repeater circuit release in the normal manner. As ground control relay 1110 releases, the release of the operated ones of the relays 1160, 1170, 1150, 1180 and 1140 is effected.

Auxiliary ground relay 1135 is held operated to maintain the trunk busy for the hunting selectors, and to prepare a circuit for the reoperation of the first timing relay 1160. If the fourth pulse relay 1220 was operated at the time of release, it is restored with the operation of the first timer relay 1160. With both the third and the fourth pulse hold relays 1220 and 1230 released, the ground supply to the counting chain through the contacts of the first pulse hold relay 1240 is interrupted and any counting relay which may be in the operated condition is released.

Off-normal relay 1200 is operated as the line relay 1105 restores, ground control relay 1110 restores along with timer relay 1160 and operating circuits are completed for the first pulse hold relay 1240 along with the second pulse hold relay 1235.

Ground control relay 1115 and the off-normal relay 1200 are now restored and the energizing circuit for the first pulse hold relay 1240 is opened either by off-normal relay 1200 or by relay 1160 as it is operative responsive to the release of ground control relay 1115.

As the first pulse hold relay 1240 restores, the step magnet 1219 is operated and with the subsequent release of the second pulse hold relay 1235, the step magnet 1219 is released incidentally to advance the tape one step.

The fourth pulse hold relay 1220 is energized as the first timer relay 1160 reoperates, but being slow to operate, it does not operate in time to apply ground to the first relay 1245 of the counting chain before the first pulse hold relay 1240 releases. Thus operation of the counting chain will not be initiated with this advance of the tape. It may be noted that as the second timer relay 1170 releases, the first "P" wire relay 1120 was not operated to energize the punch magnet.

The impulse pumping circuit comprising relays 1235 and 1240 is now energized and the repeated stepping of the tape and counting chain is effected thereby. After the counting chain has advanced to seventh relay 1295 and the tape has been advanced six steps, an energizing circuit is completed for the chain stopping relay 1190 which operates, and at its contacts 1192 effects the release of the auxiliary ground relay 1135. Ground relay 1135 restores and effects release of the first timing relay 1160 and the fourth pulse hold relay 1220.

Timer relay 1160 restores to interrupt the energizing circuit for the impulse pumping arrangement comprising relays 1235 and 1240 which responsively restore. The release of the fourth counting chain relay 1220 effects the restoration of the counting chain which in turn effects the release of the chain stopping relay 1190.

The subsequent release of the entire trunk circuit is the same as previously described herein relative to the release of the equipment responsive to restoration of the subscriber's handset prior to operation of the timer relay 1160.

It is apparent from the foregoing that the tape advances at least eight steps if restoration is made subsequent to the time of operation of timer relay 1160; namely, one step following the last time the punch operated, an incidental step immediately following the reoperation of timer relay 1160 and the final six spacing steps.

If release occurs during "after number" spacing the advance of the tape will include the incidental step, six final steps, and the steps of the spacing that might have been completed at the time release occurred.

It is also possible that release may occur after the answer punch has been recorded, but before the chain stopping relay 1190 has operated. In such event the release operation effects an incidental step and six "after-call" steps preceded on the tape by any portion of the after call spaces which normally follow the answer punch. That is those steps which have been effective are followed by a complete set of the "after-call" punches. The form of the resultant tape recordings are specifically set forth in Figure 18.

(C) CROSS CONNECTION CORRECTION

In larger exchanges the calling traffic for a certain hundred group of lines is frequently much higher than the called traffic which passes thereover, and in such event the number of connector switches may be more than adequate, but a shortage of line finder equipment may exist. Provisions are therefor made in the present arrangement to permit movement of a limited number of lines to different line hundred groups in which the calling traffic is somewhat lighter, while retaining the assigned connector terminals and the directory number of the lines.

Basically the transfer of a limited number of lines to different line hundreds group having a lesser calling traffic is accomplished by opening the straight multiple between the line finder and connector, and reestablishing the multiple through cross connecting jumpers on an intermediate distributing frame (IDF). An associated set of IDF cross connection relays become operative whenever one of these transformer lines (which terminates in a line-finder group which is different from its connector group) lands in a line finder for the purpose of extending a call. The assigned directory thousands, hundreds, tens and units digits are correctly transmitted to the toll trunks with operation of the IDF cross connection relays.

As an example, let us assume that in a ten party system, line 38 in the four hundred group of the two thousand group of lines bearing directory number 2438X in a group of heavy originating traffic lines and that the calls from this line are to now be originated over line 26 in the two hundred group of the three thousand group of lines (3226X). It is apparent that in the normal transfer of the connections of the line 38 to the 2300 group, a new directory number (3226X) would necessarily be assigned to the transferred line. However, in the present equipment, arrangement has been made so that the same directory number (2438X) is maintained even though the line is shifted from the first group to the second group of lines in the line finders.

With reference to Figure 3a, 3b and 3c the equipment and manner of connection thereof to transfer the line having the assigned directory number 2438X to originate calls over line 26 in the two hundred group of lines in the three thousand group of lines is disclosed thereat. In addition to the connection of the line circuit for the lines to the proper tens and units relays (F20 and F6), the multiple at relay F20 is interrupted and a circuit (as controlled by relay F20) is established for the associate cross connection relay 340. Whenever a party on line 2438X makes a call to the toll trunk group, the operated line finder tens relay F20 and units relay F4 complete a circuit for the cross connection relay 340, in the operating circuit extending from negative battery over the winding of relay 340, contacts 351, conductor 332, contacts IF20 on line finder selection relay F20 and contact c of line finder units selector relay F6 to negative battery. The cross connection relay 340a is simultaneously operated over the identical circuit.

As the cross connection correction relay 340 operates, it is effective at its contacts 345 to transfer the thousands group checking lead for the link from its normal connection over conductor 3 (jumper 375) to the identification lead in the second level of the thousands groups on the IDF cross connection board and jumper 390, whereby the thousands digit of the calling subscriber line 2438X is properly identified as two. Relay 340 in its operation is effective at its contacts 347 to transfer the checking circuit from the normal hundreds group identification circuit (which is established over the two hundred level), to the cross connection board identification circuit at level four, and at its contacts 343 and 344 disconnects the tens identification checking circuit from its normal connection to the two hundred group conductor 808 and transfers the checking circuit to the third level of the tens group as established by jumper 392.

Relay 340a, which operates with relay 340, is effective at its contacts 341 and 342 to interrupt the normal units checking circuit which extends over conductor 818 (the sixth level) and contacts 341 to the relay F6, and transfers such units checking lead to conductor 826, which is connected to the eighth level of the units checking lead group.

It is apparent from the foregoing that as a party on line 2438X initiates a call, the associated link in the 3200 group is seized and the cross-connection relays 340 and 340a are operated to prepare the checking circuits which correspond to the assigned directory numbers of the line (2438) even though the call is extended over line 3226. As shown in Figure 3c, the assigned number is established by jumpers 390, 391, 392 and 393 on the cross connection board, the jumpers being prepared as the cross connection relays operate.

The operating circuit for the stop relay 900 is completed with the transmission of the thousands digit of two impulses and extends from negative battery over the winding of the stop relay 900, C909, contacts 496, C415, contacts 602, contacts 624, C848, C808, jumper 390, contacts 345, 362, C837, contacts 1003, contacts 1051, 1061, 1071 and C915, contacts 931 to negative battery.

The stop relay 900 operates and the counting chain is reset and reenergized to hunt the checking circuit for the hundreds identification digit. As the counting chain advances to the fourth counting chain relay 635, four impulses will have been transmitted and the operating circuit for the stop relay 900 as extended over C415 and contact 602 to the counting chain is completed over contacts 638a, C856, C816, jumper 391, C347, 364, C836, contacts 1013, 1052, 1061, 1071, C915 and contacts 931 to negative battery. The counting chain is again reset and reenergized to hunt the checking circuit for the tens digit of the calling number. As the counting chain advances to effect the transmission of the tens digit of three digits the third counting chain relay 630 is effective to complete the energizing circuit for stop relay 900 which is extended over contacts 602 to the counting chain relay 630 and further extended thereby over contact 633a, C849, C809, jumper 392, contacts 344, contacts 387, C389, contacts 36g of relay F20, C334, contacts 354, C839, contacts 1023, contacts 1062, 1071, C915, contacts 931 to negative battery.

Stop relay 900 operates and resets the equipment for transmission of the units digit of the calling numbers. The units digit of eight impulses is transmitted and the counting chain advances to the eighth counting chain relay 655, at which time the energizing circuit for the stop relay 900 (which is extended over C415 and contacts 602 to the counting chain) is completed over contacts 858a, C868, C826, jumpers 393, contacts 342, 386, C388, contacts F of operated units relay F6, C333, contacts 353, C838, contacts 1033, contacts 1072, C915, contacts 931 to negative battery.

Stop relay 900 operates and resets the equipment for transmission of the station identification digit. As the selector now effects the transmission of the station identification digit four, the counting chain advances to the fourth counting chain relay 635 to complete an operating circuit for the stop relay 900 the operating potential on C415 being extended over contacts 638a, C856, contacts 832, C878, contacts 1043, contacts 1052, 1061, 1071, C915 and contacts 931 to negative battery. The succeeding selector operation is as previously described.

Cross connection in this manner may also be effected in a twenty party system, conductors M1, M2 and M3 (Fig. 8) being closed and the conductor L1 being disconnected in such event. Further the jumper 391 is connected at level three of the hundreds identification group for parties 1 to 10 and at jumper 391b is connected at level four of the hundred identification group associated with parties 11 to 20 in system having twenty party lines. Assuming for example, that in a twenty party system, line 38 in the second hundred group of the two thousand group of lines (having directory number 2338X for parties 1 to 10 and 2438X for parties 11 to 20) is cross connected to originate calls over line 26 in the first hundred group of the three thousand group of lines. Normally this new line position would require a new directory number of 3126X for parties 1 to 10 and 3226X for parties 11 to 20. However, the cross connection board is operative to maintain the assigned directory number for the line. Specifically as a party on this line now makes a call to a toll trunk group, the cross connection correcting relays 340 and 340a operate and cross correction relay 340 at its contacts 345 establishes the thousands identification circuit at the second level of the thousands identification group; at its contacts 347 establishes the hundreds identification circuit over the third level of the hundreds identification group for parties 1 to 10, and at its contacts 349a establishes a circuit over the hundreds checking circuit at the fourth level for parties 11 to 20.

In operation the checking circuit for the thousands digit is completed as described previously with reference to the ten party line systems. The checking circuit for the hundreds digit however varies in accordance with the group to which the calling party is assigned. That is, when party 4 (the first group of parties 1 to 10) is originating the call the check circuit is completed as three impulses have been transmitted and the counting chain has been advanced to the third counting chain relay 630. When party 14 (the second group of parties 11 to 20) is originating the call, four impulses are transmitted and the counting chain advances to the fourth relay 635.

In the extension of a call by party 4, the checking circuit extends from the potential on C415 over contacts 602, contacts 633a, conductor 849, conductor 809, the jumper 391a at the third level of the hundreds identification group, on the cross-connection board associated with parties 1 to 10, contacts 347, 364, conductor 836, conductor M2, contacts 867, 886, 895, conductor M3, conductor 836, contacts 1013, 1052, 1061, 1071, conductor 915 and contacts 931 to negative battery.

In the event that the calling party is station 14 on the party line, the counting chain will advance to the fourth counting chain relay 635 to complete the checking circuit for the stop relay 900, by extending the potential on conductor 415 over contacts 602, contacts 638a, conductor 816, jumper 391b at the fourth level of the hundreds group associated with the parties 11 to 20, contacts 349a, 366, conductor 829, conductor M1, contacts 834, 846, 866, 886, 895, conductor M3, conductor 836 and contacts 1013, 1052, 1061, 1071, conductor 915, contacts 931 to negative battery.

The tens and the units checking circuits for subscribers on twenty party lines are completed in the same manner as for the subscribers on ten party lines.

(D) IDENTIFICATION CHECK CIRCUITS

*Ten-party system*

The identification checking circuits for each of the parties on a ten party line is set forth hereat, the check circuits being illustratively shown for the ten parties of the second line of the first tens group, of the one hundred group of the three thousand group. The directory number for each of the ten parties will be 3112X, the X portion of the directory number being indicative of the particular station number (1 to 0) on the line which each of the ten subscribers is assigned.

For lines in the three thousand and one hundred group, the jumper 375 on the selector identification board will be at the third level as shown in Figure 3c and the jumper 380 will now be on the first level instead of the second level as shown in Figure 3c. The thousands identification check circuit for each of the parties on this line will extend from negative battery over the winding of relay 900, conductor 909, contacts 496, conductor 415, contacts 602, contacts 633a, conductor 849, conductor 809, jumper 375, contacts 346, 362, conductor 837, contacts 1003, 1951, 1061 and 1071, conductor 915 and contacts 931 to positive battery.

The hundreds identification check circuit for each of these ten parties on the line indicated will extend from negative battery over the winding of stop relay 900, conductor 909, contacts 496, conductor 415, contact 602, contacts 614, conductor 847, conductor 807, jumper 380 (which is now at the one hundred level of the selector identification board) contacts 348, 364, conductor 836, contacts 1013, 1052, 1061, 1071, conductor 915 and contacts 931 to positive battery.

The tens identification check circuit for each of these parties will extend from positive battery over the winding of relay of stop relay 900, conductor 909, contacts 496, conductor 415, contacts 602, contacts 614, conductor 847, conductor 807, conductor 321, contacts 36f of the line finder ten selection relay F10, conductor 334, contacts 354, conductor 839, contacts 1023, contact 1062, 1071, conductor 915, contacts 931 to positive battery.

The units identification check circuit for the parties on this line will extend from negative battery over the winding of stop relay 900, conductor 909, contacts 496, conductor 415, contacts 602, contacts 624, conductor 848, conductor 808, conductor 322, contacts C2, contacts 312f (the line finder selection relay F2) the units lead conductor 333, contacts 353, conductor 838, contacts 1033, contacts 1072, conductor 915, contacts 931 to positive battery.

It is apparent that each of the parties will have identification cams, such as 286, at individually assigned positions on their associated identification cam 285. Thus each station with the transmission of the digit 0 to obtain access to a toll trunk, effects the transmission of the different preassigned identification pulse and a different identification check circuit is established for each of the stations. In brief detail, the following station identification circuits are established by each of the ten parties.

Party 1—Directory number 31121: Extension on identification cam—position 1; station register relay operated—800; register relay operating circuit—operating ground on conductor 415, contacts 601, conductor 806, and register relay 800 to negative battery (the operating ground in each of these instances is impressed upon conductor 415 by the controlled operation of the special identification relay 430 during the period that the associate line relay 435 is in the restored condition). Station identification check circuit—negative battery, winding of relay 900, conductor 909, contacts 496, conductor 415, contacts 602, contacts 614, conductor 847, contacts 802, conductor 878, contacts 1043, contacts 1052, 1061, 1071, conductor 915, contacts 931 to positive battery.

Party 2—Directory number 31122: Extension on identification cam—position 2; register relay operated—810; register relay operating circuit—ground on conductor 415, contacts 602, contacts 614, conductor 847, contacts 801, winding of relay 810 to negative battery. Station identification check circuit—as for party 1 to contacts 602, contacts 624, conductor 848, contacts 812, conductor 878, etc.

Party 3—Directory number 31123: Extension on identification cam—position 3; register relay operated—820; register relay operating circuit—ground on conductor 415, contacts 602, contacts 624, conductor 848, contacts 811, winding of relay 820 to negative battery. Station identification check circuit—as for party 1 to contacts 602, contacts 633a, conductor 849, contacts 822, conductor 878 etc.

Party 4—Directory number 31124: Extension on identification cam—position 4; register relay operated—830; register relay operating circuit—ground on C415, contacts 602, 638a, conductor 849, contacts 821 to the winding of relay 830 to negative battery. Station identification check circuit—as for party 1 to contacts 602, contacts 638a, conductor 856, contacts 832, conductor 878 etc.

Party 5—Directory number 31125: Extension on identification cam—position 5; register relay operated—840; operating circuit for register relay—ground on C415, contacts 602, 638a, conductors 856, contacts 831, the winding of relay 840 and negative battery. Station identification check circuit—as for party 1 to contacts 602, contacts 643a, conductor 857, contacts 842, 884 and 893 to conductor 878 etc.

Party 6—Directory number 31126: Extension on identification cam—position 6; register relay operated—850; operating circuit for register relay—ground on C415, contacts 602, contacts 643a, conductor 857, contacts 841 and winding of relay 850 to negative battery. Station identification check circuit—as for party 1 to contacts 602, contacts 648a, conductor 858, contacts 852, conductor 878 etc.

Party 7—Directory number 31127: Extension on identification cam—position 7; register relay operated—860; operating circuit for register relay—ground on C415, contacts 602, contacts 648a, conductor 858, contacts 851 and winding of relay 860 to negative battery. Station identification check circuit—as for party 1 to contacts 602, contacts 653a, conductor 859, contacts 860, conductor 878, etc.

Party 8—Directory number 31128: Extension on identification cam—position 8; register relay operated—870; register relay operating circuit—ground on C415, contacts 602, contacts 653a, conductor 859, contacts 861, winding of relay 870 to negative battery. Station identification check circuit—as for party 1 to contacts 602, contacts 658a, conductor 868, contacts 872, conductor 878 etc.

Party 9—Directory number 31129: Extension on identification cam—position 9; register relay operated—880; register relay operating circuit—ground on C415 to contacts 602, contacts 658a, conductor 868, contacts 871, winding of relay 880 and negative battery. Station identification check circuit—as for party 1 to contacts 602, contacts 663a, conductor 869, contacts 882, conductor 878 etc.

Party 10—Directory number 31120: Extension on identification cam—position 10; register relay operated—890; operating circuit for register relay—ground on C415, contacts 602, contacts 663a, conductor 869, contacts 881, winding of relay 890 and negative battery. Station identification check circuit—as for party 9 to contacts 602, contacts 669, conductor 876, contacts 891, conductor 878 etc.

It is seen from the foregoing that by positioning the extensions, such as 286, at various points along the periphery of the identification cam 285 individual identification for the ten parties on a ten party line is readily accomplished.

*Twenty-party system*

Consideration will now be given to the provision of individual identification numbers for each of the parties on a twenty-party line system, and the specific identification check circuits which are effected through the selector equipment with the establishment of a call by any one of the subscribers on a twenty-party line.

It will be remembered that in the use of the equipment with the twenty-party line system the special connections indicated in Figure 8 at M1, M2 and M3 will be completed and those indicated by L1 will be interrupted.

Considering now the circuits applicable for the second line of the first tens group of the first hundreds group of the three thousands group of lines as used in a twenty party system.

The thousands, tens, and units identification check circuits for each of the parties will be the same, the distinction between the identification of the twenty parties on the given line being established by the dividing of the parties into two groups and assigning one hundreds identification numerals for the parties 1 to 10, and a second identification numeral for parties 11 to 20, the parties in the respective groups being further individually identified by station identification numbers 1 to 10.

The thousands identification check circuit for each of the twenty parties will extend from negative battery over the winding of the stop relay 900, conductor 909, contacts 496, conductor 415, contacts 602, contacts 633a, conductor 849, conductor 809, jumper 375, contacts 348, contacts 364, conductor 836, the M wiring, contacts 867, 886, 895, M wiring to conductor 836, contacts 1002, 1051, 1061, 1071 conductor 915, contacts 931 to positive battery.

As pointed out above, the hundreds identification check circuit for the parties 1 to 10 will comprise one set of paths, where as the hundreds identification check circuits for parties 11 to 20 will comprise a different path. The different paths will be considered hereinafter with the individual consideration afforded to each of the twenty parties on the line.

The tens identification check circuit for each party extends from negative battery over the winding of stop relay 900, conductor 909, contacts 496, conductor 415, contacts 602, contacts 614, conductor 847, conductor 807, conductor 321, contacts C2, contacts 36f of the line finders ten selection relay F10, conductor 334, contacts 354, conductor 839, contacts 1023, contacts 1062, 1071, conductor 915, contacts 931 to positive battery.

The units identification check circuit for the parties on this line will extend from negative battery over the winding of stop relay 900, conductor 909, contacts 496, conductor 415, contacts 602, contacts 624, conductor 808, conductor 322, contacts C2, contacts F on relay 312 (line finder unit selection relay F2) conductor 333, contacts 353, conductor 838, contacts 1033, contacts 1072, conductor 915 and contacts 931 to positive battery.

Consideration will now be given to the hundreds and station identification check circuits for each of the parties on the above identified line in a twenty-party system.

Party 1—Directory number 31121: Extension on identification cam—position 1; register relay operated—800; register relay operating circuit—identical with that of ten-party system; hundreds identification check circuit negative battery, winding of stop relay 900, conductor 909, contacts 496, conductor 415, contacts 602, contacts 614, conductor 847, conductor 807, the jumper at the one hundred level in the hundreds group on the selector identification board, contacts 348, contacts 364, conductor 836, the M wiring, contacts 867, 886, 895 back over the M wiring to conductor 836, contacts 1013, contacts 1052, 1061, 1071, conductor 915, contacts 931 to positive battery. Station identification check circuit same as for party 1 in a ten-party system.

Party 2—Directory number 31122: Extension on identification cam—position 2; register relay operated—810; operating circuit for register relay—same as for party 2 on ten party system; hundreds identification check circuit—same as for party 1 in twenty party system; station identification check circuit—same as for party 2 in a ten party system.

Party 3—Directory number 31123: Extension on identification cam—position 3; register relay operated—820;

operating circuit for register relay 820—same as for party 3 on ten party system; hundreds identification check circuit—same as for party 1 in twenty party system; station identification check circuit—same as for party 3 in ten party system.

Party 4—Directory number 31124: Extension on identification cam—position 4; register relay operated—830; operating circuit for register relay 830—same as for party 4 in ten party system; hundreds identification check circuit—same as for party 1 in twenty party system; station identification check circuit—same as for party 4 in ten party system.

Party 5—Directory number 31125: Extension on identification cam—position 5; register relay operated—840; operating circuit for register relay—same as for party 5 in a ten party system; hundreds identification check circuit—same as for party 1 in twenty party system; station identification check circuit—same as for party 5 in ten party system.

Party 6—Directory number 31126: Extension on identification cam—position 6; register relay operated—850; operating circuit for register relay—same as for party 6 in ten party system; hundreds identification check circuit—same as for party 1 in twenty party system; station identification check circuit—same as for party 6 in ten party system.

Party 7—Directory number 31127: Extension on identification cam—position 7; register relay operated—860; operating circuit for register relay—same as for party 7 in ten party system; hundreds identification check circuit—same as for party 1 in twenty party system with the following exceptions: conductor 836, contacts 805, 815, 825, 835, 845, 866, 886, 895 over M wiring to conductor 836 etc. Station identification check circuit—same as for party 7 in ten party system.

Party 8—Directory number 31128: Extension on identification cam—position 8; register relay operated—870; operating circuit for relay 870—same as for party 8 on ten party system; hundreds identification check circuit—same as for party 1 in twenty party system; station identification check circuit—same as for party 8 in ten party system.

Party 9—Directory number 31129: Extension on identification cam—position 9; register relay operated—880; operating circuit for register relay 880—same as for relay 9 in ten party system; hundreds identification check circuit—same as for party 1 in twenty party system with the following exception: conductor 836, M wire, contacts 894, 885, 844, M wiring 831 etc. Station identification check circuit—same as for party 9 in ten party system.

Party 10—Directory number 31120: Extension on identification cam—position 10; register relay operated—890; operating circuit for register relay 890—same as for party 10 on ten party system; hundreds identification check circuit—same as party 1 in twenty party system with the following exception: conductor 836, M wire, contacts 844, 854, 864, 875, 894, M wiring and conductor 836. Station identification check circuit—same as for party 10 in ten party system.

Party 11—Directory number 32121: Extension on identification cam—positions 1 and 7; register relays operated—800 and 860; operating circuits for relay 800 and 860—as traced for parties 1 and 7; hundreds identification check circuit—negative battery over the winding of stop relay 900, conductor 909, contacts 496, conductor 415, contacts 602, contacts 624, conductor 848, conductor 808, the jumper in the second level of the hundreds group jumper for twenty party systems in the selector board, contacts 349b, 366, conductor 829, M wiring contacts 804, 815, 825, 835, 846, 866, 886, 895, M wiring to conductor 836, contacts 1013, 1052, 1061, 1071, conductor 915 to contacts 931 to positive battery. Station identification check circuit—same as for party 1 of twenty party circuit.

Party 12—Directory number 32122: Extension on identification cam—positions 2 and 7; register relays operated—810 and 860; operating circuits for 810 and 860—as previously described for register relay 2 and 7; hundreds identification check circuit—as for party 11 in twenty party circuit with the following exception: contacts 814 instead of 804 and 815. Station identification check circuit—same as for party 2 in the twenty party system.

Party 13—Directory number 32123: Extension on identification cam—positions 3 and 7; register relays operated—820 and 860; operating circuits for register relays—as described for parties 3 and 7; hundreds identification check circuit—as for party 11 in twenty party system with following exception: contacts 824 in lieu of contacts 804, 815 and 825. Station identification check circuit—same as for party 3 in twenty party system.

Party 14—Directory number 32124: Extension on identification cam—positions 4 and 7; register relays operated—830 and 860; operating circuits for register relays—as traced for parties 4 and 7 in twenty party system; hundreds identification check circuit—same as for party 11 in twenty party system with following exception: contacts 834 in lieu of 804, 815, 825, and 835; station identification check circuit—same as for party 4 in twenty party system.

Party 15—Directory number 32125: Extension on identification cam—positions 5 and 7; register relays operated—840 and 860; operating circuits for register relays—as described for parties 5 and 7 in twenty party system; hundreds identification check circuit—same as for party 11 in twenty party system with following exception: substitute contacts 845 for contacts 804, 815, 825, 835 and 846. Station identification check circuit—same as for party 5 in twenty party system.

Party 16—Directory number 32126: Extension on identification cam—positions 5 and 10; register relays operated—850 and 890; operating circuits for register relays—as described for parties 6 and 10 in twenty party system; hundreds identification check circuit—same as for party 1 with following changes between M wire connections: M1, contacts 854, 864, 875, 894, M3; station identification check circuit—same as for party 6 in twenty party system.

Party 17—Directory number 32127: Extension on identification cam—positions 7 and 10; register relays operated—860 and 890; operating circuits for register relays—as described for parties 7 and 10 in twenty party system; hundreds identification check circuit—same as for party 11 in twenty party system with following differences between M wire connections: M1, contacts 864, 875, 894, M3 and conductor 836. Station identification check circuit—same as for party 7 in twenty party system.

Party 18—Directory number 32128: Extension on identification cam—positions 8 and 10; register relays operated—870 and 890; operating circuits—see descriptions for parties 8 and 10; hundreds identification check circuit—same as for party 11 with following exceptions in portions connected by M wiring: conductor 829, M1, contacts 874, 894, M3, conductor 836 etc. Station identification check circuit—same as for party 8 in twenty party system.

Party 19—Directory number 32129: Extension on identification cam—positions 9 and 5; register relays operated—880 and 840; operating circuits for register relays—see circuit description for parties 5 and 9; hundreds identification check circuit—same as for party 11 with following exceptions between M wiring: conductor 829, M1, contacts 843a, 885, 895, M3, conductor 836, etc. Station identification check circuit—same as for party 9 in the twenty party system.

The ninth register relay 880 at its contacts 884 effects interruption of the check circuit which might be completed by the fifth station register relay 840 at its contacts 842 to prevent such circuit from taking precedence over the check circuit which is associated with the ninth station register relay.

Party 20—Directory number 32120: Extensions on identification cam—positions 10 and 5; register relays operated—890 and 840; operating circuits for register relays—see descriptions relative to parties 5 and 10 in twenty party system; hundreds identification check circuit—same as for party 11 with following exceptions in circuit between M wiring: conductor 829, M1, contacts 843a, 855, 865, 875, 894, M3 to conductor 836 etc. Station identification circuit—same as for party 10 in twenty party system.

The tenth relay 890 at its contacts 893 interrupts the identification circuit which is prepared at contacts 842 with the operation of the fifth counting chain relay 840 and thereby prevents such circuit from taking precedence over the identification circuit associated with the tenth register relay 890.

The manner of connecting of subscribers in a complete exchange becomes immediately apparent with reference to the aforegoing description of the method of connection of chosen subscribers to ten party and twenty party lines through a given line finder selector link of an automatic all relay exchange.

(E) TIMED TOLL TICKETING TRUNK

The equipment of the exchange may also be adapted for use with completely automatic toll ticketing equipment in which the month, time of day and the length of the conversation, as well as the calling and called parties identification numbers are recorded on the tape member.

The modified trunk structure for use in accomplishing toll ticketing of the type described is illustrated in Figures 19, 20 and 21 of the drawings. With reference to these figures, it is noted that the equipment shown thereat comprises the trunk circuit 115 of Figures 11 and 12 modified as trunk circuit 115' to cooperate with automatic time recording means 1490 including a clock unit 1491 and calendar unit 1492. The elements of the trunk circuit 115' in Figures 19, 20 and 21 which are similar to the elements of trunk 115 are identified by primed identification numerals of similar value. For example, line relay 1105 in the trunk embodiment 115 of Figures 11 and 12 is identified as line relay 1105' in the modified trunk embodiment 115' of Figures 19, 20 and 21. New elements in the modified structure trunk circuit 115' which are not shown in the previously illustrated trunk 115 are identified by numerals in the 1400 group.

The details of the time recording equipment 1490 which is operative to supply the month, time of day and timing of each call in an automatic manner responsive to the placement of a call over the associated trunk circuit 115' are more fully set forth in the copending application, Serial No. 238,092, which was filed July 23, 1951, by Blashfield et al., and now Patent 2,782,257, issued February 19, 1957, and assigned to the assignee of this invention. The time recording equipment 1490 is controlled in its connections with the modified trunk 115' by a set of time connecting relays 1410 and 1420, and a pair of calendar connecting relays 1430 and 1440. A recording initiating relay 1460 controls the starting of the time punches from the clock contact (not shown) and the time recording equipment 1490, relays 1245'–1270' of the trunk counting chain being arranged in the present embodiment to register one-quarter minute periods during the conversation.

Minor changes in the connection of the trunk circuit 115' from those set forth in the first embodiment 115 will become immediately apparent with reference to the following detailed description of the equipment.

*Complete automatic toll ticketing (trunk circuit 115')*

The initial seizure and operation of the trunk circuit 115' is substantially the same as the initial seizure and operation of the trunk circuit 115 and accordingly the operation will be only briefly set forth hereat. It is assumed in the present example that the called party number is 231411 and the calling party number is 31221.

In the establishment of a toll call by a subscriber and the operation of the hundreds relay 5000 of the selector 130' of the seized link, the P-wires 1102' etc., of all trunks in the group are connected to the selector trunk test relays 760 etc. Idle trunks will have low resistance battery on the P-wire (P-wire 1102', contacts 1119', 1133', 1141', 350 ohm resistance to battery), and each idle trunk will accordingly operate its corresponding trunk test relay 760 in the trunk test relay circuit. Assuming the illustrated trunk 115' to be the first trunk in the group and in the idle condition, trunk test relay 760 will operate as heretofore described, to shunt its associated 1200 ohm resistor at its contacts 1762 and to thus establish an operating circuit to low resistance ground for the trunk supervisory relay 1140'.

Supervisory relay 1140' operates and at its contacts 1141' removes low resistance battery from the P-wire by disconnecting the 350 ohm resistance therefrom.

The trunk test relays 765 and 770 transfer to direct ground on the P-wire, releasing test relay 760 but holding the trunk supervisory relay 1140'.

Several trunks in the group may be idle and accordingly several trunks may have their supervisory relays energized in the manner described. Subsequently, the trunk test circuit removes ground from all the P-wires of idle trunks except one as heretofore described. Assuming the illustrated trunk 115' to be the trunk selected, the selector 130 switches a line loop through this trunk to operate trunk line relay 1105' in series with balancing coil 1104'. Also in the selection of a toll trunk group by the selector the control relay 490 is operative at its contact 491 to connect the selector P-wire relay 970 to the P-wire to energize same. (Negative battery winding of relay 970, R966, contacts 954, C905, contacts 491, contacts 425 to the P-wire and ground placed thereon by the guard circuit.) Subsequently, the guard circuit removes the direct ground from the P-wire and selector relay 970 holds from battery through high resistance to ground in the trunk. Line relay 1105' at its contacts 1107' completes an obvious operating circuit for associate hold relay 1110' which operates and at its contacts 1111' completes an obvious holding circuit for hold relay 1115'.

Hold relay 1110' at its contacts 1113' completes an operating circuit for the master ground relay 1135' (negative battery, relay 1135', contacts 1137', conductor 1472', contacts 1113' and positive battery); and at its contacts 1113' also completes an operating circuit for the third pulse hold relay 1235', the circuit extending from negative battery over the winding of relay 1230', contacts 1169', conductor 1473', contacts 1415', conductor 1472' and contacts 1113' to positive battery.

Master ground relay 1135' operates and at its contacts 1136' completes a holding circuit over contacts 1451' to positive battery. The associate hold relay 1115' operates and is effective at its contacts 1118' to connect direct ground to the P-wire, ground being extended through the P-wire 1102' over contacts 1118', 1151', 1171', and 1212'. With the operation of hold relay 1115' the energizing circuit for the supervisory relay 1140' is interrupted at contacts 1119' to effect the restoration thereof. Direct ground from the selector trunk test relay circuit is removed from the P-wire 1102' at this time as heretofore described. With the operation of the line relay 1105', the call is extended to corresponding distant trunk equipment to operate the line relay and balancing coil thereat much in the manner in which the line relay 1105' and balancing coil 1104' in the present trunk circuit were operated.

*Called party designation pulses*

As the calling party dials the number of the called party, the substation dial opens and closes the line loop a number of times corresponding to the digits dialled to effect the pulsing of the line relay 1105' and balancing coil 1104' in series over the line loop. The equipment conditions itself in the manner heretofore described and with the first release of the line relay 1105' thereafter, the trunk loop is opened to pulse the equipment at the distant end and to simultaneously operate the punch magnet 1217' of the toll ticketing recorder which perforates the paper tape as heretofore described to record the pulse. The punch magnet 1217' in the present embodiment is operated over a circuit extending from negative battery over the winding of punch magnet 1217', contacts 1450, 1453, conductor 1465, contacts 1161', 1435 and 1109 to positive battery.

The punch magnet 1217' operates and at its contacts 1218' effects operation of the step magnet 1219. With the subsequent reoperation of the line relay 1105' at the end of the first pulse, the loop to the distant trunk is closed and the operating circuit for the punch magnet 1217' is opened to effect the release thereof. Punch magnet 1217' in turn releases the step magnet 1219' to advance the paper tape a single step. Each subsequent pulse of the first digit is relayed over the trunk and also recorded as a perforation in the tape member, the tape being advanced one step following each punch. (See Figure 22.)

At the end of the last pulse of the first digit, the punch recorder 1216' is operated in the manner heretofore described to advance the tape one step to accomplish interdigital spacing. (See Figure 22.)

The operation of the trunk 115' with receipt of each subsequent digit of the called number is accomplished in a similar manner. That is, with the initial receipt of each digit, the pulse hold relays 1235' and 1240' are operated and maintained in such condition until the entire digit is received. The punch magnet 1217' and step magnet 1219' in the punch recorder 1216' operate repeatedly responsive to the incoming impulses to effect the perforation of the tape a number of times corresponding to the number of pulses transmitted to the trunk for each digit. The pulses are also repeated by the trunk over the outgoing loop to the distant trunk equipment to effect the desired operation of the change equipment thereat. Each of the six digits of the called party number are registered on the tape with proper interdigital spacing between the digits being effected in the manner heretofore described. The trunk counting chain advances one step as each successive digit of the called party number is received.

Following receipt of the sixth digit of the called party number, the pumping circuit for the pulse hold relays 1235' and 1240' is completed to effect the advancement of the tape four steps beyond the last perforation of the called party number on the tape. This having been described more fully heretofore. (Also see Figure 22). Near the end of this spacing, the trunk sends a pulse over the P-wire 1102' to condition the selector 130 for the transmission of the calling party identification pulses in the manner heretofore described.

Calling party identification pulses

The selector 130 transmits the calling party directory number identification pulses to the trunk by pulsing over the P-wire 1102', that is, by opening and closing the aforementioned circuit of selector test wire relay 970 which is connected in series with the trunk relay 1120', this operation also having been described in detail in the previous embodiment. Trunk P-wire relays 1120' and 1130' control the operation of the punch magnet 1217' as before, the circuit herein extending from negative battery over the winding of the punch magnet 1217', contacts 1450, 1453, conductor 1465, contacts 1162', 1131' and 1121' to positive battery. The punch magnet 1217' and step magnet 1219' of the punch recorder 1216 are repeatedly operated with the receipt of the pulses comprising the first digit to perforate the tape a corresponding number of times. Following receipt of the last impulse of the first digit, an interdigital step is accomplished by the recorder to advance the tape one step for interdigital spacing. (See Figure 22.)

The trunk 115' operates with receipt of the pulses of subsequent digits of the calling number identification in a similar manner. The counting chain comprising relays 1245 to 1295 inclusive, advances with the complete receipt of each digit of the calling number in the manner heretofore described.

As the sixth counting chain relay 1295 operates following receipt of the sixth digit of the calling number, it is effective at its contacts 1291 to complete an operating circuit for the secondary follower relay 1150' which operates to effect the release of pulse hold relay 1230', the operation of pulse hold relay 1220', the release of the P-wire trunk relay 1120' and re-establishment of the trunk ground circuit for the P-wire (P-wire 1102, contacts 1118, 1152 and 1212 to ground). As the P-wire supervisory relay 1120' restores, it is effective at its contacts to effect the release of the associate relays 1125' and 1130' in cascade.

With release of P-wire relay 1130' and pulse hold relays 1235 and 1240, the step magnet 1219 in the punch recorder 1216 is operated to effect the advancement of the tape one step, the tape now being advanced two steps beyond the last perforation of the last digit of the calling identification number.

Answer

When the called party answers, the distant exchange trunk equipment reverses the polarity of the trunk conductors to effect the operation of the answer relay 1210' in the trunk circuit which then operates to insert a 150 ohm resistance in the trunk P-wire ground to provide answer supervision for operators at PBX boards which may be connected to this exchange. With the operation of the answer relay 1210 an operating circuit is also prepared for the calendar preparation relay 1430. If the calendar unit 1492 in the equipment 1490 is in use at the time, the relay for the calendar preparation relay 1430 will be temporarily inoperative awaiting completion of the cycle by the calendar 1492 and the return thereof to its home position. The details of the calendar equipment 1492 are explained more fully in the aforementioned copending application.

As the calendar 1492 returns to its home position it places ground in the pickup lead 1486 and operating circuit is completed for the calendar preparation relay 1430 which extends from negative battery over the winding of relay 1430, conductor 1474, contacts 1211, contacts 1155, conductor 1470, contacts 1414 to ground on pick-up lead 1486.

The calendar preparation relay 1430 operates and at its contacts 1433 locks to ground at the conductor 1482 is extended by the calendar 1492 in its home position and at its contacts 1434 completes an obvious operating circuit for the associate start calendar relay 1440.

Calendar start relay 1440 operates and at its contacts 1443 connects ground to the start lead 1483 for the calendar unit in the equipment 1490; at its contacts 1445 interrupts the connection of the punch recorder apparatus 1216' to the control relays of trunk circuit 115'; at its contacts 1444 transfers the punch recorder equipment 1216 to control of conductor 1484 of the clock and calendar equipment 1490 at its contacts 1441 and 1442 opens points in the preparatory circuits for the pulse hold relays 1240' and marking timer relay 1160'.

Calendar preparing relay 1430 in its operation is effective at its contacts 1431 to complete an obvious operating circuit for the clock preparing relay 1410, which operates and at its contacts 1416 completes an obvious operating circuit for associate relay 1420; at its contacts 1415 opens a point in the holding circuit for the timer relays 1160' and 1170' (which are held operated over contacts 1432 on the calendar preparing relay 1430); at its contacts 1414 interrupts the operating circuit for the calendar preparing relay 1430 and at its contacts 1413 prepares a circuit for control by the clock equipment over conductor 1487 which circuit becomes effective as the associate calendar preparing relay 1440 is subsequently released.

Associate clock preparing relay 1420 operates and at its contacts 1421 interrupts a point in the original energizing circuit for the calendar preparing relay 1430; at its contacts 1422 prepares an operating circuit for the starting relay 1460 and at its contacts 1426 applies ground to conductor 1478 in preparation of the application of a timing pulse to the chain.

The calendar equipment 1492 operates and effects the advancement of the tape three steps by the application of three impulses over conductor 1484 and contacts 1444 to the punch recorder equipment 1216. The calendar unit 1492 now proceeds to send the various time information for recording on the tape, the informative impulse effecting operation of the punch magnet 1217' or the step magnet 1219' as required to register the information on the tape. The nature of the recording accomplished for a call is set forth in Figure 22, as there shown. The information recorded for each call includes the month, day, and time of day as it existed on the calendar equipment 1492 at the time of the call.

As the final recording of this information has been effected, the calendar unit 1492 releases and transmits an initial timing pulse as described in the aforementioned copending application.

In releasing, the calendar unit 1492 interrupts the ground which has been applied over conductor 1482 to the calendar preparing relay 1430 to effect restoration thereof. Relay 1430 releases and at its contacts 1434 interrupts the holding circuit for the associate relay 1440 which also restores, at its contacts 1432 interrupts the holding circuit for the trunk timer relays 1160' and 1170' which restore, and in their release effect the restoration of associate timer relay 1150'.

*Timing of the call*

The circuit is now ready to receive timing impulses from the clock equipment 1491 over the interconnecting conductor 1487 as determined by the setting on the clock equipment 1491. In the embodiment shown herewith, it is assumed that the pulses are transmitted by the clock every fifteen seconds whereby four intervals will thus constitute the elapse of one minute.

The first pulse as transmitted by the clock unit 1491 over conductor 1487 is extended over contacts 1413, 1412, conductor 1469, contacts 1211', conductor 1474, contacts 1441, contacts 1424 to the winding of pulse hold relay 1244' and negative battery.

The pulse hold relay 1240' operates and at its contacts 1244' effects the operation of the first counting chain 1245' in the manner heretofore described.

As the first impulse transmitted by the clock equipment 1491 is terminated, pulse hold relay 1240' restores and at its contacts 1243' effects the operation of the second counting chain 1215' in series with the first counting chain relay 1245'.

After thirty seconds have elapsed, the second pulse is transmitted by the clock equipment 1491 and the pulse hold relay 1240' is reoperated to effect at its contacts 1243' the release of the first counting chain relay 1245', and at its contacts 1244', the holding of the second counting chain relay 1250'. With the restoration of the pulse hold relay 1240' for the second time, the third counting chain relay 1260' is operated in series with counting chain 1250' in the manner heretofore described.

As the third counting chain relay 1260' operates, it is effective at its contacts 1437 to complete an operating circuit for the call timer relay 1460 which operates and at its contacts 1462 locks up independently of the contacts on the third counting chain relay 1260.

As the third timing pulse is received from the clock equipment 1491, the second counting chain 1250' is restored and the third counting chain 1260' is held operated over the contacts 1244' of the operated pulse hold relay 1240'. As the pulse hold relay 1240' restores subsequent to the receipt of the third pulse, the fourth counting chain 1270 is operated in series with the third counting chain relay 1260 over the circuits controlled by contacts 1243' and the restored pulse hold relay 1240'.

As the fourth pulse is received, the fourth counting chain relay 1270' is held over circuits controlled by contacts 1244' and pulse hold relay 1240', and the third counting chain relay 1260 restores. As the pulse hold relay 1240' restores after the receipt of the fourth pulse, the counting chain is released as the result of the interruption of the operating circuit for the fifth counting chain relay at contacts 1463 on the operated call timer relay 1460.

With the receipt of the fifth impulse from the clock equipment 1491, the pulse hold relay 1240' is operated and as contacts 1244' thereon are closed in response to operation of that relay, the operating circuit for the first counting chain relay 1245 of the restored counting chain is once more completed.

As the first counting chain relay 1245 operates, it is effective at its contacts 1455 to complete an operating circuit for the punch magnet 1217' in the punch recorder equipment 1216', the circuit extending from negative battery over the winding of punch magnet 1217', conductor 1481, contacts 1455 and 1461 to ground.

The punch magnet 1217' operates to perforate the tape member. Once it is apparent therefrom that with the elapse of four intervals of fifteen seconds of a call, four impulses are sent to the trunk counting chain by the clock unit 1491, and a single perforation is made in the tape member. With the elapse of each subsequent sixty second period, a similar punch will be registered on the tape. As will become apparent from the detailed consideration of the calendar equipment, the elapsed time between the first and second time punch may be from sixty to seventy-five seconds depending upon the chance relation of the release of the calendar equipment 1492 to the cycle of the clock contacts.

As the next clock pulse is received, the second counting chain relay 1250' will be held operated and the first counting chain relay 1245' will be restored. With the receipt of the second pulse after the registered pulse, the third counting chain relay 1260' will be operated and the second counting chain relay 1250' will be restored. As the third impulse is received from the clock equipment 1491, the fourth counting chain relay 1270' will be held operated and the third counting chain relay 1260' will be restored.

During the interval between the third and fourth impulses received from the clock unit 1491, the counting chain is released in the manner previously described and as the pulse hold relay 1240 is operated on the fourth punch, an operating circuit is completed for the punch magnet 1217' in the punch recorder equipment 1216' as previously described and the third time perforation is made on the tape exactly sixty seconds following the second time mark. In this manner one mark is punched in the tape for each minute of elapsed time, each mark representing the beginning of one minute of conversation time (except for the delay caused by the fact that the calendar transmits the month, day and hour information before the initial time pulse, and the further delay of a maximum fifteen seconds due to the non-synchronous relation between the release of the calendar and the operation of the clock contact as previously mentioned). The timing is stopped when the called party hangs up to restore the release relay 1210', or alternatively when the calling party hangs up to release the seized trunk 115'.

Release after completed call

Certain terminology must be adopted to properly define the operation of the equipment in its release from various stages of call completion. In the present description the term "completed call" is indicative of a call which has progressed to the point where the answering relay 1210' has been operated and the calendar equipment 1492 has been connected to the trunk 115'.

In the event of the release of the equipment as the result of the restoration of the equipment by the calling party during the period the calendar 1492 is connected to the trunk 115', the line relay 1105' and its associate relays 1110' and 1115' will release to permit restoration of the associate selector switch 130. However, the operated trunk relays such as 1160', 1170', 1150' and 1410 and 1420 will be held operated by the calendar preparing relay 1430, and the reception of the calendar data and the initial time punch will be completed to indicate on the tape that the call was completed to the called party.

As the calendar preparing relay 1430 releases with the restoration of the answer relay 1210' (following restoration of the handset to the substation by the called party or the restoration of the clock preparing relay 1410) the release of timer relays 1150', 1160' and 1170', clock preparing relay 1410 and 1420 and associate calendar preparing relay 1440 is effected. The associate calendar preparing relay 1440 is slow-to-release whereby the release of the other relays mentioned is effected prior to the closing of contacts 1442 and the reoperation of the first timer relay 1160'.

As the calendar preparing relay 1440 does release, it is effective at its contacts 1442 to complete an operating circuit for the timer relay 1160', the circuit extending from negative battery over the winding of relay 1160', conductor 1467, contacts 1442, contacts 1134', conductor 1466, contacts 1116', 1114A' to ground. Timer relay 1160 operates and completes the energizing circuit for the pumping arrangement comprising the pulse hold relays 1240' and 1235', the relays operating to advance the tape and the counting chain until the seventh counting chain 1295 operates to control energization of the supervisory relay 1140'.

The supervisory relay 1140' operates and at its contacts 1451 interrupts the holding circuit for the master ground relay 1135' and causes the release of timer relay 1160' and pulse hold relay 1220' which restores to in turn effect the restoration of the operated ones of the counting chain relays. It is noted that the contacts 1134' on the master ground control relay 1135' are adjusted to open before the contacts 1136' on the same relay are closed during the releasing operation. When the counting chain has released, the contacts 1297' will be open to interrupt the energizing circuit for the supervisory relay 1140' and to effect the restoration thereof. The trunk 115' is now restored for the succeeding call.

The release of a connection at a later stage in the call will proceed in a similar manner. The timer relays 1160', 1170' and 1150' and the associate calendar preparing relay 1440 will have been released as described following the restoration of the calendar preparing relay 1430.

When the line relay 1105 releases responsive to the restoration of the substation set by the calling party, the restoration of the associate relays 1110', 1115' is effected and the cascade release of the clock preparing relay 1410 and its associate relay 1420 in a cascade manner is effected. Timer relay 1160 is reoperated as described to cause the trunk counting chain to advance the tape six steps for inter-call spacing after which the trunk is freed exactly as described in the preceding example of release initiated while the trunk is connected to the clock and calendar equipment 1490.

Release after incompleted call

The manner of restoration of the trunk equipment when the call has not been completed will vary in accordance with the particular stage to which the trunk has advanced.

(A) Release before timer relay 1160' is operated

If the release occurs before dialling is initiated by the calling subscriber, an incidental punch will be recorded by the release of the line relay 1105' followed by an associated step, and an incidental step as effected by the reoperation of the timer relay 1160'. This is, in turn, followed by six after-call steps making a total of eight spaces between the incidental punch and the first punch of the next call.

For example, as the line loop is interrupted, the line relay 1105' is restored with the balancing coil 1104' and the associate relays 1110' and 1115' are released in turn. The master ground relay 1135' remains locked up to maintain the trunk busy.

The release of line relay 1105' incidentally operates the punch magnet 1217' and in turn the step magnet 1219'. As the associate relay 1110' restores, the punch magnet 1218' and step magnet 1219' are released. Thus, the associated steps are incidentally recorded on the tape member.

The release of line relay 1105' also effects the operation of the off-normal relay 1200 which at its contacts 1205' completes an operating circuit for the first pulse hold relay 1240, the circuit extending from negative battery over the winding of relay 1240, contacts 1425, conductor 1468, contacts 1154', 1164', 1205' and 1113' to positive battery. Pulse hold relay 1240 operates and at its contacts 1242 completes an operating circuit for the associate pulse hold relay 1235 and the first counting chain relay 1245.

The associate relay 1110' at its contacts 1113' completes an operating circuit for the third pulse hold relay 1230', the circuit extending from battery over the winding of relay 1230', contacts 1169', conductor 1473, contacts 1415, conductor 1472 and contacts 1113' to ground.

As the associate hold relay 1110', the first counting chain relay 1245', the third pulse hold relay 1230', and the first and second pulse hold relays 1235' and 1240' are restored, the tape is thereby advanced one more additional step.

As the second associate hold relay 1115' restores, an operating circuit is completed at its contacts 1116' for the timer relay 1160', which operates and completes the energizing circuit for the pumping arrangement comprising the first and second pulse hold relays 1235' and 1240'. The pumping arrangement runs the counting chain up to the seventh relay 1295', which chain in operating effects the operation and release of the step magnet 1219' six times to advance the tape member six more steps.

As the seventh counting chain 1295' operates, it is effective at its contacts 1297' to complete an operating circuit for the supervisory control relay 1140' which operates and at its contacts 1451 interrupts the holding circuit for the master ground control relay 1135' to effect the restoration thereof.

As the master ground control relay 1135' restores, it is effective at its contacts 1134' to effect the release of timer relay 1160' and in turn pulse hold relay 1220'.

As the timer relay 1160' restores, the circuit for the first pulse relay 1240' is interrupted, and with the release of the pulse hold relay 1220', the sixth and seventh counting chain relays 1290' and 1295' are restored.

Thus an eight step spacing separates the incidental punch from the next call to be recorded.

If release occurs after dialling has commenced, but before the operation of timer relay 1160', certain characters of the called number will have been recorded on the tape. Release of the line relay 1105' upon hanging up occasions an incidental punch (which may coincide with the punch of the called number). This is, in turn, followed by one additional step. An incidental step occurs as the result of the operation of the off-normal relay 1200 which is effected during release. This is followed by six after call spaces, making a total of eight spaces between the incidental punch and the first punch of the next call.

*Release after the timer relay 1160' operates but before the calendar preparing relay 1430 operates*

After the timer relay 1160' is operated, the recording on the tape may have progressed to any point following the accomplishment of called number after-digit spacing; after-number spacing; or a punch of the calling number. The release thereafter occasions an incidental space followed by six regular after-call spaces.

When release occurs, line relay 1105' and its associate relays 1110' and 1115' release as usual. As associate relay 1110' restores all of the successive relays which may have become operated will be restored. In this group will be the timer relays 1160', 1150' and 1170'. The master ground control relay 1135' will remain operated to keep the trunks busy to hunting selectors and to prepare a circuit for the reoperation of the timer relay 1160' as has been previously described. If the pulse hold relay 1220' was operated at the time of release, it will be released by the timer relay 1160'. If the pulse hold relay of 1230' was operated, it will be operated by the timer relay 1170'. With both the pulse hold relays 1220' and 1230' restored, no ground is applied through the contact of the first pulse hold relays 1240' (either operated or not operated) to the counting relays, and any counting relay that may be operated at the time will restore. The off-normal relay 1200 becomes operated as the line relay 1105' restores, but this has no significance since the ground which is extended at contacts 1205' will be removed by associate relay 1110' as the timer relay 1160' is restored. Therefore the first pulse hold relay 1240' will not be operated.

With the relay 1160' reoperated, the pulse hold relays 1235' and 1240' repeatedly operate to effect the advancement of the tape and the counting chain one step with each operation. After the advancement of the chain and tape six steps, the seventh counting chain relay 1295' will become operated, and in turn the supervisory relay 1140' is energized.

As the supervisory relay 1140' operates, it is effective as heretofore described to effect the release of the master ground control relay 1135', which in turn effects the restoration of the timer relay 1160' and the pulse hold relay 1220'. Release of the timer relay 1160' holds the circuit of the first pulse relay 1240' open. The pulse hold relay 1220' interrupts the holding circuit for the counting chain which in turn effects the release of the supervisory relay 1140'. It is noted that the operation of the circuit during the six step advancement of the tape and the subsequent release of the entire trunk circuit is the same as the corresponding operation of the circuit in release before the timer relay 1160' has operated, this having been previously described. It will be seen therefrom that the tape advances at least seven steps, that is, one step following the last time the punch operated and the final six spacing steps.

CONCLUSION

The new and novel automatic telephone exchange which has been set forth in the foregoing disclosure includes automatic toll ticketing equipment which is believed to be a distinct and definite advancement in the art. The inherent simplicity and flexibility of the disclosed toll ticketing arrangement facilitates inclusion thereof in automatic exchanges. Further, the savings resulting from the use thereof is a definite factor for influencing the extensive use thereof by the operating companies.

The automatic nature of the equipment also has definite appeal to the subscribers and is expected to encourage the placement of a greater number of toll calls by the subscribers.

The specific features of the arrangement as set forth heretofore each tend to provide a system which is comparatively simplex, flexible and economical. The provision of identification apparatus in the link equipment, for example, provides a simplex arrangement which requires only a minimum amount of equipment to effect automatic registration of the directory number of the calling party. Further, the use of the test conductor of the three wire connection extending between the trunk and seized link provides an arrangement by which both the registering and communication operations may be carried on simultaneously without interference with one another and without requiring a large amount of additional expensive equipment. While in an extremely few cases actual conversation will begin before the registration has been completed due to the short time period required for this operation, the availability of the communication channel is valuable for instantaneous return of signals such as busy tone and ring back tone.

The simplicity of the equipment utilized in the identification of the position of a calling party on a multiparty line especially adapts the equipment for wide and extensive use in both suburban and metropolitan areas and makes possible the economical replacement of operators with automatic switching equipment.

These and various other features of the disclosed apparatus are believed to constitute a new and desirable advancement in the art, these features and others being now set forth in the accompanying claims.

What is claimed is:

1. An automatic telephone exchange having switching means for establishing connections between subscriber substations on lines associated therewith, and also to subscriber substations on lines in other exchanges, access to predetermined ones of said lines being restricted; impulse transmitting means at each subscriber substation for controlling operation of said switching means in the establishment of a connection to a desired one of the subscriber lines, line identification means connected at only certain of said subscriber substations for identifying the party line position of the calling subscriber concurrently with the transmission of operating impulses to the switching equipment, register means, means for registering the directory number of only said certain substations for recording purposes prior to the complete transmission of the first digit of the desired subscriber number, and selection means in said switching means operative to extend connections to said predetermined ones of said lines only in response to the receipt of the assigned operating impulses and a line identification signal indicating initiation of the call by one of said certain substations.

2. An automatic telephone exchange having switching means for establishing connections between subscriber substations on lines associated therewith, and also to subscriber substations on lines in other exchanges, access to predetermined ones of said lines being restricted, impulse transmitting means at each subscriber substation for controlling operation of said switching means in the establishment of a connection to a desired one of the subscriber lines, line identification means connected at only certain of said subscriber substations for identifying the party line position of the calling subscriber concurrently with the transmission of operating impulses to the switching equipment, register means, means for registering the directory number of only said certain substations for recording purposes prior to the complete transmission of the first digit of the desired subscriber number, selection means in said switching means operative to extend connections to said predetermined ones of said lines only in response to the receipt of the assigned operating impulses and a line identification signal indicating initiations of the call by one of said certain substations, and recorder means and means including said selection means for transmitting the directory number of the calling subscriber on said register means to said recorder means only responsive to extension of a call by one of said certain lines to one of said predetermined lines.

3. An automatic telephone exchange having switching means for establishing calls between local subscriber lines and also with subscriber lines in distant exchanges, register storage means for storing the complete assigned directory number of the calling party, registration control means for completing registration of the entire calling number thereon prior to complete transmission of the first digit of the number in establishing a call to certain ones of said subscriber lines, recording means for recording the stored number for subsequent billing purposes, read out means in said switching means for transmitting the information on said register storage means to said recording means, and timer means in said switching means operative in response to dialing of the last digit of the called party number to enable said read out means to transmit said information to said recording means.

4. An automatic telephone exchange having switching means for establishing connection between local subscriber lines and also to subscriber lines of distant exchanges, register means for completing registration of the assigned directory number of the calling party responsive to the dialling of the first digit of the directory number of only certain ones of the called subscribers, recording means for permanently recording each digit of the directory number of the called party responsive to the receipt thereof from the calling party substation, and read out means for transmitting the information on said register means to said recorder means immediately subsequent to recording of the called party number and prior to answer by the called party.

5. An automatic telephone exchange having switching means for establishing connections between local subscriber lines and also to subscriber lines at distant exchanges including links and trunk circuits, register storage means for automatically registering the assigned directory number of the calling party, register control means operative with the dialing of the first digit in the extension of a call to a distant subscriber line to complete registration of the entire calling party number on said register storage means, recording means for permanently recording the directory numbers of the called and calling parties, means in said trunk circuit rendered operative with the seizure of said trunk circuit and the transmission thereover of the called party number to transmit each digit received simultaneously to said recording means and in the direction of the desired subscriber exchange, and signalling means for transmitting the calling party directory number to said recording means subsequent to the registration of the called party number by said trunk circuit means and prior to answer by the called party.

6. An apparatus as set forth in claim 5 which includes calendar means in said trunk for automatically recording the month, time of day, and length of each connection recorded on said recording means.

7. An arrangement as set forth in claim 5 in which said recording means comprises a punch mechanism for perforating a given tape member included therewith in accordance with the impulses transmitted thereover.

8. An automatic telephone exchange including a plurality of links for establishing calls between subscriber lines associated with the exchange and also to subscriber lines in distantly located exchanges responsive to the receipt of a group of digit-representing impulse sets indicating the desired subscriber, and an identification impulse set concurrently with the first one of said digit sets, the selector switch in each link having access to a plurality of levels of subscriber line groups, register means in each of said links for automatically registering the assigned directory number of the calling party, and line relay means in said links operative responsive to concurrent receipt of said digit-representing and identification impulse sets to complete registration of the entire calling party directory number on said register means and simultaneously to route the connection over the particular level designated by the incoming first digit representing impulse set.

9. An automatic telephone exchange having switching means including links for establishing connection between local subscriber lines, and trunk circuits for use with said links in establishing calls to subscriber lines at distant exchanges; register storage means for effecting registration of the assigned directory number of the calling party with the initiation of a call and the dialing of the first digit to reach the called party, recording means for permanently recording the assigned directory number of the called party and calling party of the connections extended thereover including means in said trunk circuit for recording the called party number on said recording means simultaneously with the dialing thereof by the calling party, signalling means associated with said register means for transmitting the calling number stored thereon to said trunk recording means responsive to the completion of the recording of the called party number, and signal initiating means in said trunk operative with the completion of the transmission of the assigned directory number of the called party thereover and the recording thereof to transmit an initiating signal to said register equipment to effect transmission of the calling party number by said signalling means to the recording means.

10. An exchange as set forth in claim 9 in which said subscriber lines comprise private subscriber lines and multi-party subscriber lines, and said links include signal discriminatory means for responding to a given received received digit signal from the substation set to simultaneously route the call over the level indicated by the value of the digit received and to complete the identification of the calling party on a multiparty line.

11. An automatic telephone exchange having switching means for establishing connections between local subscriber lines, the connections over said links consisting of a positive, negative and test conductor, trunk circuits associated with said exchange for cooperating with said links to also extend connections to subscriber lines of distant exchanges, register means for registering the entire directory number of the calling party with the establishment of calls to certain of said subscribers; recording means in said trunk circuit for permanently recording the called and calling numbers of connections extended thereover, and signalling means associated with said register means for transmitting the assigned directory number of the called party as stored thereon to said trunk circuit recorder over the P-wire test conductor of the connection extending therebetween.

12. An arrangement as set forth in claim 11 in which said link includes registering control means for preparing calling party recordation of each call effected over a link, and signal discriminating means for completing said recording only with extension of a call to trunk circuits extending to distant subscribers.

13. A telephone exchange having a plurality of lines divided into groups, a plurality of links for setting up connections between said lines and also to subscriber lines in interconnected distant exchanges, each of said links including at least a linefinder-selector switch, and register means, means in said linefinder selector switch operative with initiation of a call and dialing of the first digit to effect registration of the assigned directory number of the calling party on said register means, counting chain means accessible to said selector switch sequentially advanced with receipt of the incoming impulses of the first digit to select correspoding groups of lines accessible thereto, and signalling means including said counting chain for examining said register means for the directory number of the calling party and transmitting same over the seized one of said predetermined group of lines.

14. A telephone exchange having a plurality of lines divided into groups, a plurality of links for setting up connections between said lines, and trunk circuit means adapted to cooperate with said links for extending connections to subscriber lines in interconnected distant exchanges; register means associated with said links, means operative with initiation of a call and dialing of the first digit to effect registration of the assigned directory number of the calling party on said register means; a plurality of groups of lines and trunks accessible to said links, counting chain means accessible to said links operative with receipt of successive incoming impulses to select a corresponding one of said groups and an idle trunk in said group, and signalling means including said counting chain for examining said register means for the directory number of the calling party subsequent to complete receipt of the called number, and transmitting means associated with said signalling means for advancing said counting chain in its examination and simultaneously transmitting corresponding identification pulses to the seized one of said trunks.

15. A telephone exchange as set forth in claim 14 in which each of said trunk circuits includes a recorder system for recording the assigned directory number of the calling party as transmitted thereto by said signalling means.

16. A telephone exchange having a plurality of lines divided into groups, a plurality of links for setting up connections between said lines, and trunk equipment for cooperating therewith for extending connections to subscriber lines in interconnected distant exchanges; register means, means operative with extension of a call toward the desired party to effect registration of the assigned directory number of the calling party on said register means, a plurality of levels accessible to and outgoing from each link, counting chain means accessible to the links operative with receipt of incoming digit-representing impulses to select a corresponding one of said levels and to effect the extension of a three wire connection from said link over said level, a pair of said conductors comprising a talking connection and the third conductor being adapted for testing purposes; signalling means including said counting chain for examining said register means for the directory number of the calling party; and transmitting means associated therewith for advancing said counting chain in its examination, and for simultaneously transmitting corresponding identification pulses over the interconnecting test lead connection of the selected level.

17. A telephone exchange having a plurality of lines divided into groups, a plurality of links for setting up connections between said lines and also to subscriber lines in interconnected distant exchanges, each of said links including at least a linefinder and a selector switch, register means, means in each link operative with extension of a call toward certain of said lines to effect complete registration of the assigned directory number of the calling party on said register means; a plurality of groups of lines and a plurality of groups of trunk circuits accessible to each of said selector switches, selector counting chain means, line relay means operative responsive to incoming impulses received from the subset of a calling subscriber to advance said counting chain the selection of a corresponding one of said groups, means operable with selection of a group of trunks to automatically select an idle one of the trunks of the selected group, signalling means including said counting chain for examining said register means for the assigned directory number of the calling party and effecting the transmittal thereof to the seized one of said trunks, and selector control means operative responsive to seizure of a group of trunk circuits for transferring said line relay from the control of said subscriber subset to the control of said signalling means for advancement of the counting chain in controlling the transmission of the registered directory number of the calling party to the seized trunk.

18. A telephone exchange having a plurality of subscriber lines divided into groups, each of which lines has signalling means associated therewith a plurality of links for setting up connections between said lines, and trunk circuits for cooperating therewith to establish calls with subscriber lines in interconnected distant exchanges; each of said links including at least a linefinder-selector switch, register means; means in each line finder-selector switch operative with seizure of the link and extension of a call over a subscriber line toward certain of said lines to effect registration of the directory number of the calling party on said register means, a plurality of levels for each selector switch, certain of which levels have access to groups of subscriber lines and others of which have access to groups of trunk circuit equipment; counting chain means for selecting a level corresponding to the signals received from the calling line, means operative with termination of the receipt of the incoming signals to extend a pair of talking conductors and a test conductor through the seized link to an idle one of the units associated with the selected level, means in said trunk circuit units operative with receipt of the called party number from the calling subscriber line, to retransmit said number to an interconnected distant exchange, and to simultaneously transmit the pulses to associated recorder equipment for permanent registration thereon; signalling means, including said counting chain for examining said register means for the directory number of the calling party recorded thereon, means controlled thereby for transmitting the number registered thereon over said interconnecting test conductor, and signal initiating means in said trunk circuit for transmitting an initiating pulse to said signalling means immediately following termination of transmission over the trunk of the called party directory number.

19. An arrangement as set forth in claim 18 in which the signal initiating means in said trunks includes means for transmitting said initiating signal to said signalling means over said test conductor which extends therebetween.

20. An arrangement as set forth in claim 18 which includes time delay means for introducing a predetermined period of delay subsequent to the termination of transmission of the called party number over said trunk and prior to transmission of said initiating impulse by said trunk means.

21. A telephone exchange having a plurality of lines divided into groups, a plurality of links for setting up connections between said lines and also over accessible trunk units to subscriber lines in interconnected distant exchanges, each of said links including at least a linefinder switch and a selector switch, register means, means in each link operative with extension of a call toward certain of said lines to effect registration of the directory number of the calling party on said register means, counting equipment operative responsive to a receipt of a set of controlling impulses to select a corresponding group of associated trunk units and to seize an idle one thereof, and signalling means for examining said register means for the directory number of the calling party as registered thereon including impulsing means for transmitting impulses to the seized trunk, and for simultaneously transmitting impulses to said counting equipment to step same in a hunting operation over said register means, sequence means for connecting said counting equipment to said register means to control the counting equipment to hunt for the value of a predetermined digit of the calling party directory number registered thereon, and stop means for terminating operation of the impulsing means responsive to determination of the value of said digit including means operative responsive to operation of said stop means to signal said sequence means to connect said counting equipment to hunt for the value of a successive digit of the number registered thereon.

22. In a telephone exchange having a plurality of subscriber lines register means, recorder means, means for registering the assigned directory number of the calling party on the register means with extension of a call toward certain subscribers, signalling means for examining said register means for the directory number of the calling party as registered thereon, including counting means, an impulse generating system for transmitting impulses to the associated recorder equipment, and simultaneously transmitting impulses to said counting equipment to control same in its hunt over said register means for the first identifying digit of the registered calling party number; stop means energized as the counting equipment advances to the point corresponding to the value of the digit registered on said register means, reset means for controlling reset of the counting equipment with the advancement to said point and its completion of the transmission of the first identifying digit to said recorder equipment transmitter sequence means operative to render available on the register means the next identifying digit of the calling party number and to reinitiate the examination thereof by said counting equipment, and means for controlling said transmitter sequence means to effect a corresponding preparation of each succeeding digit of the registered number.

23. A telephone exchange as set forth in claim 22 which includes pause introducing means for introducing a pause which is the equivalent of six impulses between the transmission of each successive digit of the calling number.

24. A telephone exchange as set forth in claim 22 in which said system includes trunk equipment, and in which said recording equipment is located in said trunk equipment, means operative upon seizure of an idle trunk to extend a three conductor connection to the seized trunk including two talking conductors and a test conductor, and in which said signalling means includes a test relay which is adapted to be connected in series with the test conductor extending between the signalling means and the selected trunk and control means in said trunk for operating said test conductor relay responsive to the extension of a call thereto, and for maintaining said selector test conductor relay operated pending transmission of the entire called party directory number over said trunk unit.

25. A telephone system as set forth in claim 24 which includes means for effecting restoration of said relay following termination of the transmission of the called party number thereover; and means for controlling said signalling means to initiate transmission of the directory number registered thereon with said operation of said test relay.

26. A telephone exchange as set forth in claim 24 in which each trunk circuit includes control means for controlling said test relay to initiate operation of said signalling means at a predetermined time in the connection, and guard means for maintaining said test conductor busy to other equipment during the period of the transmission of the controlling pulses to said test wire relay.

27. An automatic telephone exchange including a plurality of linefinder-selector links for establishing calls between subscriber lines associated with the exchange and also to subscriber lines at distantly located interconnected exchanges, each of said subscriber lines having assigned thereto a predetermined directory number; a pre-identification arrangement comprising a series of identification circuits for preidentifying certain portions of each line number, circuit means in each linefinder switch operative as a call is established over its associated link to prepare individual identifying circuits corresponding with a further portion of the directory number of the particular line which is initiating the call; a plurality of line groups and trunk equipment accessible to each of said selectors, chain hunting means, means in each selector switch operative responsive to receipt of impulses received over the calling line to control said chain hunting means to select an indicated one of said groups, and signalling means operative subsequent to the selecting operation to control said chain hunting means to test said preidentification arrangement and said identification circuits prepared by said linefinder means for the calling number identified thereon.

28. In an automatic telephone system, an exchange including a plurality of linefinder-selector links for establishing calls between subscriber lines associated with the exchange and also to subscriber lines at distantly located interconnected exchanges, each of said subscriber lines having assigned thereto a predetermined directory number, certain of said lines having multi-party substation connections, apparatus individual to each of said party substations for controlling said links in setting up connections to other subscriber lines, predetermined identification means associated with the apparatus for each of said party line subscribers for effecting at times the concurrent transmission of an operating signal set and a station identifying signal to said links, the identifying set for different parties on a line being timed with correspondingly different ones of the operating signals, circuit means in the link operative as a call is established thereover by a calling subscriber in the direction of a desired subscriber to identify the directory number of the particular line which is initiating the call, and control means in the selector switch of the seized link operated responsive to receipt of said concurrent signals to operatively control selection of a level outgoing from said link consistent with the value of the operating signal and to simultaneously register the party identification number of the calling line on said register means to complete the identification of the calling line thereon.

29. In a telephone system as set forth in claim 28 which includes common control means, means for rendering said common control means accessible to said links, said common control means comprising a plurality of station register relays, and cycling means for successively preparing each succeeding relay in the register for operation, and line means in the selector operatively responsive to each operating signal of a set to advance said cycling means one step, and operatively responsive to receipt of said identifying signal to operate the particular station register relay which is prepared for operation at the time the identification impulse is received.

30. In a telephone system as set forth in claim 28 in which each selector includes a plurality of ten station register relays interconnected to provide individual identification registration for each of twenty parties on a single calling line with receipt of their assigned identification signals.

31. An automatic telephone system as set forth in claim 28 in which said apparatus for controlling said link comprises a dial member adapted to transmit operating impulses over a seized link with each operation thereof, and said substation identification means comprises a cam member associated with said dial, and a pair of special impulse springs controlled to operate thereby concurrently with and in timed relation to the operating impulses responsive to predetermined operations of said dial member.

32. In a telephone exchange having a plurality of private subscriber lines and a plurality of multi-party subscriber lines, said lines in said exchange being divided into given groups and subgroups and each having a directory number comprised of at least a thousands, a hundreds, a tens and a units digit, a plurality of links for setting up connections between said lines and also to subscriber lines in interconnected distant exchanges, each of said links having a plurality of said groups preassigned thereto and each link including at least a linefinder switch, and a selector switch, means in said linefinder switch including a plurality of group relays, each group relay corresponding to an associated group of said lines, and a plurality of units relays individually corresponding to the lines of each of said groups, the corresponding group relay and unit relay for a line being rendered effective with initiation of a call over the corresponding line to set up a connection to the selector switch in the associated link and to establish identification circuits indicating the group and units number of the calling line, identifying means for preidentifying the thousands and hundreds groups of the lines associated therewith, selection means having access to a plurality of groups of lines in said exchange, means in said selector switch operative to control said selection means to select a group of said plurality corresponding to the signal received from the calling one of said subscriber lines, and means including said selection means for automatically determining the directory number of the calling line as identified, recorder means, and signalling means for effecting transmission of the directory number as determined to the associated recording equipment for subsequent billing purposes.

33. An automatic telephone exchange having a plurality of subscriber lines, and switching means including linefinder-selector links for establishing calls between local subscriber lines and also to subscriber lines in distant exchanges, each of said subscriber lines being assigned a predetermined directory number and each of said links being associated with a predetermined one hundred line group of said local subscriber lines, register means in each of said links for automatically registering the assigned directory number of a calling line responsive to extension of a call by that line over the associated link, cross-connection means for permitting movement of a limited number of lines of one link to a link associated with a different hundred group of lines while maintaining the originally assigned directory number, and cross-connection translating means operative when a cross-connected line initiates a call over its assigned linefinder for effecting the registration of the directory identification number originally assigned thereto on said register means.

34. An automatic telephone exchange having a plurality of groups of subscriber lines, and means including a plurality of linefinder-selector links for establishing calls between local subscriber lines and also to subscriber lines in distant exchanges, register means for registering the assigned directory number of the calling line as a call is extended by a line over its assocciated link, and selector controller equipment common to two or more of said links connected for operation with the seizure of one of its assigned line finder-selector links, means in the seized selector for controlling said selector controller equipment to concurrently accomplish registration of the identifying number for the calling party line on the register means and to also extend the connection to an indicated group of said subscriber lines, and release means in said controller for restoring said controller equipment thereafter to permit use thereof in a similar operation with the other links which are common thereto during the period the first seized selector is in use in the extension of said connection.

35. An automatic telephone system as set forth in claim 34 which includes recorder means, and said selector controller equipment includes a group of station register relays for registering the identity of each calling line, a plurality of relays arranged in the manner of a counting chain for selecting a desired one of a plurality of line groups, and a plurality of signalling relays for thereafter automatically cycling said chain relays to determine the directory number of the calling line registered on said register means and said station register relays, and transmitting said number to said recorder means prior to restoration of the controller.

36. In an automatic telephone system, an exchange having a plurality of subscriber lines, each line having a predetermined directory number assigned thereto; said exchange including a plurality of linefinder-selector links for setting up communication links between said exchange subscribers; register means in said links for registering the assigned directory number of the calling party; a plurality of trunk circuits accessible to said links for extending communication channels from said exchange subscribers to subscribers in distant exchanges; recording equipment in each of said trunks for recording the assigned directory number of the calling and called parties involved in calls established thereover, including impulse responsive means for operating said recorder equipment with receipt of the called party number by said trunk concurrently with the dialling thereof by the calling subscriber and for simultaneously repeating the directory number of the called party number over the outgoing side thereof; test conductor means extending between the trunk and the link in addition to the communication channel extending therebetween for transmitting to said trunk the calling party number as registered thereon, and signal responsive means in the trunk circuit for controlling registration of the calling party number on said associated recorder equipment as received over said test conductor means.

37. An automatic telephone exchange as set forth in claim 36 in which said trunk includes calendar means associated with said recorder, and calendar control means operative with the establishment of a call over said trunk to operate said calendar to record the month, date and time along with the calling and called number on said recording equipment.

38. An automatic telephone exchange as set forth in claim 36 in which said trunk includes calendar means associated with said recorder for supplying the month, date, the time of each connection, and signals for timing the connection, calendar control means operative to record the information supplied by said calendar along with the calling and called number on said recording equipment, and answer means operative responsive to answer of the call by the called party for energizing said calendar control means.

39. An exchange as set forth in claim 36 in which each of said trunk circuits includes signal initiating means which are operative to send a signal over said conductor means to operatively initiate the transmission of the calling party number over said conductor means to said trunk.

40. An automatic exchange as set forth in claim 36 in which each link includes means operative with receipt of the impulses of an incoming digit to seize one of said trunks accessible thereto, and means for simultaneously extending said communication link and said test conductor means to the seized trunk, said communication link comprising a pair of talking conductors and said test conductor means comprising a test conductor for determining the availability of the trunks accessible thereto, and in which each of said trunks includes test means operative to apply low resistance battery to said test conductor as the trunk is in the idle position, and to remove said low resistance battery as the trunk is rendered busy.

41. An automatic exchange as set forth in claim 36 which includes a clock member, and in which each of said trunk circuits includes a tape member, and means for recording on the tape member information concerning each call extended thereover, a plurality of relays arranged as a counting chain system, and a series of counting chain control relays for controlling said counting chain to operate, in succession, to count the digits of the called party number as received, to effect movement of the tape member a predetermined number of steps immediately thereafter, to count the digits of the calling party number as received, to operate in conjunction with the clock to register the elapsed time of the call on the tape, and to thereafter advance the tape a given number of steps to provide intercall spacing on the tape member.

42. An automatic exchange as set forth in claim 40 which includes means for maintaining said conductor marked busy during use thereof to transmit signals from the trunk to the link.

References Cited in the file of this patent

UNITED STATES PATENTS

| | | | |
|---|---|---|---|
| 2,266,215 | Kesten | Dec. 16, | 1941 |
| 2,270,123 | Horn | Jan. 13, | 1942 |
| 2,385,228 | Ostline | Sept. 18, | 1945 |
| 2,387,671 | Lundstrom | Oct. 23, | 1945 |
| 2,410,520 | Ostline | Nov. 5, | 1946 |
| 2,486,722 | Stehlik | Nov. 1, | 1949 |
| 2,550,585 | Murphy | Apr. 24, | 1951 |
| 2,562,594 | Bielenberg | July 31, | 1951 |
| 2,568,101 | Voss | Sept. 18, | 1951 |
| 2,579,729 | Dehn et al. | Dec. 25, | 1951 |
| 2,580,093 | Hersey | Dec. 25, | 1951 |
| 2,585,130 | Jones | Feb. 12, | 1952 |
| 2,615,094 | Mitchell | Oct. 21, | 1952 |
| 2,629,016 | Gooderham | Feb. 16, | 1953 |